US008417866B2

(12) United States Patent
Chang et al.

(10) Patent No.: US 8,417,866 B2
(45) Date of Patent: *Apr. 9, 2013

(54) MEDIA CARD COMMAND PASS THROUGH METHODS

(75) Inventors: Robert Chin-Tse Chang, Danville, CA (US); Henry Ricardo Hutton, Tracy, CA (US); Farshid Sabet-Sharghi, Los Altos Hills, CA (US); Haluk Kent Tanik, Mountain View, CA (US); Ron Barzilai, Cupertino, CA (US); Meytal Soffer, Ein Ya'kov (IL); Mei Yan, Cupertino, CA (US); Patricia Dwyer, San Carlos, CA (US); Po Yuan, Milpitas, CA (US); Bahman Qawami, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,870

(22) Filed: Nov. 22, 2011

(65) Prior Publication Data

US 2012/0066412 A1    Mar. 15, 2012

Related U.S. Application Data

(63) Continuation of application No. 12/267,100, filed on Nov. 7, 2008, now Pat. No. 8,078,788, which is a continuation-in-part of application No. 11/298,349, filed on Dec. 8, 2005, now abandoned.

(51) Int. Cl.
*G06F 13/36* (2006.01)
*G06F 13/42* (2006.01)
*G06F 13/00* (2006.01)

(52) U.S. Cl. ............... 710/315; 710/5; 710/13; 710/62; 710/105; 710/305; 711/103; 711/105

(58) Field of Classification Search ............ 710/5, 13, 710/105, 305, 315
See application file for complete search history.

(56) References Cited

U.S. PATENT DOCUMENTS 4,634,807 A   1/1987  Chorley et al.
5,450,489 A   9/1995  Ostrover et al.
(Continued)

FOREIGN PATENT DOCUMENTS

DE   198 20 479 A1   12/1999
EP   1 199 874 A    4/2002
(Continued)

OTHER PUBLICATIONS

Allman, S., "Using the HID Classes Eases the Job of Writing USB Device Drivers", *Electronic Design Strategy*, http://www.edn.com/article/CA243218.html, pp. 83-88, Sep. 19, 2002 (retrieved on Oct. 29, 2008).

(Continued)

*Primary Examiner* — Brian Misiura
(74) *Attorney, Agent, or Firm* — Brinks Hofer Gilson & Lione

(57) ABSTRACT

Methods for transmitting application specific or extended commands between a host and a memory card are disclosed. Commands for an extended card protocol are embedded in messages, along with a marker, in the data or command portion of a base card transmission protocol that is used to communicate between the host and the memory card. This allows for the transmission of application specific commands that lack a corresponding command in the base card protocol. The method can be implemented on the host side at the device driver level or the file level. In order to implement a read command in the extended card protocol, a write command in the base card protocol with an encapsulated read command in the extended protocol is first sent to a logical address, followed by a read command to the same logical address. Message set identifiers associate embedded commands and data received in separate transmissions.

30 Claims, 34 Drawing Sheets

U.S. PATENT DOCUMENTS

| | | | |
|---|---|---|---|
| 5,530,235 | A | 6/1996 | Stefik et al. |
| 5,715,403 | A | 2/1998 | Stefik |
| 5,847,698 | A | 12/1998 | Reavey et al. |
| 5,887,269 | A | 3/1999 | Brunts et al. |
| 5,897,663 | A | 4/1999 | Stancil |
| 5,956,034 | A | 9/1999 | Sachs et al. |
| 5,982,891 | A | 11/1999 | Ginter et al. |
| 5,991,399 | A | 11/1999 | Graunke et al. |
| 6,009,525 | A | 12/1999 | Horstmann |
| 6,055,314 | A | 4/2000 | Spies et al. |
| 6,073,226 | A | 6/2000 | Cutshall et al. |
| 6,226,618 | B1 | 5/2001 | Downs et al. |
| 6,314,409 | B2 | 11/2001 | Schneck et al. |
| 6,317,812 | B1 | 11/2001 | Stai |
| 6,363,437 | B1 | 3/2002 | Sassi |
| 6,385,677 | B1 | 5/2002 | Yao |
| 6,418,421 | B1 | 7/2002 | Hurtado et al. |
| 6,438,638 | B1 | 8/2002 | Jones et al. |
| 6,484,219 | B1 | 11/2002 | Dunn et al. |
| 6,502,146 | B1 | 12/2002 | Rasmussen et al. |
| 6,529,949 | B1 | 3/2003 | Gestin et al. |
| 6,546,193 | B1 | 4/2003 | Um et al. |
| 6,550,011 | B1 | 4/2003 | Sims, III |
| 6,611,358 | B1 | 8/2003 | Narayanaswamy |
| 6,697,944 | B1 | 2/2004 | Jones et al. |
| 6,704,852 | B2 | 3/2004 | Lai et al. |
| 6,738,614 | B1 | 5/2004 | Blankenship et al. |
| 6,738,905 | B1 | 5/2004 | Kravitz et al. |
| 6,745,267 | B2 | 6/2004 | Chen et al. |
| 6,757,749 | B2 | 6/2004 | Aoki et al. |
| 6,763,399 | B2 | 7/2004 | Margalit et al. |
| 6,782,414 | B1 | 8/2004 | Xue et al. |
| 6,813,725 | B1 | 11/2004 | Hanes et al. |
| 6,824,051 | B2 | 11/2004 | Reddy et al. |
| 6,832,281 | B2 | 12/2004 | Jones et al. |
| 6,876,984 | B2 | 4/2005 | Tadayon et al. |
| 6,886,036 | B1 | 4/2005 | Santamaki et al. |
| 6,886,083 | B2 | 4/2005 | Maurakami |
| 6,907,585 | B2 | 6/2005 | Kohno |
| 6,922,725 | B2 | 7/2005 | Lamming et al. |
| 6,941,405 | B2 | 9/2005 | Morrow |
| 6,944,600 | B2 | 9/2005 | Stefik et al. |
| 6,973,445 | B2 | 12/2005 | Tadayon et al. |
| 6,974,076 | B1 | 12/2005 | Siegel |
| 6,983,367 | B2 | 1/2006 | Go et al. |
| 7,023,572 | B2 | 4/2006 | Tuli |
| 7,039,727 | B2 | 5/2006 | Camara et al. |
| 7,065,591 | B2 | 6/2006 | Han et al. |
| 7,068,381 | B1 | 6/2006 | Tuli |
| 7,068,387 | B2 | 6/2006 | Ahne et al. |
| 7,093,161 | B1 | 8/2006 | Mambakkam et al. |
| 7,136,951 | B2 | 11/2006 | Deng et al. |
| 7,143,224 | B2 | 11/2006 | Leaming |
| 7,152,801 | B2 | 12/2006 | Cuellar et al. |
| 7,159,065 | B1 | 1/2007 | Marlatt |
| 7,174,445 | B2 | 2/2007 | Estakhri et al. |
| 7,181,649 | B2 | 2/2007 | Fruhauf et al. |
| 7,194,768 | B2 | 3/2007 | Kisliakov |
| 7,213,766 | B2 | 5/2007 | Ryan et al. |
| 7,222,205 | B2 | 5/2007 | Jones et al. |
| 7,222,212 | B2 | 5/2007 | Lee et al. |
| 7,225,289 | B2 | 5/2007 | Tee et al. |
| 7,237,046 | B2 | 6/2007 | Paley et al. |
| 7,272,723 | B1 | 9/2007 | Abbott et al. |
| 7,334,077 | B2 | 2/2008 | Nassar |
| 7,360,003 | B2 | 4/2008 | Toombs et al. |
| 7,697,549 | B2 | 4/2010 | Eran |
| 2001/0013021 | A1 | 8/2001 | Saito |
| 2002/0099955 | A1 | 7/2002 | Peled et al. |
| 2002/0112172 | A1 | 8/2002 | Simmons |
| 2002/0152172 | A1 | 10/2002 | Hars et al. |
| 2002/0162009 | A1 | 10/2002 | Shmueli et al. |
| 2002/0184156 | A1 | 12/2002 | Tadayon et al. |
| 2002/0185533 | A1 | 12/2002 | Shieh et al. |
| 2002/0196364 | A1 | 12/2002 | Hendricks |
| 2003/0018582 | A1 | 1/2003 | Yaacovi |
| 2003/0088868 | A1 | 5/2003 | Chang et al. |
| 2003/0093598 | A1 | 5/2003 | Park |
| 2003/0093609 | A1 | 5/2003 | Drabczuk et al. |
| 2003/0167236 | A1 | 9/2003 | Stefik et al. |
| 2003/0225765 | A1 | 12/2003 | Frieden et al. |
| 2003/0233501 | A1 | 12/2003 | Ma et al. |
| 2004/0035939 | A1 | 2/2004 | Lin |
| 2004/0039932 | A1 | 2/2004 | Elazar et al. |
| 2004/0064612 | A1 | 4/2004 | Pinto et al. |
| 2004/0093509 | A1 | 5/2004 | Elazar et al. |
| 2004/0137664 | A1 | 7/2004 | Elazar et al. |
| 2004/0193744 | A1 | 9/2004 | Paley et al. |
| 2004/0205453 | A1 | 10/2004 | Mortensen |
| 2004/0210433 | A1 | 10/2004 | Elazar et al. |
| 2005/0004875 | A1 | 1/2005 | Kontio et al. |
| 2005/0042930 | A1 | 2/2005 | Harkabi et al. |
| 2005/0044330 | A1 | 2/2005 | Elazar et al. |
| 2005/0061873 | A1 | 3/2005 | Pirillo |
| 2005/0086421 | A1 | 4/2005 | Nassar |
| 2005/0097263 | A1 | 5/2005 | Wurzburg |
| 2005/0138551 | A1 | 6/2005 | Elazar et al. |
| 2005/0149450 | A1 | 7/2005 | Stefik et al. |
| 2005/0160223 | A1 | 7/2005 | Chen et al. |
| 2005/0165997 | A1 | 7/2005 | Sakaki et al. |
| 2005/0193162 | A1 | 9/2005 | Chou et al. |
| 2005/0230483 | A1 | 10/2005 | Miller |
| 2005/0230484 | A1 | 10/2005 | Cuellar et al. |
| 2005/0289072 | A1 | 12/2005 | Sabharwal |
| 2006/0010500 | A1 | 1/2006 | Elazar et al. |
| 2006/0015673 | A1 | 1/2006 | Morrow |
| 2006/0080535 | A1 | 4/2006 | Elazar et al. |
| 2006/0084287 | A1 | 4/2006 | Miller et al. |
| 2006/0218324 | A1 | 9/2006 | Zayas |
| 2006/0285559 | A1 | 12/2006 | Cheng |
| 2007/0136501 | A1 | 6/2007 | Chang et al. |
| 2007/0168668 | A1 | 7/2007 | Chang et al. |
| 2007/0174534 | A1 | 7/2007 | Wurzburg et al. |
| 2007/0220216 | A1 | 9/2007 | Oshima |
| 2007/0233910 | A1 | 10/2007 | Paley et al. |
| 2008/0065552 | A1 | 3/2008 | Elazar et al. |
| 2008/0065911 | A1 | 3/2008 | Elazar et al. |
| 2008/0098409 | A1 | 4/2008 | Nassar |

FOREIGN PATENT DOCUMENTS

| | | | |
|---|---|---|---|
| EP | 1 209 574 | A2 | 5/2002 |
| EP | 1 304 665 | A2 | 4/2003 |
| EP | 1 376 309 | A | 1/2004 |
| EP | 1 566 726 | A | 8/2005 |
| GB | 2367925 | A | 4/2002 |
| JP | 2001-265705 | | 9/2001 |
| WO | 98/42098 | A1 | 9/1998 |
| WO | 00/60476 | | 10/2000 |
| WO | 01/07984 | | 2/2001 |
| WO | 01/69354 | | 9/2001 |
| WO | 01/93000 | A1 | 12/2001 |
| WO | 2004/031935 | A2 | 4/2004 |
| WO | 2004/086363 | A2 | 7/2004 |
| WO | 2006/057991 | A1 | 11/2005 |
| WO | 2006/110213 | A2 | 10/2006 |

OTHER PUBLICATIONS

Amy Carroll et al., "Microsoft Palladium: A Business Overview," Microsoft Content Security Business Unit, Jun. 2002, pp. 1-9.

ATA Command Extension Proposal for Media Card Pass Through Command, http://t13.org/Documents/UploadedDocuments/technical/e01121ro.pdf, dated Mar. 6, 2001 (17 pages).

Bill Pearson, Technical Marketing Engineer, "Digital Transmission Content Protection," presented Jun. 16, 1999 at Intel Corporation, pp. 1-25.

Bill Trippe, "XrML and Emerging Models of Content Development and Distribution", The Gilbane Report, Apr. 23, 2002, pp. 1-16.

"Book Locker," SanDisk, Internet Article, Feb. 6, 2005, XP002484733, 1 page.

Carol Risher, "Technological Protection Measures (Anti-Circumvention Devices) and Their Relation to Exceptions to Copyright in the Electronic Environment," http://www.ipa-uie.org/events/bookfairs/fbf2000/crisher.html, Oct. 20, 2000, 6 pages.

Clifford Lynch, "The Battle to Define the Future of the Book in the Digital World," First Monday, May 2001, pp. 1-49.

Comer, Douglas. Munson, Steven. "Operating System Design," Englewood Cliffs, New Jersey: Prentice Hall, 1989, pp. 308-309.
Communication pursuant to Article 94(3) EPC for European application No. 06 848 795.8—1245, dated Feb. 17, 2009 (6 pages).
Dennis Fowler, "Digital Rights (and Wrongs)," NW, Jun. 2002, pp. 26-31.
"Digital Rights Management for Ebooks: Publisher Requirements," Version 1.0, Association of American Publishers (AAP), Nov. 27, 2000, pp. 1-66.
"Doesn't Everybody Do It?—Internet Piracy Attitudes and Behaviors," A report on a survey conducted by SIIA and KPMG-Fall 2001, pp. 1-32.
Dr. John Manferdelli, "Digital Rights Management ("DRM")" Unified DRM Group, Microsoft Corporation, Symposium on Embedded Security, 2001, pp. 1-26.
Edited by Bill Cope and Robin Freeman, Digital Rights Management and Content Development: Technology Drivers Across the Book Production Chain, from Creator to Consumer, RMIT University, 2001, whole book (pp. v.-166).
EPO, "Office Action," mailed in European Patent Application No. 4 779 294.0 on Oct. 16, 2007, 5 pages.
EPO/ISA, "Notification of Transmittal of the International Search Report and the Written Opinion of the International Searching Authority, or the Declaration", mailed in related PCT/US2004/024166 on Jul. 25, 2005, 13 pages.
Eric Knorr, "Content Rights and Wrongs," http://Techupdate.zdnet.com, Dec. 4, 2001, pp. 1-2. Tech Update, pp. 1-2.
European Examination Report for European Patent Application Serial No. 04 723 302.8, 12 pages, Jul. 1, 2009.
European Patent Office Examination Report issued in European application No. 06848795.8, dated Feb. 2, 2009 (6 pages).
European Patent Office, "Substantive Examination," mailed in corresponding European Patent Application No. 04 779 294.0 on Aug. 9, 2006, 5 pages.
European Supplementary Search Report for European Patent Application Serial No. 04 723 302.8, 4 pages, Dec. 11, 2008.
"Extensible Rights Markup Language (XrML) 2.0 Specification," Part 1-Part V, ContentGuard, Nov. 20, 2001, 154 pages.
"Fair Usage Definition Called Key to Digital Rights Management," Communication Daily, v 22, i25, Feb. 6, 2002, pp. 1-2.
George Alexander et al., "The Road Ahead: Problems Facing the Publishing Industry Today," The Seybold Report, Apr. 22, 2002, vol. 2, No. 2, pp. 3-9.
Gordon Lyon, "The Internet Marketplace and DRM," Convergent Information Systems Division, NIST, Jul. 12, 2001, pp. 1-12.
Harvey Ardman, "Will DRM Make Digital Publishing More Profitable?" Seybold Seminars, Boston, Apr. 2001, pp. 1-2.
Humer, Caroline, "Students Set to Hit the Latest E-Books," http://msnbc.com/id/4846005/, Apr. 27, 2005, 3 pages.
"IIPA 2000-2001 Estimated Trade Losses Due to Copyright Piracy," International Intellectual Property Alliance (IIPA), Apr. 30, 2002, pp. 1-2.
Info-Tech Advisor Newsletter, "Digital Rights Management 101," Jun. 26, 2001, pp. 1-2.
Ingemar J. Cox, "Watermarking and Digital Rights Management", NEC Research Institute, Princeton, NJ, Mar. 20, 2001, pp. 1-14.
InspireD, Communication Architecture (abstract), www.inspiredproject.com, believed to be dated before Nov. 7, 2008 (7 pages).
Ipsos-NPD, "Briefing: The Online Book Marketplace," May 2001, 33 pages.
Jaehong Park et al., "Toward Usage Control Models: Beyond Traditional Access Control," SACMET '02, Jun. 3-4, 2002, Monterey, CA, pp. 57-64.
John Markoff, "Fears of Misuse of Encryption System are Voiced," The New York Times, Jun. 20, 2002, pp. 1-3.
Joshua Duhl et al., "Understanding DRM Systems-An IDC Whitepaper", www.idc.com, pp. 1-25, Dated 2001.
Joshua Duhl, "Sony Licenses InterTrusts's DRM: What Does it Mean?" IDCFlash, Jun. 2002, pp. 1-4.
Joshua Piven, "Tech vs. Tinseltown," Computer Technology Review, Los Angeles, May 2002, pp. 1-4.

Kim Zwollo, "Digital Document Delivery and Digital Rights Management," IOS Press, 2001, pp. 9-11.
Kim, Won. Lochovsky, Frederick. "Object-Oriented Concepts, Databases, and Applications," New York, New York: ACM Press, 1989, ISBN 2-201-14410-7, pp. 4-5.
"Lack of DRM Standards Impeding Broadband Demand," Audio Week, v. 13, i51, Dec. 24, 2001, pp. 1-2.
Lawrence Lessig, "The Future of Ideas," Random House 2001, whole book (pp. vii-352).
Lesley Ellen Harris, "Digital Property Currency of the 21$^{st}$ Century," published McGraw-Hill Ryerson Ltd., 1998, whole book (pp. vi-230).
Linden deCarmo, "Media Alert-New Digital Rights Technologies Protect Content Creators' Interests, But What About Users' Rights?" PC Magazine, Jun. 26, 2001, pp. 1-5, 80.
Mark Stamp, "Digital Rights Management: The Technology Behind the Hype (Draft)," Jun. 6, 2002, pp. 1-15.
Mark Walter et al., "DRM: 'Down-Right Messy' and Getting Worse," The Seybold Report, Analyzing Publishing Technologies, vol. 1, No. 3, pp. 5-15, Dated May 7, 2001.
Mark Walter, "Authentica, Alchemedia Apply DRM to Corporate Intellectual Property," The Seybold Report, vol. 1, No. 12, Sep. 17, 2001, pp. 1-4.
Martha Nalebuff, "Publisher's Dilemma," Unified DRM Core at Microsoft Corporation, Seybold, Apr. 10, 2001, pp. 1-6.
Michael Calvert, "Content Management-Timetable for Digital Rights Management," InSide Gartner This Week, No. 2, Jul. 18, 2001, pp. 1-3.
Mike Godwin, "A Cop in Every Computer," IP Worldwide, http://www.law.com, Jan. 14, 2002, 5 pages.
National Research Council, "The Digital Dilemma, Intellectual Property Rights and the Emerging Information Infrastructure," National Academy Press, Washington D.C., 2000, whole book (pp. v-340).
Nic Garnett and Tomas Sander, "Fair Use by Design-Session 3: What DRM can and cannot do and with it is or isn't doing today," 12$^{th}$ Conference on Computers, Freedom & Privacy, San Francisco, Apr. 16-19, 2002, 6 pages.
Nic Garnett, "Digital Rights Management, Copyright and Napster," Jun. 2001, pp. 1-5.
Office Action (Advisory Action) for U.S. Appl. No. 10/810,566, 3 pages, Jul. 27, 2006.
Office Action (Advisory Action) for U.S. Appl. No. 11/751,042, 4 pages, Sep. 2, 2008.
Office Action (Notice of Allowance) for U.S. Appl. No. 10/810,566, 4 pages, Feb. 21, 2007.
Office Action (Notice of Allowance) for U.S. Appl. No. 11/751,042, 6 pages, Jul. 1, 2009.
Office Action (Notice of Allowance) for U.S. Appl. No. 11/751,042, 6 pages, Apr. 15, 2010.
Office Action for U.S. Appl. No. 10/810,566, 12 pages, Apr. 14, 2006.
Office Action for U.S. Appl. No. 10/810,566, 14 pages, Aug. 10, 2005.
Office Action for U.S. Appl. No. 10/810,566, 8 pages, Nov. 2, 2006.
Office Action for U.S. Appl. No. 10/899,260, 13 pages, Jun. 2, 2008.
Office Action for U.S. Appl. No. 10/899,260, 13 pages, Feb. 11, 2009.
Office Action for U.S. Appl. No. 10/899,260, 25 pages, Sep. 26, 2007.
Office Action for U.S. Appl. No. 10/899,260, 27 pages, Jan. 24, 2007.
Office Action for U.S. Appl. No. 11/298,349, 20 pages, Aug. 23, 2007.
Office Action for U.S. Appl. No. 11/298,349, 24 pages, May 9, 2008.
Office Action for U.S. Appl. No. 11/751,042, 5 pages, Aug. 22, 2007.
Office Action for U.S. Appl. No. 11/751,042, 5 pages, Oct. 29, 2009.
Office Action for U.S. Appl. No. 11/751,042, 6 pages, Dec. 8, 2008.
Office Action for U.S. Appl. No. 11/751,042, 8 pages, May 7, 2008.
Office Action issued in U.S. Appl. No. 11/299,186, dated Aug. 23, 2007 (14 pages).
Olin Sibert, "Digital Rights Management: The Future is Secure Hardware," Electronic Design, vol. 48, i10, May 15, 2000, pp. 56.
Patricia Evans, "DRM: Is the Road to Adoption Fraught with Potholes?" The Seybold Report, vol. 1, No. 14, Oct. 22, 2001, pp. 1-3.
PCT International Search Report mailed Mar. 19, 2004, International Application No. PCT/US03/25921, 4 pages.

Renato Iannell, "Digital Rights Management (DRM) Architectures," D-Lib Magazine, vol. 7, No. 6, Jun. 2001, 10 pages.

Richard Eion Nash, "A Tale of Two E-media Hosts," http://www.hostingtech.com/sp/02_06_sp_tale_print.html, Jun. 2002, pp. 1-3.

Richard Stallman, "The Right to Read," GNU Project-Free Software Foundation (FSF), Feb. 1997, pp. 1-5.

Robert Bolick, "Pricing Digital Content," Professional Book Group, The McGraw-Hill Companies, Mar. 11, 2001, pp. 1-8.

"SanDisk BookLocker aka FlashCP DRM/Based USB Stick," Colin Dunstan & Flauzon, Internet Article, Jun. 29, 2005, 1 page.

SanDisk Frees Students from Heavy Backpacks, Press Release (Online), Jun. 28, 2005, 1 page.

SanDisk Introduces Ultra II SD Plus, a Dual-Purpose SD Memory Card with Built-In USB Connectivity, Press Release (Online), Feb. 19, 2005, XP002484735 1 page.

SanDisk Secure Content Solutions, Inc., "BookLocker™ Secure Digital Books," Product Description, 2005, 4 pages.

SanDisk, "USB CompactFlash/SD Card/MMC Test Commands", User's Guide Version 1.1, Oct. 2003 (10 pages).

SD Memory Card Specifications Part 1, Physical Layer Specification, Version 1.0, Mar. 2000, pp. 1 and 10.

Search Report and Written Opinion for international application No. PCT/US2006/061416, dated Sep. 17, 2007 (18 pages).

Search Report for Patent Application, ROC (Taiwan) patent application No. 095146174, dated Sep. 25, 2009 (1 page).

Susan Marks, "Staking Out Digital Rights; Digital Rights Management Software Addresses the Thorny E-Comm Problem of Sharing Content While Protecting Intellectual Property," Network World, Feb. 18, 2002, pp. 1-2, 70.

Terje Hillesund, "Will E-Books Change the World?" First Monday, Sep. 14, 2001, pp. 1-21.

The China State Intellectual Property Office, "First Office Action," corresponding Chinese Patent Application No. 200480026146.8 on Nov. 9, 2007, 14 pages (including translation).

"The Digital Millennium Copyright Act of 1998," (DMCA) Pub. L. No. 105-304, 112 Stat. 2860, Dec. 1998, pp. 1-18.

The MultiMediaCard System Specification Version 3.1, Jun. 2001 (131 pages).

"The Need for a Rights Language," Technical White Paper, Version 1.0, ContentGuard 2001, pp. 1-12.

"Trusted Computing Platform Alliance (TCPA)," TCPA Design Philosophies and Concepts, Version 1.0, Copyright 2000 Compaq Computer Corporation, Hewlett-Packard Company, IBM Corporation, Intel Corporation, Microsoft Corporation, Jan. 25, 2001, V. 1.0, 25, pp. 1-30.

Universal Serial Bus, Device Class: Smart Card, ICCD, Specification for USB Integrated Circuit(s) Card Devices, Revision 1.0, dated Apr. 22, 2005 (40 pages).

USB Implementers Forum, "Universal Serial Bus Mass Storage Class, UFI Command Specification," Revision 1.0, Dec. 14, 1998, pp. 1-53.

Wikipedia definition "ISO7816", retrieved from http://en.wikipedia.org/wiki/ISO_7816, retrieved on Aug. 1, 2007 (5 pages).

Yuval Levin, "Talking to Ourselves," Liberzine.com, Sep. 6, 2000, pp. 1-3.

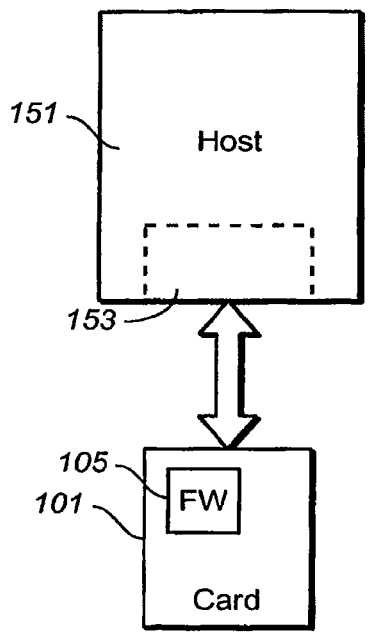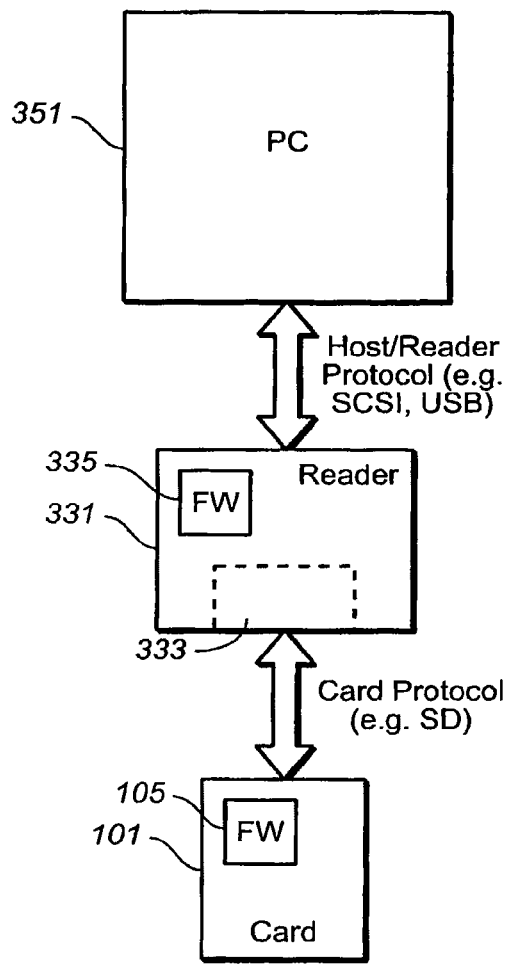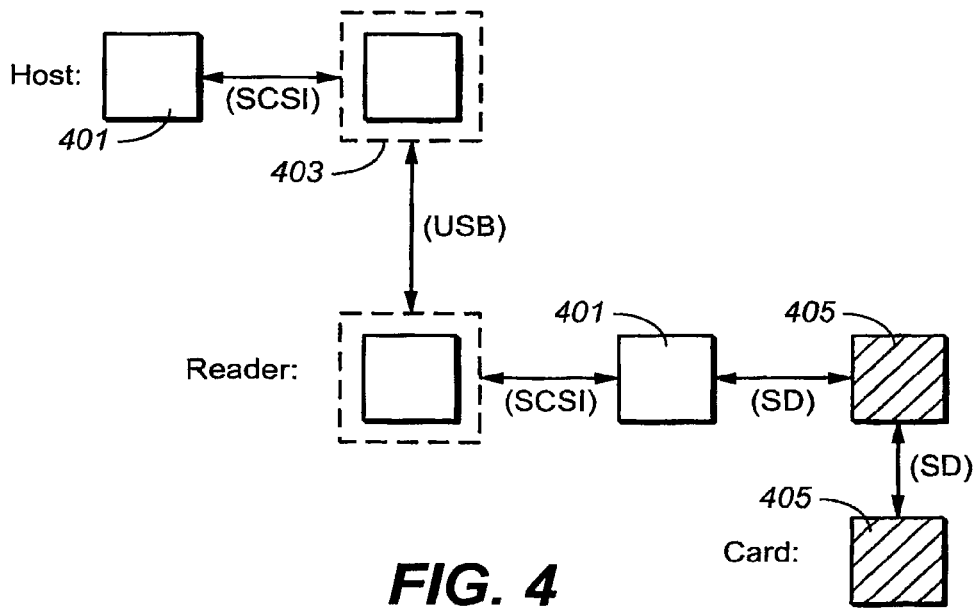
FIG. 2
FIG. 3
FIG. 4

| Byte Index | Description | Example |
|---|---|---|
| 0 | Device Application Partition ID | 0x01 |
| 1-4 | Partition Size in Sectors | 0x00005000 Sectors - 10MB |
| 5 | Partition:<br>• Closed=0<br>• Open=1 | 0x00 - Closed |
| 6-9 | Device Application Version | 0x00000000 |
| 10 | Last Device Operation Status:<br>• OK=0x00<br>• Error≠0x00 | 0x00 |
| 11-511 | Reserved | NA |

*FIG. 8*

| Byte Index | Description | |
|---|---|---|
| 0-31 | Application Pass Through Signature | "Pass Through Mode Supported" |
| 32 | Application ID | |
| 33 | Application Command Operation Code Index | |
| 34-511 | Application Command Argument Data | |

*FIG. 9*

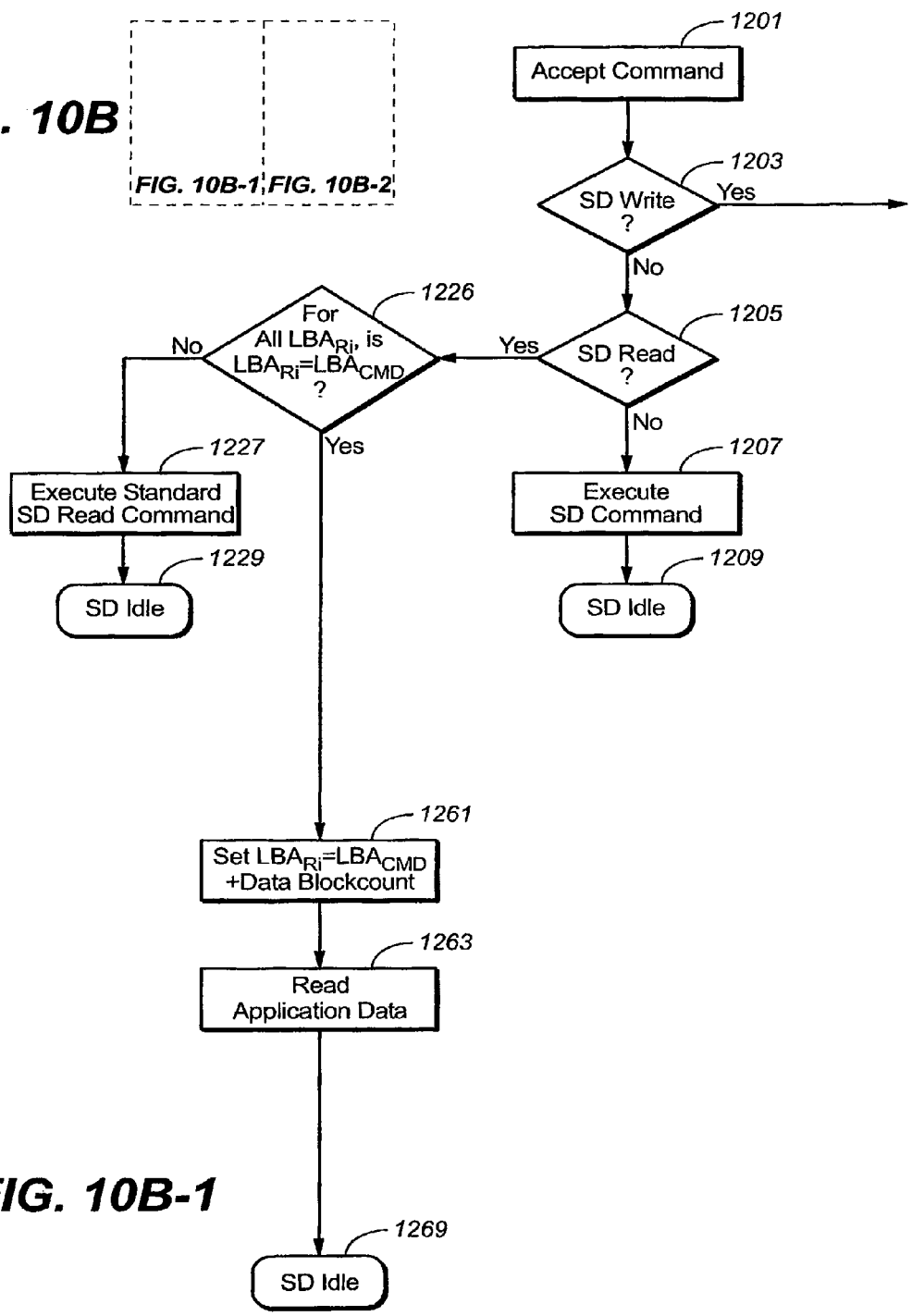

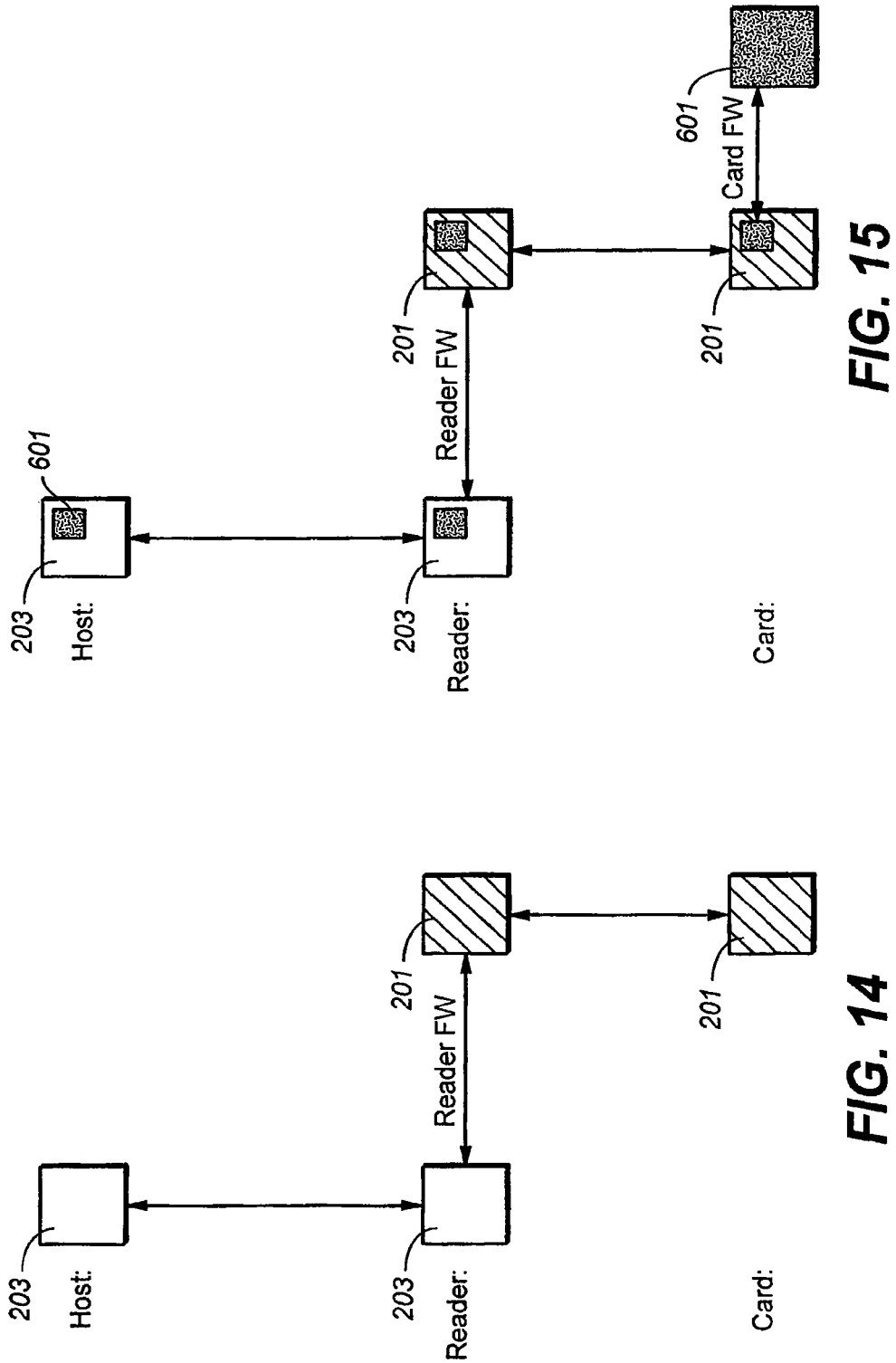

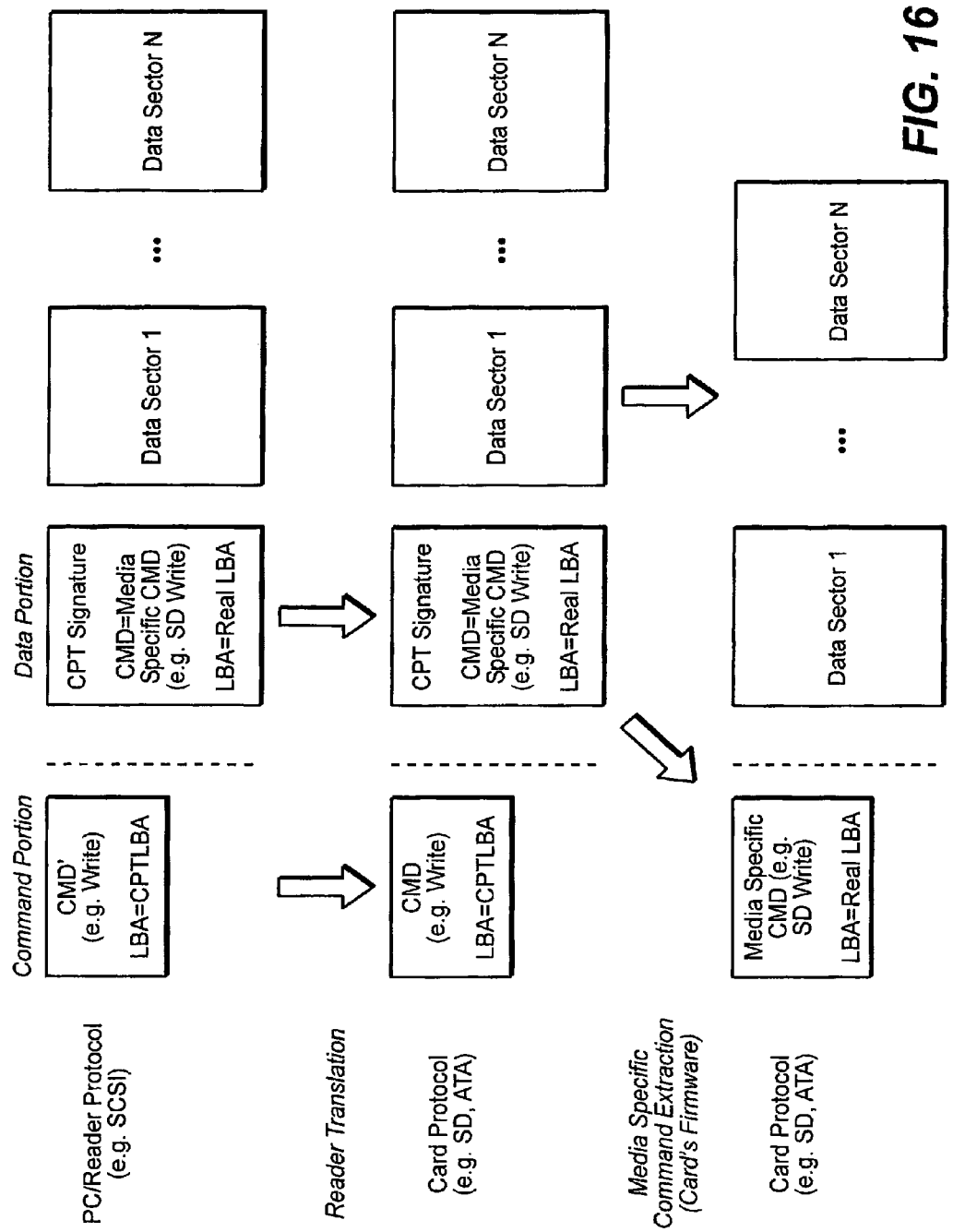

| Bit\Byte | 7 | 6 | 5 | 4 | 3 | 2 | 1 | 0 |
|---|---|---|---|---|---|---|---|---|
| 0-31 | CPT Signature ||||||||
| 32 | Command ||||||||
| 33 | Data Transfer Length (MSB) ||||||||
| 34 | Data Transfer Length (LMSB) ||||||||
| 35 | Data Transfer Length (LSB) ||||||||
| 36 | Media Card Specific Flags |||||| Data | Dir |
| 37 | Media Card Specific Flags ||||||||
| 38-47 | Reserved ||||||||
| 48-511 | Media Card Specific Command ||||||||

*FIG. 17A*

| Bit\Byte | 7 | 6 | 5 | 4 | 3 | 2 | 1 | 0 |
|---|---|---|---|---|---|---|---|---|
| 0-31 | "Card Pass Through Mod Supported" ||||||||
| 32-511 | 0 ||||||||

*FIG. 17B*

| Bit\Byte | 7 | 6 | 5 | 4 | 3 | 2 | 1 | 0 |
|---|---|---|---|---|---|---|---|---|
| 0-31 | "Card Pass Through Mode Check" ||||||||
| 32 | Command ||||||||
| 33 | 0 ||||||||
| 34 | 0 ||||||||
| 35 | 0 ||||||||
| 36 | 0 ||||||||
| 37 | 0 |||||| 1 | 0 |
| 38-47 | 0 ||||||||
| 48-511 | 0 ||||||||

*FIG. 17C*

| Bit\Byte | 7 | 6 | 5 | 4 | 3 | 2 | 1 | 0 |
|---|---|---|---|---|---|---|---|---|
| 0-31 | "Card Pass Through Mode Supported" ||||||||
| 32-511 | 0 ||||||||

*FIG. 17D*

| Bit<br>Byte | 7 | 6 | 5 | 4 | 3 | 2 | 1 | 0 |
|---|---|---|---|---|---|---|---|---|
| 0-31 | Card Pass Through Output Command ||||||||
| 32 | 1 ||||||||
| 33 | Data Transfer Length (MSB) ||||||||
| 34 | Data Transfer Length (LMSB) ||||||||
| 35 | Data Transfer Length (LSB) ||||||||
| 36 | Media Card Specific Flags |||||| 1 | 1 |
| 37 | Media Card Specific Flags ||||||||
| 38-47 | Reserved ||||||||
| 48-511 | Media Card Specific Command ||||||||

*FIG. 17E*

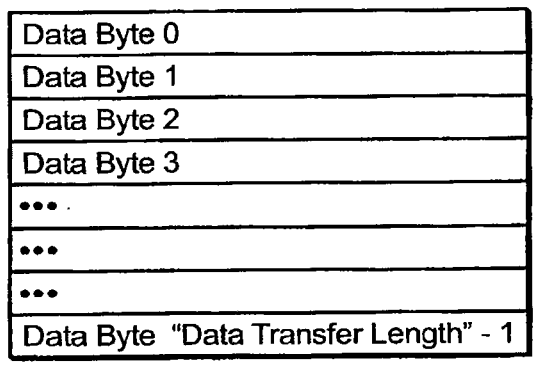

*FIG. 17F*

| Bit<br>Byte | 7 | 6 | 5 | 4 | 3 | 2 | 1 | 0 |
|---|---|---|---|---|---|---|---|---|
| 0-31 | Card Pass Through Input Command ||||||||
| 32 | 2 ||||||||
| 33 | Data Transfer Length (MSB) ||||||||
| 34 | Data Transfer Length (LMSB) ||||||||
| 35 | Data Transfer Length (LSB) ||||||||
| 36 | Media Card Specific Flags |||||| 1 | 0 |
| 37 | Media Card Specific Flags ||||||||
| 38-47 | Reserved ||||||||
| 48-511 | Media Card Specific Command ||||||||

*FIG. 17G*

| Bit<br>Byte | 7 | 6 | 5 | 4 | 3 | 2 | 1 | 0 |
|---|---|---|---|---|---|---|---|---|
| 0-31 | Card Pass Through No I/O Command ||||||||
| 32 | 3 ||||||||
| 33 | 0 ||||||||
| 34 | 0 ||||||||
| 35 | 0 ||||||||
| 36 | Media Card Specific Flags |||||| 0 | 0 |
| 37 | Media Card Specific Flags ||||||||
| 38-47 | Reserved ||||||||
| 48-511 | Media Card Specific Command ||||||||

*FIG. 17H*

| Bit<br>Byte | 7 | 6 | 5 | 4 | 3 | 2 | 1 | 0 |
|---|---|---|---|---|---|---|---|---|
| 0-31 | Card Pass Through Status Read ||||||||
| 32 | 6 ||||||||
| 33 | 0 ||||||||
| 34 | 0 ||||||||
| 35 | 0 ||||||||
| 36 | Media Card Specific Flags |||||| 1 | 0 |
| 37 | Media Card Specific Flags ||||||||
| 38-47 | Reserved ||||||||
| 48-511 | 0 ||||||||

*FIG. 17I*

| Bit<br>Byte | 7 | 6 | 5 | 4 | 3 | 2 | 1 | 0 |
|---|---|---|---|---|---|---|---|---|
| 0-31 | CPT Signature ||||||||
| 32 | Command ||||||||
| 33 | Data Transfer Length (MSB) ||||||||
| 34 | Data Transfer Length (LMSB) ||||||||
| 35 | Data Transfer Length (LSB) ||||||||
| 36 | Reserve | BLKH | APP | Response Type ||| Data | Dir |
| 37-47 | Reserved ||||||||
| 48 | Start Bit | Transm Bit | Command Index ||||||
| 49-52 | Argument ||||||||
| 53 | CRC7 ||||||| End Bit |
| 54-511 | 0 ||||||||

FIG. 17J

| Bit<br>Byte | 7 | 6 | 5 | 4 | 3 | 2 | 1 | 0 |
|---|---|---|---|---|---|---|---|---|
| 0-31 | Card Pass Through Status Read ||||||||
| 32 | 6 ||||||||
| 33 | Data Transfer Length (MSB) ||||||||
| 34 | Data Transfer Length (LMSB) ||||||||
| 35 | Data Transfer Length (LSB) ||||||||
| 36 | Reserved |||||| 1 | 0 |
| 37-511 | 0 ||||||||

FIG. 17K

| Bit<br>Byte | 7 | 6 | 5 | 4 | 3 | 2 | 1 | 0 |
|---|---|---|---|---|---|---|---|---|
| 0-31 | CPT Signature ||||||||
| 32 | Command ||||||||
| 33 | Data Transfer Length (MSB) ||||||||
| 34 | Data Transfer Length (LMSB) ||||||||
| 35 | Data Transfer Length (LSB) ||||||||
| 36 | Reserve |||||| Data | Dir |
| 37-47 | Reserved ||||||||
| 48 | Error Register ||||||||
| 49 | Sector Count Register/Feature Register ||||||||
| 50 | Sector Register ||||||||
| 51 | Cylinder Low Register ||||||||
| 52 | Cylinder High Register ||||||||
| 53 | Device/Head Register ||||||||
| 54 | Command/Status Register ||||||||
| 55-511 | 0 ||||||||

*FIG. 17L*

| Bit / Byte | 7 | 6 | 5 | 4 | 3 | 2 | 1 | 0 |
|---|---|---|---|---|---|---|---|---|
| 00-01 | \multicolumn{8}{c}{Signature Bytes} ||||||||
| 02-34 | API Signature ||||||||
| 35 | Encryption / Decryption Information ||||||||
| 36-39 | *Firmware Operation Status* ||||||||
| 40-43 | Vendor Identifier ||||||||
| 44 | Number of Instruction Pages (NIP) ||||||||
| 45-46 | Number of Data Pages (NDP) ||||||||
| 47-50 | *Data Size in Bytes (DSIB)* ||||||||
| 51 | Media Card Specific Flags |||| | Direction | | Data |
| 52 | Media Card Specific Flags ||||||||
| 53-63 | Reserved ||||||||
| 64 | Media Card I 1 - Is Protocol Supported 2 - Get Supported E/D Algorithms |||| Inquiry Commands 3 - Disable Write Protocol Support ||||
| 65-68 | *Media Card Inquiry Command Return Status* ||||||||
| 69-70 | Media Card Specific Command Length in Bytes ||||||||
| 71-511 | Media Card Specific Commands ||||||||

*FIG. 18A*

| Bit / Byte | 7 | 6 | 5 | 4 | 3 | 2 | 1 | 0 |
|---|---|---|---|---|---|---|---|---|
| 00-01 | 1973 ||||||||
| 02-34 | "Advanced Programming Interface" ||||||||
| 35 | Encryption / Decryption Information = 0 ||||||||
| 36-39 | *Firmware Operation Status = 0xFFFFFFFF* ||||||||
| 40-43 | Vendor Identifier = 0 ||||||||
| 44 | NIP = 1 ||||||||
| 45-46 | NDP = 0x0000 ||||||||
| 47-50 | *DSIB = 0x00000000* ||||||||
| 51 | Media Card Specific Flags |||||| 0 | 0 |
| 52 | Media Card Specific Flags ||||||||
| 53-63 | Reserved = 0 ||||||||
| 64 | Media Card Inquiry Commands = 1 (Is Protocol Supported) ||||||||
| 65-68 | *Media Card Inquiry Command Return Status = 0xFFFFFFFF* ||||||||
| 69-511 | 0 ||||||||

*FIG. 18B*

| Bit<br>Byte | 7 | 6 | 5 | 4 | 3 | 2 | 1 | 0 |
|---|---|---|---|---|---|---|---|---|
| 00-01 | 1973 ||||||||
| 02-34 | "Advanced Programming Interface" ||||||||
| 35 | Encryption / Decryption Information = 0 ||||||||
| 36-39 | *Firmware Operation Status* = API OP SUCCESS or Error Value ||||||||
| 40-43 | Vendor Identifier = 0 ||||||||
| 44 | NIP = 1 ||||||||
| 45-46 | NDP = 0x0000 ||||||||
| 47-50 | DSIB = 0x00000000 ||||||||
| 51 | Media Card Specific Flags |||||| 0 | 0 |
| 52 | Media Card Specific Flags ||||||||
| 53-63 | Reserved = 0 ||||||||
| 64 | Media Card Inquiry Commands = 1 (Is Protocol Supported) ||||||||
| 65-68 | *Media Card Inquiry Command Return Status* = 1 or 0 ||||||||
| 69-511 | 0 ||||||||

FIG. 18C

| Bit<br>Byte | 7 | 6 | 5 | 4 | 3 | 2 | 1 | 0 |
|---|---|---|---|---|---|---|---|---|
| 00-01 | 1973 ||||||||
| 02-34 | "Advanced Programming Interface" ||||||||
| 35 | Encryption / Decryption Information = 0 ||||||||
| 36-39 | *Firmware Operation Status* = 0xFFFFFFFF ||||||||
| 40-43 | Vendor Identifier = 0 ||||||||
| 44 | NIP = 1 ||||||||
| 45-46 | NDP = 0x0000 ||||||||
| 47-50 | DSIB = 0x00000000 ||||||||
| 51 | Media Card Specific Flags |||||| 0 | 0 |
| 52 | Media Card Specific Flags ||||||||
| 53-63 | Reserved = 0 ||||||||
| 64 | Media Card Inquiry Commands = 2 (Get Supported E/D Algorithms) ||||||||
| 65-68 | *Media Card Inquiry Command Return Status* = 0xFFFFFFFF ||||||||
| 69-511 | 0 ||||||||

FIG. 18D

| Byte \ Bit | 7 | 6 | 5 | 4 | 3 | 2 | 1 | 0 |
|---|---|---|---|---|---|---|---|---|
| 00-01 | colspan=8 | 1973 | | | | | | |
| 02-34 | colspan=8 | "Advanced Programming Interface" | | | | | | |
| 35 | colspan=8 | Encryption / Decryption Information = 0 | | | | | | |
| 36-39 | colspan=8 | Firmware Operation Status = API OP SUCCESS or Error Value | | | | | | |
| 40-43 | colspan=8 | Vendor Identifier = 0 | | | | | | |
| 44 | colspan=8 | NIP = 1 | | | | | | |
| 45-46 | colspan=8 | NDP = 0x0000 | | | | | | |
| 47-50 | colspan=8 | DSIB = 0x00000000 | | | | | | |
| 51 | colspan=6 | Media Card Specific Flags | | | | | 0 | 0 |
| 52 | colspan=8 | Media Card Specific Flags | | | | | | |
| 53-63 | colspan=8 | Reserved = 0 | | | | | | |
| 64 | colspan=8 | Media Card Inquiry Commands = 2 (Get Supported E/D Algorithms) | | | | | | |
| 65-68 | colspan=8 | Media Card Inquiry Command Return Status = 0 or Unsigned Integer Value | | | | | | |
| 69-511 | colspan=8 | 0 | | | | | | |

FIG. 18E

| Byte \ Bit | 7 | 6 | 5 | 4 | 3 | 2 | 1 | 0 |
|---|---|---|---|---|---|---|---|---|
| 00-01 | colspan=8 | 1973 | | | | | | |
| 02-34 | colspan=8 | "Advanced Programming Interface" | | | | | | |
| 35 | colspan=8 | Encryption / Decryption Information = 0 | | | | | | |
| 36-39 | colspan=8 | Firmware Operation Status = 0xFFFFFFFF | | | | | | |
| 40-43 | colspan=8 | Vendor Identifier = 0 | | | | | | |
| 44 | colspan=8 | NIP = 1 | | | | | | |
| 45-46 | colspan=8 | NDP = 0x0000 | | | | | | |
| 47-50 | colspan=8 | DSIB = 0x00000000 | | | | | | |
| 51 | colspan=6 | Media Card Specific Flags | | | | | 0 | 0 |
| 52 | colspan=8 | Media Card Specific Flags | | | | | | |
| 53-63 | colspan=8 | Reserved = 0 | | | | | | |
| 64 | colspan=8 | Media Card Inquiry Commands = 3 (Disable API Protocol Support) | | | | | | |
| 65-68 | colspan=8 | Media Card Inquiry Command Return Status = 0xFFFFFFFF | | | | | | |
| 69-511 | colspan=8 | 0 | | | | | | |

FIG. 18F

| Bit<br>Byte | 7 | 6 | 5 | 4 | 3 | 2 | 1 | 0 |
|---|---|---|---|---|---|---|---|---|
| 00-01 | 1973 ||||||||
| 02-34 | "Advanced Programming Interface" ||||||||
| 35 | API NO ENCRYPTION ||||||||
| 36-39 | *Firmware Operation Status = 0xFFFFFFFF* ||||||||
| 40-43 | Vendor Identifier = "SNDK" ||||||||
| 44 | NIP = 1 ||||||||
| 45-46 | NDP = 1 ||||||||
| 47-50 | *DSIB = 512* ||||||||
| 51 | Media Card Specific Flags = 0 |||||| Direction = 00 | Data = 1 |
| 52 | Media Card Specific Flags ||||||||
| 53-63 | Reserved = 0 ||||||||
| 64 | Media Card Inquiry Commands = API NO INQUIRY ||||||||
| 65-68 | *Media Card Inquiry Command Return Status = 0* ||||||||
| 69-70 | Media Card Specific Command Length in Bytes = 1 ||||||||
| 71 | Media Card Specific Commands = D5 ||||||||
| 72-511 | 0 ||||||||

| |
|---|
| Data Byte 0 |
| Data Byte 1 |
| Data Byte 2 |
| Data Byte 3 |
| ••• |
| ••• |
| ••• |
| Data Byte 512 |

FIG. 18G

| Bit<br>Byte | 7 | 6 | 5 | 4 | 3 | 2 | 1 | 0 |
|---|---|---|---|---|---|---|---|---|
| 00-01 | colspan="8" | 1973 ||||||||
| 02-34 | colspan="8" | "Advanced Programming Interface" ||||||||
| 35 | colspan="8" | API NO ENCRYPTION ||||||||
| 36-39 | colspan="8" | *Firmware Operation Status = 0xFFFFFFFF* ||||||||
| 40-43 | colspan="8" | Vendor Identifier = "SNDK" ||||||||
| 44 | colspan="8" | NIP = 1 ||||||||
| 45-46 | colspan="8" | NDP = 1 ||||||||
| 47-50 | colspan="8" | *DSIB = 0xFFFFFFFF* ||||||||
| 51 | colspan="5" | Media Card Specific Flags = 0 ||||| colspan="2" | Direction = 10 || Data = 1 |
| 52 | colspan="8" | Media Card Specific Flags = 0 ||||||||
| 53-63 | colspan="8" | Reserved = 0 ||||||||
| 64 | colspan="8" | Media Card Inquiry Commands = API NO INQUIRY ||||||||
| 65-68 | colspan="8" | *Media Card Inquiry Command Return Status = 0* ||||||||
| 69-70 | colspan="8" | Media Card Specific Command Length in Bytes = 1 ||||||||
| 71 | colspan="8" | Media Card Specific Commands = D6 ||||||||
| 72-511 | colspan="8" | 0 ||||||||

| |
|---|
| Data Byte 0 |
| Data Byte 1 |
| Data Byte 2 |
| Data Byte 3 |
| ... |
| ... |
| ... |
| Data Byte 512 |

*FIG. 18H*

| APDU Command | | |
|---|---|---|
| Size in bytes | Field | Description |
| 32 | APDU Command Signature | APDU Command pass through signature |
| 8 | Application ID | Application ID |
| 8 | Tag Number | Tag Number |
| 4 | Expected buffer size | Expected buffer size presented to the device during the SCSI-Write sequence. |
| 4 | APDU command Length | APDU command length |
| 456 | APDU command | Data buffer to hold APDU command |

| APDU Response | | |
|---|---|---|
| Size in bytes | Field | Description |
| 8 | Application ID | Application ID |
| 8 | Tag Number | Tag Number |
| Variable | Response Data | APDU Response Data |
| 1 | SW1 | APDU Command Status SW1 |
| 1 | SW2 | APDU Command Status SW2 |

MEDIA CARD COMMAND PASS THROUGH METHODS

CROSS-REFERENCE TO RELATED APPLICATIONS

The present application is a continuation of U.S. application Ser. No. 12/267,100, filed Nov. 7, 2008 now U.S. Pat. No. 8,078,788, pending, which is a continuation in part of U.S. application Ser. No. 11/298,349, filed Dec. 8, 2005, abandoned, wherein the entire disclosure of each of these applications is incorporated herein by reference. The present application is related to U.S. application Ser. No. 11/299,186, of Chang et al., entitled "Media Card with Command Pass Through Mechanism," filed Dec. 8, 2005, which is hereby incorporated herein, in its entirety, by this reference.

BACKGROUND

This application relates, generally, to the use and structure of removable electronic circuit cards and, more specifically, to allow personal computers or other hosts to use media specific card commands through a reader and/or host software that does not support these commands.

Recently, the small-format flash memory cards, such as the Compact Flash Card, Secure Digital (SD) Card, the Multimedia Card (MMC), xD, and the Sony Memory Stick/Memory Stick Pro, have achieved wide consumer acceptance. These devices are primarily designed for consumer electronic devices such as digital cameras and flash-memory music players. However, it is desirable that they also have convenient connections to personal computers for uploading and downloading data.

The different cards have different electrical interfaces and often commands specific to the media that can be used a host for the card. Further, card protocols may not only differ between card form factors, but also between various cards of the same form factor, since these cards are started to be overloaded with additional functions which may differ from one card to another. The commands often have unique functions such as special input-output (I/O) and security operations. As the uses of such cards become more diverse and they are used in ever more types of applications, these new applications will often involve functions or commands that are lacking in existing protocols.

Examples of commercially available non-volatile memory cards that have different mechanical and/or electrical interfaces include the related MultiMediaCard ("MMC") and Secure Digital ("SD") memory cards that are available from SanDisk Corporation of Sunnyvale, Calif., assignee of the present application. There are other cards that conform to standards of the International Organization for Standardization ("ISO") and the International Electrotechnical Commission ("IEC"), an example that is widely implemented being known as the ISO/IEC 7816 standard.

The physical, electrical, and communication protocol specifications for the MMC are given in "The MultiMediaCard System Specification" that is updated and published from time-to-time by the MultiMediaCard Association ("MMCA") of Cupertino, Calif. MMC products having varying storage capacity such as 128 megabytes in a single card are currently available from SanDisk Corporation. These products are described in a "MultiMediaCard Product Manual," Revision 2, dated April 2000, published by SanDisk Corporation, which Manual is expressly incorporated herein by this reference.

The newer SD Card is similar to the MMC card, having the same size except for an increased thickness that accommodates an additional memory chip. A primary difference between them is that the SD Card includes additional data contacts in order to enable faster data transfer between the card and a host. (A version of the MMC card with additional data contact is also available—see version 4.0 of the MMC specification cited above.) The other contacts of the SD Card are the same as those of the MMC card in order that sockets designed to accept the SD Card will also accept the MMC card. The electrical and functional interface with the SD card is further made in such a way that the sockets designed to accept the SD card can also be made to accept the MMC card. The specifications of the SD card are available to member companies of the SD Association (SDA).

Cards made according to the ISO/IEC 7816 standard are of a different shape, have surface contacts in different positions, and a different electrical interface than the MMC and SD Cards. The ISO/IEC 7816 standard has the general title of "Identification cards-Integrated Circuit(s) Cards with Contacts," and consists of parts 1-10 that carry individual dates from 1994 through 2000. This standard, copies of which are available from the ISO/IEC in Geneva, Switzerland, is expressly incorporated herein by this reference. ISO/IEC 7816 cards are particularly useful in applications where data must be stored in a secure manner that makes it extremely difficult or impossible for the data to be read in an unauthorized manner. The small ISO/IEC 7816 cards are commonly used in cellular telephones, among other applications.

As noted above, as such memory cards are used in new applications, they may have a need of functions or commands lacking in the existing version of a protocol. This situation can be illustrated with respect to FIG. 1. As shown on the upper portion of FIG. 1, the goal is the exchange of commands and data between a particular application, say in a secure data transfer or e-commerce application, on the host side and on the card side. To implement this, the commands will need to be transmitted between the host and the card, where the lower portion of FIG. 1 shows some of the software layers on the host side and some of the firmware layers on the card side. An instruction from the host's application layer will be passed through the operating system, file layer and the device (card) driver, ending up in protocol in which it can be transmitted to the card. Within the card, the instruction will then be taken up by the device layer firmware, which handles standard card operations and passed on to the application layer of the firmware. Depending on the arrangement being used, the instructions in the transmission protocol will either be exchanged directly from the host to the card or through a reader or hardware adapted, which may have its own software/firmware layers used to translate from one protocol to another. Where problems can arise is that at some stage in the translation between these layers, the intended instruction of the application may lack a corresponding command at some point along the way.

As one example, a card is often connected with a PC host through use of a hardware adapter (e.g. for USB) that accepts commands from the host system. However, many of the media specific commands are not available in the protocol by which the host and the hardware adapter communicate, even though the host application of the PC host wants to transmit these commands to the card application.

FIG. 2 shows a system of a first host and a card, where the card 101 is connectable to the host 151 either directly, for example by insertion into the slot 153, or through some sort of adapter. The card firmware is indicated by FW 105. (Both with respect to card firmware 105 and reader firmware 335 in FIG. 3, it will be understood that, more generally, these functions can be implemented in hardware, software, or some combination of these.) An example of such a host 151 could be a digital camera or a telephone. A number of types of such cards are in current use and being developed. The card and host can communicate through a number of specific protocols, many of which are specific to particular media and which may include various media specific commands. Since many of the commands may be media specific, there can be cases where, when such a command is to be exchanged between a host and the media, somewhere along the line the command will need to be translated into another protocol, which may not support the media specific command. If this other protocol does not have a corresponding command, the host will not be able to successfully issue the command.

For example, in addition to its use in a host, it is also common for a user to access a card on a personal computer. For example, it is common for a card that has been used in, say, a digital camera and want to access the photos stored in the card on a personal computer. This situation is shown by the box diagram of FIG. 3. The card 101 is typically put into communication with the personal computer PC 351 through of a card reader 331 having a receptacle 333 for the card 101, although in other cases the card may be directly attached to PC 351. The reader 331 and PC 351 will typically communicate through a protocol that, at least to some extent, differs from that used by the card 101 to communicate with the host 151. The reader 331 translates a command from the PC 351 into a form suitable for the card 101 based on firmware 335 (or hardware, software or some combination of these), where it is generally understood that this function can be performed any combination of software and hardware, depending on the implementation. This process is shown schematically in FIG. 4.

To give a concrete example, in FIG. 4 the reader 331 will be taken as a USB device that communicates with the PC 351 using the SCSI command set and the card 101 will be taken as an SD card. As the PC 351 and reader 331 uses the SCSI protocol, when the host wants to issue a command to the card through the reader, it issues command 401 in the SCSI command set. To transfer the command 401 to the reader, it is placed in an USB wrapper 403, transmitted along the USB connection to the reader, and there the USB wrapper is removed. The card reader 331 will then translate the command 401 from the SCSI command set into the corresponding command or commands 405 in the SD set, allowing it to be passed on to the card 101; however, for the reader to translate a given command between the SCSI command set and the SD command set, there needs to be an equivalent command in both sets. Consequently, if the host wants to perform, for example, a read of the secure area in the SD card by issuing a secure read command in the SD protocol, as there is no such SCSI equivalent, there is no way for the reader to translate this as it is not found in the SCSI command set and the read request will be considered to be to an area for which the user has insufficient access rights. The same situation will arrive for other media specific command for various card types where there is no equivalent SCSI command or commands for the host to send to reader in a protocol it understands.

Consequently, such a media card specific command cannot be passed to the card from the host without changing the firmware of the adapter or the reader which hosts the media card to introduce corresponding commands for the protocol it uses to communicate with the host. Similar situations can also arise, even without a separate card reader, whenever a protocol change is needed somewhere along the communication path or when the host's operating system is unaware of card features.

In dealing with this issue, typical approaches either change the adapter firmware to support special commands for passing such instructions through the adapter or create new commands in the reader-host protocol, each tailored to the specific media command such as those corresponding to send challenge, receive response and other commands in the SD card's protocol. These approaches tend to be impractical for a number of reasons. For one, the protocols are usually based on a standard which, to be useful, needs to be broadly accepted and usually tends to prefer less complicated command sets. Consequently, it is difficult to introduce various new, media specific commands into the protocol command set as new media are introduced and existing media evolve. If instead the adapter's firmware is changed to allow for special commands to pass through those media specific commands that it does not itself support, the software of each vendor for such adapters would need to accept and make the appropriate firmware changes.

More generally, even when the card is in direct connection with the host, card protocols need to be updated as new card commands are introduced, such as application specific commands. For example, the MultiMediaCard System Specification may define a card protocol containing a set of commands that may be transmitted directly to a MultiMediaCard. If there is a need for a new command, the specification or standard may need to be updated to support the additional command. Although existing protocols can be expanded and standardized to incorporate the new functions, this introduces compatibility problems with older card versions or cards manufactured by other vendors, largely undermining the utility of a standardized protocol. Additionally, some card protocols may not be easily modified to accommodate additional commands. For example, if a card protocol utilizes six bits of information to encode a command, then the card protocol may only define a command set having 64 commands. If there is a need to support more than 64 commands, the card protocol may need to be modified or redesigned to extend the command set. Further, although the protocols may be adapted to incorporate new commands, this is likely to only be a temporary solution as ever more applications arise to extend the uses of cards.

SUMMARY

Therefore, briefly and generally, it would be advantageous if a personal computer could utilize the various media specific commands without having to change either the card reader's firmware or the host-reader protocol. It would also be advantageous for cards to be capable of supporting additional commands, such as media-specific commands, without modifying the existing card protocol in a way that renders the card incompatible with other cards or inoperable with existing host systems and card adaptor hardware.

Various embodiments of the present application introduce an approach whereby a storage device such as a memory card can exchange new application specific or media specific commands with a host. The host and card can either communicate directly or through a reader or hardware adapter. The new application specific or media specific commands can be transported through a command protocol that does not have an equivalent of the media specific command. For example, in one embodiment, a PC can read the secure data area of an SD (Secure Digital) memory card using a secure read command transmitted through a card reader, even though the command set of the card reader does not support such a command.

Various embodiments of the present application also introduce an approach whereby a command set of a memory card can be extended without changing the existing card protocol used to exchange commands and data with the host.

More specifically, the host may encapsulate messages containing media or application specific commands in commands of a protocol that is supported by the communication path between the host and the card. To this end, the host can embed the actual media or application specific commands in a command of the supported protocol. In an exemplary embodiment, a message containing a media specific command for the extended protocol is embedded in the data portion of the command of the existing protocol. The card then receives the command using the existing card protocol through which it communicates with the host. The message is extracted from the command, and the application specific command inside the message is executed by the card. Thus, messages (and application specific commands in an extended card protocol) are passed between the host and card in a transparent manner using the existing (base) card protocol. For example, the transmission protocol just passes on to the card a command and what it considers to be data, when the data may actually contain a message with the media specific command. Once in the card, the card recognizes that the application specific command is encapsulated in a message within the data field of the received command and proceeds to extract the message, and the encapsulated command. The message may also contain encapsulated data that may be extracted by the card. The memory card may then execute the encapsulated command.

Other embodiments and features and advantages thereof are possible and will be, or will become, apparent to one with skill in the art upon examination of the following detailed description and accompanying drawings. Hence, it is intended that the scope of the claimed invention as recited in the claims below will not be limited to the embodiments shown and described herein

BRIEF DESCRIPTION OF THE DRAWINGS

FIG. 3 is a block diagram of a system where the card communicates with another host using a reader or hardware adapter.

FIG. 4 is a schematic representation of the prior art techniques for the transfer of data and commands in the system of FIG. 3.

FIG. 8 shows the information contained in response to a partition status command.

FIG. 9 shows an exemplary format for the argument data sector.

FIG. 14 is a simplified version of FIG. 4.

FIG. 15 is a schematic representation of techniques for the transfer of data and commands in the system of FIG. 3 according to aspects of an exemplary embodiment.

FIG. 16 provides details of FIG. 15 according to particular embodiments.

FIGS. 17A-L give specifics of the structure of the embodiments for FIG. 16 for a number of commands.

FIGS. 18A-H are similar to FIGS. 17A-L for a file level embodiment.

FIG. 20A shows a placement of an APDU command and data within a file data structure transmitted between a host and a device.

FIG. 20B shows a placement of an APDU response within a file data structure transmitted between a host and a device.

DETAILED DESCRIPTION OF THE PRESENTLY PREFERRED EMBODIMENTS

Figure 1:
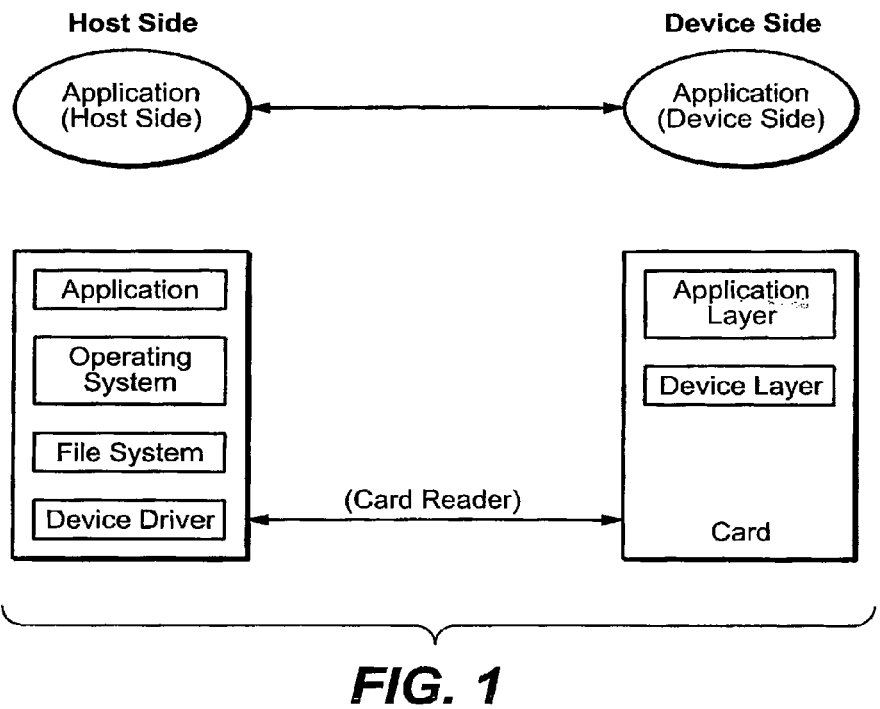
FIG. 1 is a schematic representation of the layers of a host-card system.

In a primary aspect, the following embodiments allow for commands that are not part of the standard card protocol (or are not supported by standard OS on the host) to passed back and forth between the application on the host (typically as the software that uses the application on the card) and the application on the card (typically as the card's firmware implementing these additional features as a specific application on the card). The exemplary embodiment accomplishes this by embedding the special commands in a standard command, such as a write, that a typical host supports. This allows memory cards, such as described in the Background section, to be recognized, interfaced, and used, on standard host devices and PCs while allowing additional, non-standard features that are not supported as a standard to be incorporated into the system.

A host or PC in communication with the card may encapsulate messages containing media or application specific commands in commands of a protocol that is supported by the host and the card. For example, a message containing a media specific command for the extended protocol is embedded in the data portion of the command of the existing protocol. The memory card then receives the command using the existing card protocol through which it communicates with the host. The memory card extracts the message from the command, and the application specific command inside the message is executed by the card. Thus, application specific commands in an extended card protocol may be passed between the host and card in a transparent manner using the existing (base) card protocol. The transparency is achieved because the transmission protocol sends to the card a command and what it considers to be the accompanying data. The data, however, may actually contain a message with the media specific command.

Once the command is received in the card, it recognizes that the application specific command is encapsulated in a message within the data field of the received command and proceeds to extract the message, and the encapsulated command. This is done by determining that the data portion of the received command contains a marker, which may also be referred to herein as a signature. If the marker is found, the message is extracted, and the encapsulated command in the message is extracted and executed. If no marker is found, the received command is executed. In the exemplary embodiment, the signature and encapsulated command are placed in the first sector of the data portion of the received command. The presently preferred embodiments may be implemented on the device side, where the encapsulated command is extracted, and in the host side, where the message containing encapsulated command is embedded in the data field of a command either at the device driver level or the file system level. In one implementation at the device driver level commands containing messages with encapsulated commands are directed to a specific logical block address. In another implementation at the file level, where the message is transmitted to the card in as file data that is part of a write command, any logical block address can be used. Although the device driver level implementation requires less overhead, in many operating systems it may require access privileges that the user lacks.

This approach is not limited to the case of a card protocol having commands without equivalents in the protocol used between a host and a hardware card reader. Indeed, this approach applies also in cases where an transmission protocol needs to carry a command that it lacks. In a first exemplary embodiment, the card can communicate directly with the host in the base card protocol supported by the card, but the card (or other device) has an application with an additional set of features that require an additional set of commands to be used. These commands are not part of the base card protocol used by the host and card to communicate or are not supported by standard operating system on the host. Application commands that are part of this extended card protocol, or extended command set, can be passed back and forth between the application on the card (implementable at firmware level) and the application on the host (implementable at software level). Specifically, in one implementation, the application commands are encapsulated in messages transmitted in the data portion of a command formatted according to the base card protocol. A message may be retrieved from the file data written to the memory card, and set of commands related to opening, closing, and managing a path (an open file used for transmitting encapsulated commands within file data) between the host application and the memory card or non-volatile storage device can be utilized to facilitate the transfer of encapsulated commands.

In a second exemplary embodiment, the approach of transmitting messages containing encapsulated commands is implemented at the device (card) driver level. A command is directed to a specific logical block address (LBA), a Card Pass Through (CPT) Mode LBA, and the command contains a special signature in the data sector to notify the card that a message having an encapsulated command is contained in the sector data associated with the command. This can be implemented as a change in the card's firmware so that it supports the CPT mode. Indeed, instead of changing the adapter firmware according to each media specific command, the embodiment is implemented by changing the card hardware, software, or firmware, thus allowing the card reader or adapter to interface with any card without the need to change its firmware. Similarly, a card can interface with any reader or adapter without having to modify the reader or adapter to support the encapsulated commands in the extended command set, and it can work with any operating system (OS) without the need to change the host OS.

Even then, the card firmware continues to honor the normal read/write command that are part of the existing command set in the base card protocol. When a read/write command occurs to a specific LBA offset, a signature is checked to determine if the data contains a message with embedded media card specific commands formatted according to an extended card protocol. As mentioned, the extended card protocol can be implemented in the firmware of any media card and it does not require firmware change to the adapter or the USB or other reader or host OS.

A third exemplary embodiment is implemented at the file level on the host side. The media specific command is again embedded in the transmission protocol, such as the base card protocol defined by a standard implemented by the card, but rather than relying on the hardware specifics and referencing particular protocols, the message containing the encapsulated command any accompanying data are all placed into the data portion of a file which is then transferred to the card or non-volatile storage device, where the hardware, software, or firmware in the card again detects the message in the received file data and extracts the encapsulated command. In these embodiments, the host simply tells the file system to write a file to memory card, where the command formatted according to the extended command protocol is embedded in the message placed in the data portion of the file. The file may be written to any logical block address, as opposed to a specific logical address, and the device checks for a signature in the incoming file data to determine if the file data contains embedded media card specific commands. In one implementation, the signature is placed in the first sector of data of any file containing such a message. If the appropriate signature is found by the memory card, the message is extracted from the file data, and the encapsulated command (and any associated encapsulated data) is extracted from the message. If no signature is found, the command writing the file data is interpreted as a standard file write command of the base card protocol. In this way, this file level exemplary embodiment circumvents any privileges that may be required in order to direct a command to a specific logical address in the memory card (a requirement of the second exemplary embodiment), as no special privileges are required to writing a file to a memory card in most operating systems.

In a fourth exemplary embodiment the file level embodiments for transferring encapsulated commands and data are extended to allow the card to associate messages received in separate file write operations. The host creates a message that includes an encapsulated command, and possibly encapsulated data. The message is inserted into file data to write to the memory card. In addition to the message, the host includes a message set identifier in the file data to write. The message set identifier allows the host to identify messages that may be part of a sequence of messages that should be associated with one another by the card. For example, a useful command sequence may comprise three encapsulated commands. The three encapsulated commands are placed within three separate messages. These three messages are transmitted to the card in three separate file write operations to the card. To associate these messages with one another, the host includes an identical message set identifier in the file data of each of the three file write operations. When the card identifies that the received file data contains a message, the card checks for the message set identifier, and associates the received message with previously received messages having the same message set identifier. The message set identifier may also allow the host and card to associate a message transmitted to the card (containing an encapsulated command) with a message returned by the card with file data read by the host (containing encapsulated result data that may be the result of executing the encapsulated command within the card). In this way, the message set identifier allows the host to associate encapsulated commands transmitted to the card in file data written to the card, with encapsulated result data received from the card within file data read from the card.

In a fifth embodiment, embedded commands and data can be exchanged between a host and memory card using Universal Serial Bus Mass Storage Class messages transported between the host and memory card according to the USB bulk transfer protocol. The Universal Serial Bus Mass Storage Class defines a method to send command messages in a storage protocol to a memory card, and to exchange data associated with the commands. These commands messages are typically used to read data from and write data to a mass storage device such as a memory card. A memory card may receive the command message and extract a storage command formatted according to a storage protocol. The storage command may be processed by a storage command processing unit, for example, to read data from or write data to the memory card. In this embodiment, the host may insert an embedded marker and an embedded command in the command message, and transmit the message to the memory card. The memory card may identify the embedded command by identifying the embedded marker. When the embedded command is identified, the memory card may extract the command and send it to a embedded command processing unit for execution. Thus, the USB Mass Storage Class command messages directed to the memory card may define commands for two processing units: a storage processing unit, and an embedded command processing unit. In one implementation, the embedded processing unit processes ISO 7816 formatted APDU commands and data, explained in more detail below. Embedded data associated with the embedded command may be transmitted and received in data messages sent to or received from the memory card in the data phase of a USB bulk transfer protocol exchange.

In some of the exemplary embodiments, the embedded command is placed in the data portion of a write command in the transmission protocol or base card protocol supported buy the memory card. For example, write command of, say, N sectors in the device or application specific protocol would consist of a write command in the transmission protocol having (N+1) sectors of data, the first sector containing the actual, embedded write command and the remaining N sectors the actual data to be written. More generally, the command (and signature), along with any data to be transferred to the device by embedded command, can be placed in any command that accepts an associated data portion. To implement a read or other command in the device or application specific protocol that requires data to be transferred from the device to the host, the exemplary embodiment use a pair of commands: the first command will again be a write command in the transmission protocol with one sector of data, corresponding to the embedded read command (and no real data associated with the embedded read); the actual transfer of data from the device to the host is then effected by a second command, a host read addressed to the same logical address as the first command.

Figure 10A:
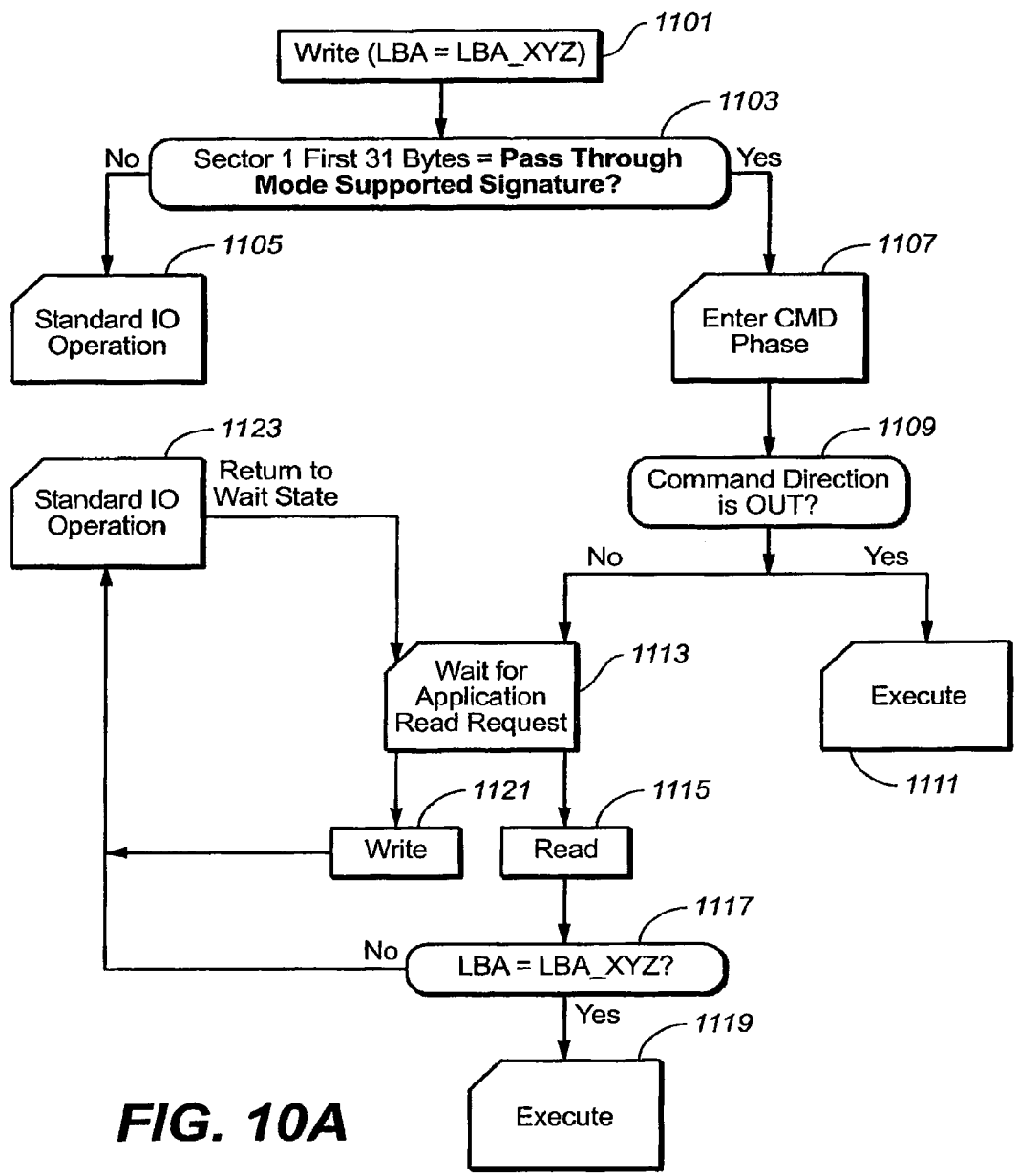
FIGS. 10A and 10B show host side communication flows.
Figures 2, 10B:
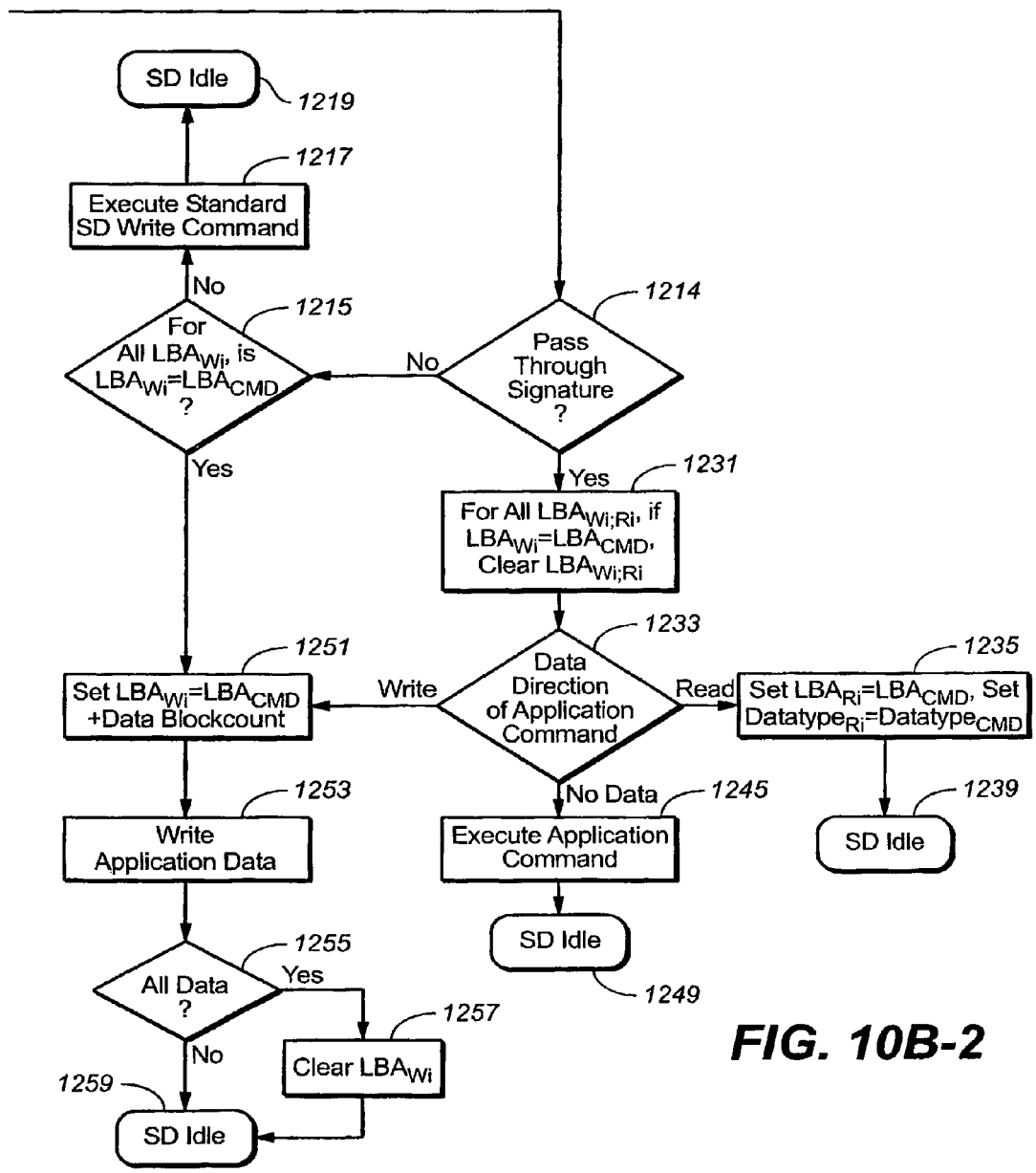
FIG. 2 is a block diagram of a host-card system.

As a concrete example, referring to the specific case discussed in the Background with respect to FIGS. 2-4, these methods allow commands specific to an SD card, such as a secure read, to be transmitted through a USB protocol, which lacks an equivalent command. In general terms, this is accomplished by forming an instruction that consists of a command portion, which exists in the transmission protocol, and a data portion, in which is embedded the media specific command. For example, as a write command is basic to any memory card system, it will exist in the transmission protocol and has an associated data part. The actual application specific command is placed in the data part along with a signature to indicate that the media specific command is to be executed. Any data associated with the actual, embedded media specific command that is to be transferred to the device is also placed in the data portion of the transmission protocol's command. For the SD/USB example, to send a write read of ten sectors to an SD card within the USB protocol, an instruction is issued in the USB protocol composed of a command and eleven sectors of data: the first data sector contains the actual SD secure write command, along with a signature and related information, and is followed by the ten sectors of data to be written. When received in the card, the firmware extracts the actual secure write command, checks the signature, and executes the read of the data.

For reads (and other commands that transfer data from the device to the host), a write command in the transmission protocol can again be used to carry the embedded read command, but, as this has no provision for data to be transferred back to the host, it is now paired with a second, read command in the transmission protocol. More specifically, the first command of the pair will be a write (in the transmission protocol) from the host with an embedded read command to a logical block address LBA=XYZ. In an implementation at the device driver level, it will be to a particular address, while for a file level implementation, this can be any address. The second command of the pair is then a standard host read to this same address, LBA=XYZ. The specified data is then transferred to the host.

More generally, the present embodiments allow application or media specific instructions to be exchanged between host and card by embedding the desired command, along with any accompanying data, within an instruction of an intermediary or transmission protocol that is usable by the system. The specific commands are resolved between the specific application running on the host on one side and corresponding application on the specific card on the other. At intermediate points along the transmission path, the instruction appears as normal command with the intermediate protocol, the actual application specific command being passed through in a transparent manner. In this way, it can be said the application specific command is part of an extended card protocol that extends the actual command set that the card supports. In the exemplary embodiments, this is done by using a command in the transmission or base card protocol that accepts a data portion, such as a write command, and embedding the actual application or media specific command in this data portion. When the instruction (in the transmission protocol) arrives at the card, the data portion is checked to see whether it contains an appropriate signature and, if so, the embedded command is extracted. This is shown schematically in FIG. 5.

Figure 5:
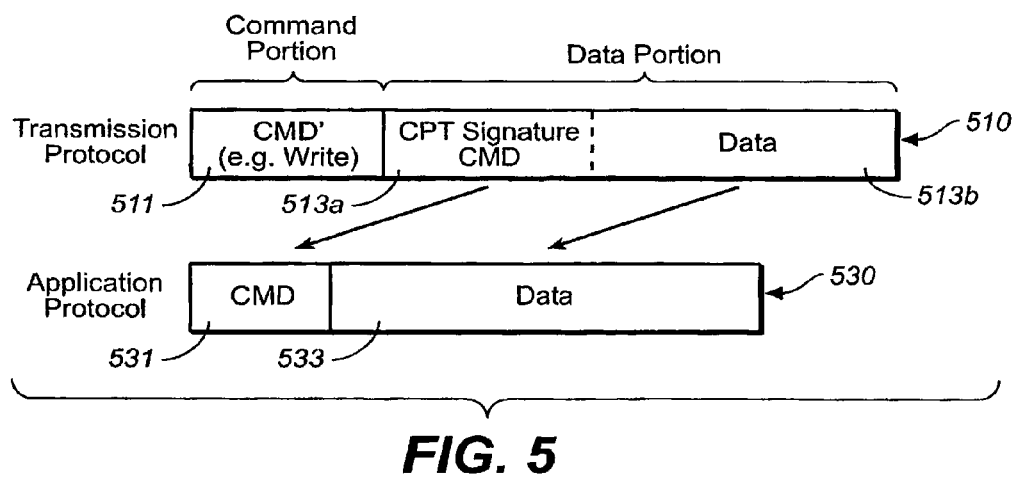
FIG. 5 shows how application specific commands can be embedded according to an exemplary embodiment.

FIG. 5 is an exemplary schematic representation of how an application specific command is embedded within the protocol used to pass the protocol from the host application to the card side of the application. Consider the case where the application or media specific instruction has a command portion, CMD, and some corresponding data. For example, CMD could be an application specific write. To transmit this instruction, the host side will take a command in the transmission protocol, call it CMD', that has a corresponding data portion, for example a write command. Whatever is placed into the data portion of this instruction will simply passed through; consequently, if the actual intended application specific command CMD (along with its corresponding data) is embedded in this data portion, it will be transmitted to the card even if the command CMD is not recognized in the transmission protocol. Once in the card, the command CMD will need to extracted from the data portion. This is done by placing a card pass through signature (CPT signature) into the data portion as well: When an incoming instruction arrives on the card, the data portion is checked for the signature and, if found, the actual command is then extracted.

In FIG. 5, the instruction in the transmission protocol containing the embedded command is shown at 510. The command portion 511 has command CMD' and can be considered a sort of "dummy" command that will not actually be executed, but serves to pass the data portion 513 to the card side. The data portion 513 can be broken down into a first part 513a with the signature and the actual or encapsulated command CMD and a second part 513b of the any encapsulated data corresponding to CMD. For example, if CMD is a type of write command, 513b would be the data to be written, while if it were, say, a status check 513b would be absent. (As described further below, an embedded read command is somewhat more involved as, in this embodiment, it involves sending a write command CMD' in section 511 of the transmission protocol with the embedded read command CMD in section 513a of the data portion and no real data portion 513b.) On the card side, 513a is then checked for a signature and if not found the command CMD' is executed with all of 513 as data. If the signature is found, the actual instruction 530, having command portion 531 with command CMD and any corresponding data in data portion 533, is extracted. (In protocols that have sufficient room in their command portion 511, such as the SCSI protocol, it is also possible to embed the CPT signature, the command CMD, or both in the command portion of the transmission protocol rather than in the data portion.)

Referring briefly to FIG. 1, the host side of the application can communicate with the card side even if they need to communicate with each other using, somewhere along the path, a protocol not adapted to the application. This can be the case when an adapter is unaware of card features, as described in the Background, but also when the host operating system is unaware of card features. This solves the issue of media or application specific commands both for systems with or without a host adapter that resides between the host and the card. Further, it allows for the case where the card protocol may not only differ between card form factors, but also between various cards of the same form factor as these cards are becoming overloaded with additional functions which may differ from one card to another. The presented arrangement allows for a system where the card adapter and the host OS are indifferent to the specific card protocol, with the specific commands being resolved between the specific application running on the host on one side and the specific card on the other.

On the host side, some implementations can be at the file system level, where in the file mode the application is using the host file system and writing to files, and other implementations can be at the device driver level, in a mode using the device driver. Particular examples of both versions are given below. Which type of embodiment is preferable will often depend on specifics such as the particular application and details of the operation system. For example, an implementation at the device driver level often is simpler and requires less software/firmware overhead, but uses writing directly to a logical address; however, such a directed write requires administrator privileges that a user will lack. By instead using an implementation at the file system level can avoid these complications, but at the cost of additional overhead.

Several of the contemplated implementations are illustrated below by a more detailed description of five specific embodiments. All of these allow special, nonstandard features to be implemented in the card to be used on the host without changing the host card protocol to support the new features or while using it through intermediate software/hardware that does not support the additional protocol. The second and third sets of embodiments describe two methods implemented on the host side (at the device driver level and file system level, respectively) while the first describes the card side implementation. This first embodiment complements the second and third and describes how the card side operates and will also be used to provide more general detail for all of the embodiments. The fourth embodiment demonstrates how embedded commands may be directed to a separate processing unit within the card, and how embedded commands and data received in separate file transmissions may be re-assembled or re-associated with each other after receipt. The fifth exemplary embodiment demonstrates a method of placing embedded commands within the command field of instructions transmitted to a card. As described more in the following, this is done using standard available commands to envelop the nonstandard commands. For each of these cases, the exemplary embodiment chooses a standard read write, which is supported everywhere. It should be noted that, in these particular embodiments, the card need not recognize the concept of files as in all of these embodiments the card sees a write to a particular logical block address (LBA). This LBA can either be specifically allocated (or reallocated) for this purpose, as in the device driver mode, or any address, in the file driver mode. The main difference is on the host side where, in the file mode, the application is using the host file system and writing to files, whereas in the first mode it is using the device driver and writing directly to an LBA.

In the following, the various aspects are presented in examples of a number of specific embodiments. For example, the embodiments have embedded the media specific command in the data portion of a write command; more generally, the media or application specific commands can be embedded in other commands. Also, the discussion in the Background was based on a particular hardware arrangement with specific protocol domains; namely, where the PC/host communicates with the card through a hardware reader using one protocol between the host and the reader and a second protocol between the reader and the card. These embodiments can all be generalized and extended in a number of ways.

The Background discussion focused on examples where the card and PC communicate through a reader. More generally, the various aspects of the embodiments apply when, somewhere in the path between the host (e.g., PC) and the ultimate destination, a protocol is used that does not have the equivalent of one or more commands that need to be transmitted. As noted, besides the problem arising when the hardware card reader communicates with the host in a protocol (e.g., USB/SCSI) with no equivalent of media specific commands in the cards protocol (e.g., secure read in the SD card) that the host wishes to send to card, it can also occur when then card is attached directly to a host. In more complex cases, there may be several intermediate protocols, in which case several layers of embeddings could be used, as will be seen in the second example.

As one particular example of when there need not be a separate card reader, there exist cards with two sets of contacts, one for use with an USB port and another for a standard set (MMC, SD, CF, etc.) of card contacts. With the "normal" card contacts, the card can communicate with a first host according to the card specific protocol allowing the media specific commands. With the second set of contacts, in this case, USB contacts, the card may communicate with another host, such as a PC, in another differing protocol that lacks equivalents of the media specific commands. In this case, by embedding the media specific commands according to the presently preferred embodiments, the USB contacts of the card can be connected directly to a PC at an USB port, and this USB connection between the host and the card may facilitate communication in the SCSI protocol, where SD specific commands may be embedded in the SCSI protocol as described above and transported over the USB connection between the host and the card.

As noted, in a set of embodiments of particular interest the host and the card communicate in the protocol of the card, but a host application may want to exchange commands and data with an application on the card in a layer of which the "usual" memory functions of the card are unaware. For example, with an SD memory card can be a device application layer partition hidden from the SD specific firmware layer. The host and card will communicate using the standard SD protocol, but the hidden device application can communicate with the corresponding host application by embedding application specific commands within the SD protocol. The first exemplary embodiment is of this nature.

The exemplary embodiments embed the media specific or application specific commands within a write command. A write command is used as the examples embed the command within the data portion of the transmission protocol and a write command inherently has a data portion. More generally, not just a write command but any command that accepts a data portion may similarly be utilized. Since a write is a basic instruction in a protocol to transfer data, the exemplary embodiments below will continue to be described in terms of a write. Additionally, although in all of the examples the media or application specific commands are embedded at the beginning of the data portion for simplicity, more generally they may be placed elsewhere in the data portion and be identified by the signature. As noted above, more generally, the signature, the application command, or both may also be embedded in the command portion of the transmission protocol in protocols, such as the SCSI protocol, that have sufficient room in their command portion.

The problem can be presented at a more abstract level. Consider where the host application needs to communicate with the device application in a transmission or base card protocol having a set of commands ($\alpha, \beta, \gamma, \ldots$), but somewhere in the communication path another protocol having a set of commands (A, B, ...) needs to be used. In the example of the Background, ($\alpha, \beta, \gamma, \ldots$) would be the SD protocol and intermediate command set (A, B, ...) would be the SCSI protocol. In the discussion below, ($\alpha, \beta, \gamma, \ldots$) would be the command set for the particular application (such as the hidden partition) and (A, B, ...) would instead be the card command set. As long as there is a correspondence $A \Leftrightarrow \alpha$, $B \Leftrightarrow \beta$, and so on, there is no problem. The difficulty arises when there is a media or application specific command $\gamma$, say a secure read in the SD protocol, with no equivalent in the intermediate protocol: $? \Leftrightarrow \gamma$. Under the prior art, a new command equivalent to $\gamma$, say $C \Leftrightarrow \gamma$, would need to be introduced for each such $\gamma$. Instead, according to the presently preferred embodiments, rather than introduce a new command, the media specific command is embedded in an existing command in the intermediate protocol, $A(\gamma) \Leftrightarrow \gamma$, where $A(\gamma)$ represents a write, say, command with $\gamma$ embedded.

In a generalization, a command F is introduced into ($\alpha, \beta, \gamma, \ldots$) protocol to open a pipe for the host and device sides of the application to communicate. Once the pipe is opened, the media or application specific commands can then be sent. This can be represented as $A[F(\gamma)] \Leftrightarrow \gamma$. This technique will be developed in the first example. This allows for handling command failures and other subtleties. The problem with a command failure is that the intermediate protocol has no knowledge of the nature of the embedded or extended command since, as far as the intermediate protocol knows, it is sending a simple write command. If the embedded command is a read, for example, the PC will not know what has occurred in the event that the read fails. In the intermediate protocol, it will be seen as a write fail and not be interpreted as a failure of the embedded read; consequently, the host will not understand the appropriate recovery steps to execute. By opening a pipe between the host and card sides of an application, such difficulties can more easily be tracked and dealt with. Although the foregoing discussion is primarily in terms of an SCSI and SD protocols, it will be appreciated that is applies more generally to other protocols. For example, the MMC protocol or the ATA protocol may be utilized in place of the SD protocol.

First Exemplary Embodiment

The first exemplary embodiment is implemented at the file level on the host side; on the card side, the implementation is largely the same whether host side is implemented at the file or device driver level. When reference is made to a particular application for this embodiment, it will be given in the context of a hidden partition on the memory card, where the memory is divided into publicly accessible portion and a private, or "hidden", portion. The host side portion, in particular, the device driver, will be described first, followed by card details.

Figure 6:
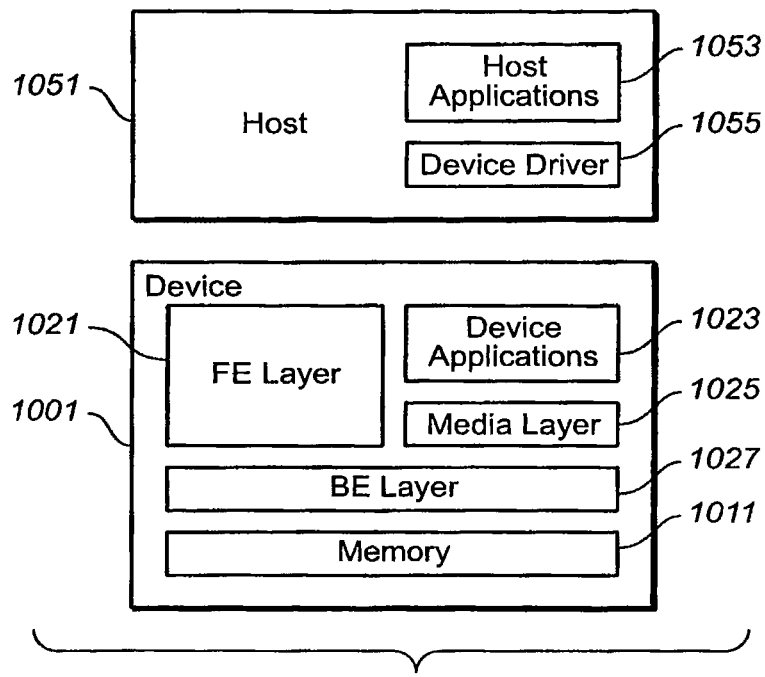
FIG. 6 is a block diagram showing an exemplary structure for the relation of the firmware layers.

FIG. 6 is a schematic block diagram showing an exemplary structure on the device side. On the card 1001 side, the Device Application or Applications 1023 each provide a gateway, or "pipe", for the Host Application or Applications 1053 on the host side 1051 to a non standard, for this specific form factor, card feature, here the hidden partition. The host side layers are described more in FIG. 7 below. On the card side, a device application 1023 supplies partition read and write access, status, and other device application information. The device application 1023 can communicate with the host application 1053 via the exemplary protocol described in the following and use the card's systems and memory resources through the Media layer 1025. The memory itself is indicated at Memory 1011 and will commonly be a Flash memory of the NOR or NAND variety, although other non-volatile memories are contemplated. FE (Front End) Layer 1021 is the firmware layer that handles the commands in the card type interface such as the CF, SD, MMC, etc. protocol from the host side. BE ("Back End") Layer 1027 is the firmware layer that handles the management of Memory 1011, including reads and writes to the memory. The Media Layer 1025 connects the Device Application firmware 1023 with the BE Layer 1027 and will also interface the application firmware with the RAM resources of the controller, which is not specifically shown in this view.

When an instruction is sent from the host 1051, it is initially received on the device 1001 at the front end (FE) layer 1021. The command will be in the intermediate protocol used between the host and device, for example the SD protocol. When the command arrives at the FE layer 1021, it is checked for a command pass through signature: if no signature is found, the instruction is treated as a standard instruction from the intermediate protocol and can access the memory or otherwise be executed in the standard manner; if the signature is found, the message containing the embedded application specific command also referred to herein as an encapsulated command, is extracted and passed on to appropriate device application 1023 for execution. When implemented (on the host side) at the device driver level, as in the second exemplary embodiment below, the command will be addressed to a specific logical address, while when implemented on the file level, as in both this example and the third example below, the command can be to any logical address; as seen from the device side, both implementations are largely the same.

Once the signature is found and the embedded command is extracted, the hidden partition in this example will be made available to a host application 1053 via the corresponding device application 1023 resident on the card 1001. The host and device applications will communicate using a protocol that will cover the reads and writes between the host and card sides, as well as reporting on the partition status. In this exemplary embodiment, the device controls the rights to the application. The rights (read, write) are given when the device confirms the host application's credentials and, upon approval, the device application will grant read and write privileges to the partition through the host/device protocol. Once the host application has been validated, then the assumption is that the device is operating within a trusted environment.

As noted, the first exemplary embodiment will be implemented at the file level, with the embedded commands placed in the first data sector of the write file. The implementation does not rely upon reference to any specific logical address, but rather upon checking the first data sector for a particular pattern or signature. The files in the partition are managed by the host, meaning that, in the hidden partition example, the host application is the owner of the file system in the hidden partition. Once the host application obtains rights to the application, it has full control over the content.

A host application 1053 will implement a file system layer since the FAT of the hidden partition often cannot be read due to access privilege problems with the operating system (OS). As with any access to the hidden partition, the FAT will be available only after the pipe to the application is open. The command transfer by the host application will be defined and explained below. The host application will reside on the card's non-hidden, or public, partition, seen by the OS at the mass-storage device or removable drive level. Several such host applications can reside in this area and the user will know which one to execute, which will be executed on the host side.

Figure 7:
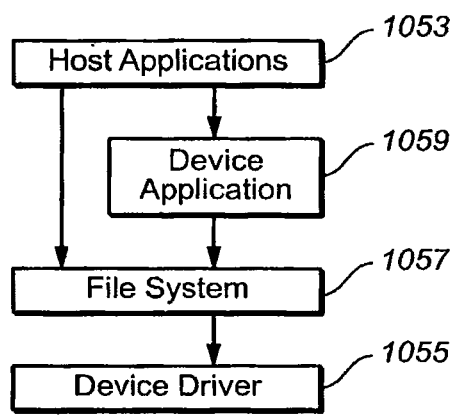
FIG. 7 is a schematic representation of device driver layers.

The host side software layers are described in more detail with respect to FIG. 7. The device driver 1055 has two roles. It functions as bus driver and performs IO operations for the standard client applications supported by the (intermediate) protocol and the File System 1057. In addition, it also implements the application and the device or application specific protocol. The standard IO API and implementation can be common to all of a card family, for example the standard SD card operations. The application or device specific API and implementation are protocol specific by nature. FIG. 7 shows an example of a hierarchical structure that enables code sharing for the common part and simple portability between different applications specific protocols.

In addition to the host application layer 1053 and file system layer 1057, the host structure now also incorporates a layer 1059 specific to the device applications. For "standard" device operations, not incorporating the application specific operations, the layer 1059 is not used and the layers 1053, 1057, and 1055 will largely operate as in the prior art. When an application specific instruction is to be used, the device application layer 1059 will be interposed between the file system 1057 and the host layer 1053 in order to format and embed the application specific commands.

The device driver 1055 can include interface and pipe sub-layers to provide common functionality and can be used with minimal changes with all application specific protocols. The host's application should match the protocol layer according to the particular application. The interface sub-layer will expose a standard set of device functions. For example, these would include: hardware initialization and configuration; drive open and close routines; read and write operations; and erase. It will also include a function to the appropriate communication method and initialize the pipe accordingly.

When a command in the existing base card protocol, such as 510 of FIG. 5, is transmitted, in some cases the operating system (OS) may split it up into several pieces, possibly even interposing pieces of other instructions. In these cases, the file system 1057 and device driver 1055 can break up the instruction 510 so that the command portion 511 is attached to anywhere from none to all of the data portion 513, with the rest of the data portion following in one or more subsequent transfers. In these cases, the subsequent transfers for the remaining portion of the data will lack the signature portion of section 513a and appear as a standard command. Such a division could also occur for data being transferred from the card to the host in a read operation. In the case where is either known that the OS will not split up an instruction, or the OS can be controlled enough so that it can be instructed not to do so, the procedure can be simplified. This is discussed first with respect to the flow of FIG. 10A and the corresponding state machine diagram of FIG. 12. The more general case will subsequently be discussed with respect to FIG. 10B. Additionally, for simplicity of discussion, the discussion with respect to FIG. 10A will largely be based on the case of only a single application, although there will typically be a number of different such applications active. The more generally case of FIG. 10B will make this more explicit.

For the first exemplary embodiment, a simple hidden partition protocol is used for demonstration. The memory 1011 is divided into two partitions. The first partition is the product standard partition. A standard host is aware only of this partition. The second partition is the hidden partition that is accessible only through application specific commands. A standard host is unaware of this partition and has no way to access it. The hidden partition protocol of the example defines five functions through which the device and application communicate:

1. Open Hidden Partition: Used to authenticate the user and enable read and write operations.
2. Close Hidden Partition: Disable read and write operations.
3. Get Hidden Partition Status: Returns the data shown in FIG. 8.
4. Hidden Partition Read: If the partition is open, reads from the hidden partition. If it is closed, returns an error.
5. Hidden Partition Write: If the partition is open, writes to the hidden partition.

If it is closed, returns an error.

The protocol layer provides the additional API that's required to implement the security protocol. In the specific example of Hidden Partition the protocol requires three services in addition to read and write: Open Partition Close Partition Get Partition Status. These commands are shown below in Table 1, where along with FIG. 8, they are discussed further.

The pipe sub-layer is responsible for the communication with the card according to media command pass through principles. As previously described, the main idea in the media command pass through protocol is that special commands which are commands that are not part of the standard product specification are embedded within standard read and write operations. Embedding the commands in standard read and write operations enables to work with standard hosts and drivers.

In the exemplary embodiments, all commands will be initiated by sending a write command to a certain LBA of the media card. Application specific write commands will include multiple sector transfer where the first sector holds the command's arguments and the rest of the data blocks hold the relevant data if any. Read commands will be executed in two parts:

1. Initiating the read command by first sending a write command to a chosen LBA with the appropriate data describing the nature of the read command.
2. After the write command sets the card application on the correct state of transfer, the read command to the chosen LBA from the write command will be sent to do the actual data transfer from the card to the host.

All commands first send a write command with the sector format shown in FIG. 9. When the host application decides to send a write command, the first sector transferred will have the above format. The next data blocks sent from the host will have the actual data for the card. If the host application chooses to initiate a read command then it first sends a write command to the chosen LBA (LBA=LBA_XYZ) with the above single sector format and then a read to the same LBA. This is shown in the flowcharts of FIGS. 10A and 10B, discussed further below.

A number of possible implementations are possible for the media command pass protocol. The example of this section uses a file system, for example Windows file system operations. The example of the next section communicates directly with the device at the device driver level and does not have the file system overhead. Another implementation can be for a pocket PC (PPC). In this last case, read and write operations can directly access the PPC storage driver. Since there is no standard storage device driver for pocket PC devices at this point, there is no guarantee this method will work on all PPC devices. The client application vendor should test it with the set of PPC devices it intends to work with.

Returning the file system implementation of the present example, the pipe sub-layer initiates read and write operations to the Command Pass Through LBA by reading and writing from/to the same file location, indicated as LBA_XYZ in FIG. 10A for the case where the OS will transfer the entire instruction in a single transfer. This need not be a predetermined address, as in the example of the next section, but any logical block address. For this example, the implementation uses Windows' standard file system API—CreateFile, ReadFile, WriteFile and SetFilePointer. The implementation sets can be broke into four or five parts: the pre-requirements; the establishment of the communication pipe; the verification of the file length; the applications write command; and, if data is to be read or other information returned to the host, the read command.

In a file level implementation, the file system is used to unknowingly transmit the embedded, application specific commands. Since the actual, embedded command may be of a different nature from what the command in the intermediate protocol that file system thinks that it is sending, a conflict can arise if appropriate steps are not taken. For instance, if a error arises, error recovery can be complicated as the file system will see this as an error in the carrying command (a write) in the intermediate protocol, when the actual error may be with the embedded command (for example a read). Similarly, a dissonance can result if the file system employs caching.

Another problem can result from file segmentation: as the exemplary implementation relies upon reading and writing from/to the same file location (LBA_XYZ of FIG. 10A), the entire file should be stored to a sequential group of sectors in the memory. If the data to be stored starting at LBA_XYZ is larger than the available segment, the file system will break it apart. Consequently, the maximum data length for the application specific commands should be no larger than the smallest OS file allocation unit (cluster), so that the used logical address (LBA_XYZ) is associated with a logical block address having sufficient space.

In the Windows example, the pre-requirements for the file system implementation require a standard file that contains at least 128 sequential sectors. To ensure the existence of such file, it is created on formatted drive. Therefore, if the host application vendor chooses this method, they should deploy the communication file with the application. In this example, the design assumes that a file named "FilePipe," with certain attributes specified below exists in the device user area. If such file does not exist the driver will try to create it. If it fails, the application can ask the user to format the drive and re-install the application on formatted drive.

To establish the communication pipe, the device driver 1055 preferably opens the communication file with the following attributes:

Not shared

No Buffering

Hidden

The Not shared status ensures that only the host application has access to the file in order to prevent other applications from accessing the Command Pass Through LBA. The No Buffering status instructs the system to open the file with no intermediate buffering or caching. Thus, any write or read to/from this file results in read/write commands to/from the card rather than a cached version. In some cases, to ensure that the file will be flushed to the card, it may necessary to set both a "no buffering" flag and a "write through" flag. Since the actual application or media specific commands are embedded within commands of another protocol, when there is, say, a write error, the host interprets this as an error with the write command in the intermediate protocol rather than an error with the embedded command. The No Buffering status keeps the data transfer tied up to the intended, embedded command. The Hidden status implies that the end user sees this as a system file.

The next implementation step is to verify that the file contains at least 128 sectors that are sequential.

For the application's write command, a secure write in the hidden partition example, the write buffer is prepared along the lines described above. The file pointer is then reset to ensure that read and write operations are for the same LBA (=LBA_XYZ). The buffer is then sent to the device by calling the "WriteFile" command with the "FilePipe" name.

For the application's read command, a secure read in the hidden partition example, the file pointer is first reset, followed by performing a "WriteFile" command to send the command buffer. The file pointer is then reset again to ensure that the write and read operations are done on the same LBA. The "ReadFile" is then performed to obtain the secured data from the device.

Returning to the card side, the Device Application 1023 will manage the hidden partition (in this example), allowing reads and writes pending on host application validation. Resource and memory access are through the Media Layer 1025 for the hidden partition phase. The Media Layer 1025 will direct all of the device application data transfer to the hidden partition on the memory 1011.

As described, the Device Application 1023 receives its specific commands from Host Application 1053 through the regular card protocol read/write commands. For example, taking the SD card protocol as the exemplary embodiment, each command index and arguments are passed on in a command sector via SD write command. When a read command is expected from the device application, then first the host application will send a write command (through SD write command) followed by the actual read command (SD read command). The read command context is saved, for example in RAM space dedicated to the device application, during the write command that passed the command sector. When the read command follows, the device application will then load the saved read context and transfer the requested data. The saved read context will remain as is until it is superseded by another read context. This will enable the host to perform read retries without sending another write command+command sector.

Because most protocol commands act as read/write commands, it is possible to transfer new commands that are application specific through reading and writing to certain LBAs. In the exemplary embodiment, all commands will be initiated by sending a write command to a certain LBA of the media card. Application specific write commands will include multiple sector transfers, where the first sector holds the command's arguments and the rest of the data blocks hold the relevant data, if any.

As noted, read commands are executed in two parts:
1. Initiating the read command by first sending a write command to the chosen LBA, with the appropriate data describing the nature of the read command.
2. After the write command sets the card application on the correct state of transfer, the read command to the chosen LBA from the write command will be sent to do the actual data transfer from the card to the host Returning to FIG. 9, all commands must first send a write command, where FIG. 9 shows an exemplary format for the argument data sector here. As shown in FIG. 9, bytes 0-31 hold the application pass through signature (e.g., "Pass Through Mode Supported"), byte 32 the application's ID, byte 33 the application command operation code index for the embedded command, and with the application command argument data filling out the rest of the sector.

When Host Application 1053 decides to send a write command in this embodiment, the first sector transferred will have the format of FIG. 9. The next data blocks sent from the host 1051 will have the embedded command's actual data for the card. If the host application chooses to initiate a read command, then it first sends a write command to the chosen LBA with the above single sector format and then a read to the same LBA to effect the read.

The host application 1053 is responsible on initiating the described commands according to the communication flow as seen from the device, shown in FIG. 10A. To do this, the host application controls the target LBA for the card protocol's read and write operations that will carry the embedded command as described above. Although described for only a single command at a single LBA, the process shown in FIG. 10A (and FIGS. 11A-C, FIG. 12, and so on) may be occurring for multiple LBAs as they can all rely upon the pass through mode signature. (This case is described below in more detail with respect to FIG. 10B, where the various LBAs are indicated a subscript, $LBA_i$) The particular LBA is only relied upon by the device's state machine (as discussed with respect to FIG. 12 below), as the device is able to concurrently deal with multiple files.

The process begins at step 1101 when a write to the chosen LBA is received, here taken as LBA=LBA_XYZ. The signature is then checked (1103) to see whether it is the application pass through signature: if not, the card engages in standard IO operations (1105); if so, it enters the CMD pass through mode. Step 1109 determines whether the command direction (as seen from the device) is OUT or not. If the direction is OUT (e.g., a write to the device's memory), the command is executed (1111).

If the command direction is not out, the memory device waits for the second command of the read pair, an application read request, at 1113. If instead a write arrives (1121), it goes to standard IO operation (1123) before returning the wait state (1113). If a read command is received, the LBA is checked (1117) and if it is to the chosen LBA, it is the second command of the read pair and the read is executed (1119); if the LBA does not match, it instead goes to 1123.

There is more than one possible implementation manner and implementation details vary according to the target platform. One common manner, which applies to Windows NT based desktops and described above for the host side, is to use a virtual file and standard Windows File System API. Another way is to directly initiate the card protocol's (e.g. SD) read and write operations using Windows SCSI Pass Through API, as described in the next example. This manner applies Windows NT based desktops also, but it requires administration rights as discussed above for the implementation at the card driver level.

As for the command interface between the card's firmware and the application's firmware, in a first step, the card-FW receives an application specific command. After verifying the Card Pass Through Mode Supported signature, the card's FE layer 1021, will pars the argument data sector that came with the write command to a chosen LBA for the Application ID and Command OP-Code. The Application Specific Command Interpreter will call the application interface routines with a pointer to the host data buffer. In a second step, when starting an application specific command sequence, the application FW must set its own state machine to handle the application command sequence and also set a flag to indicate that the next read/write command to a chosen LBA is intended for application FW. Each time a read command is sent to the card (to the chosen LBA), the card's FW will first check this flag to distinguish this application specific read command from a regular read command to this LBA.

Figure 11A:
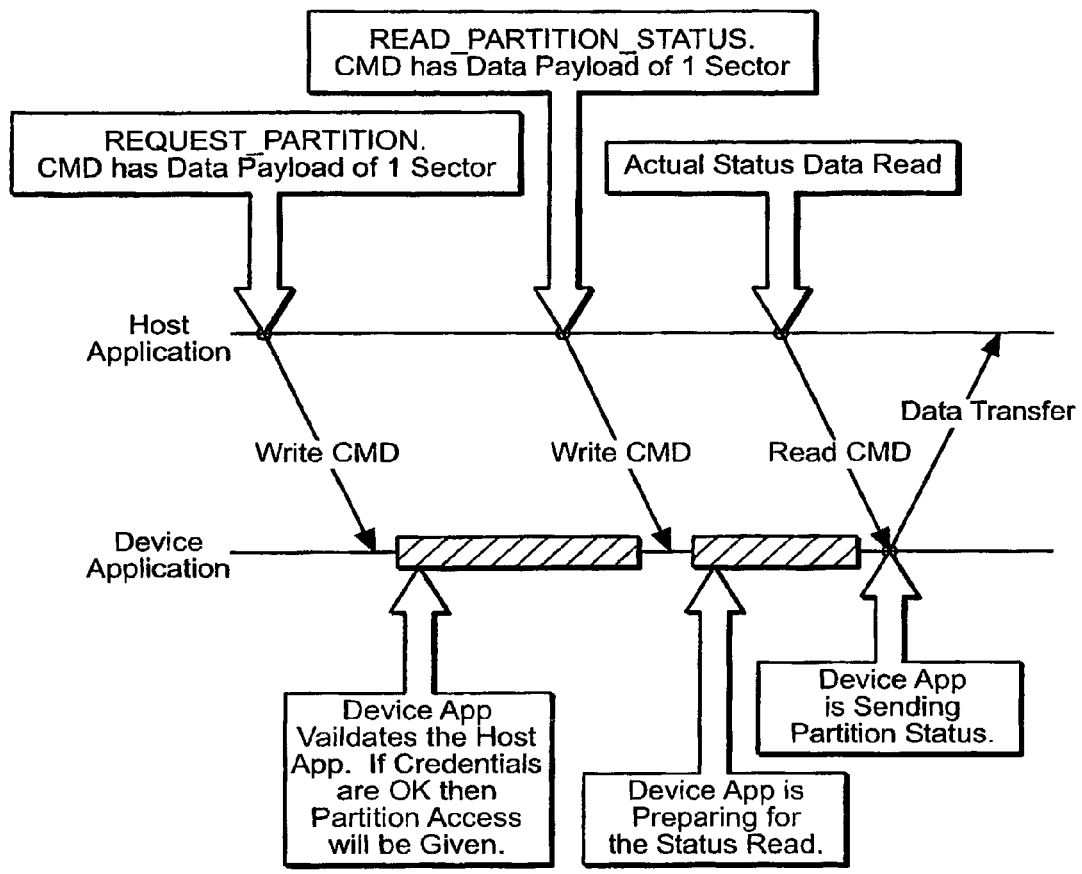
FIGS. 11A-C illustrate the host application-device application protocol.
Figure 11B:
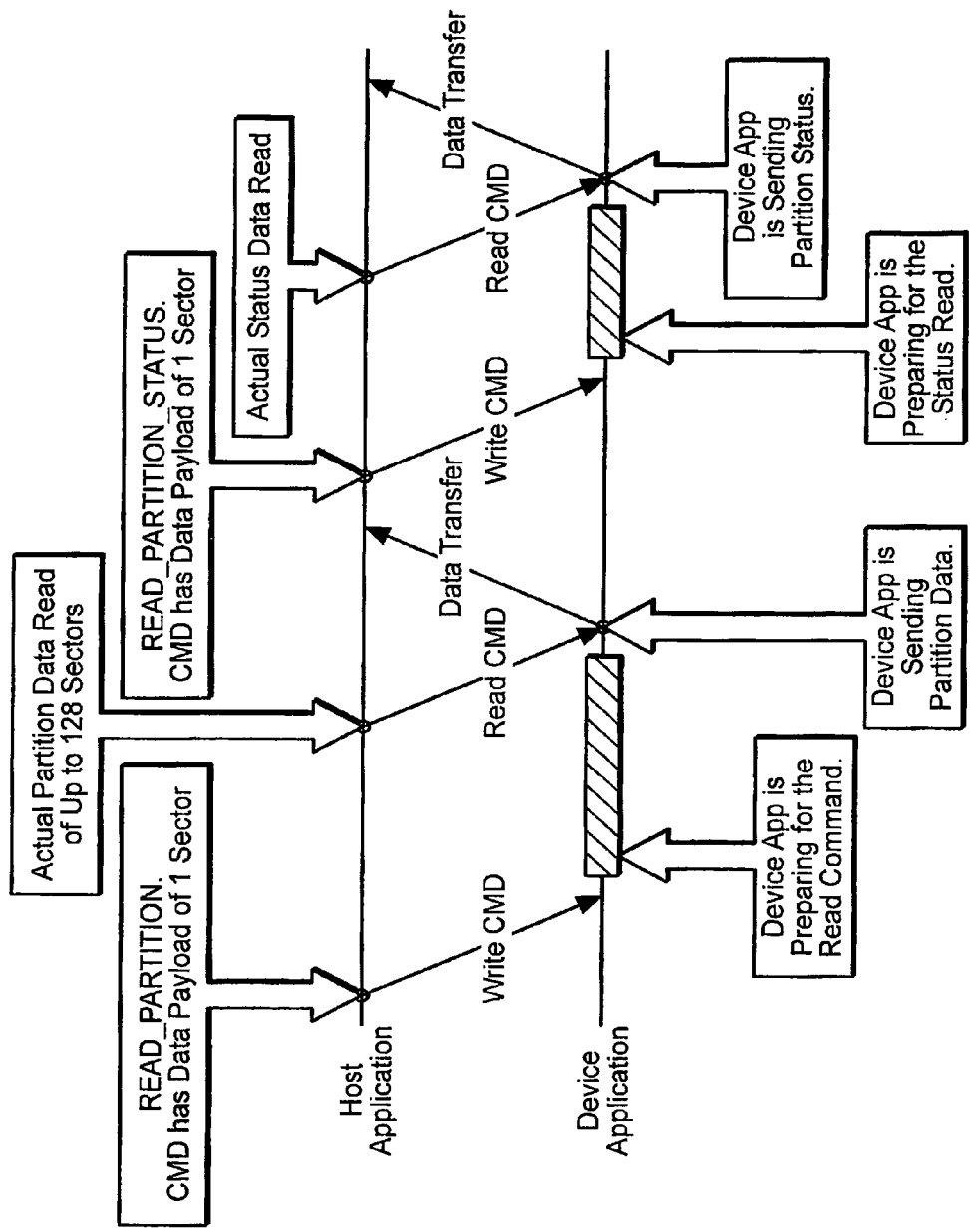
Figure 11C:
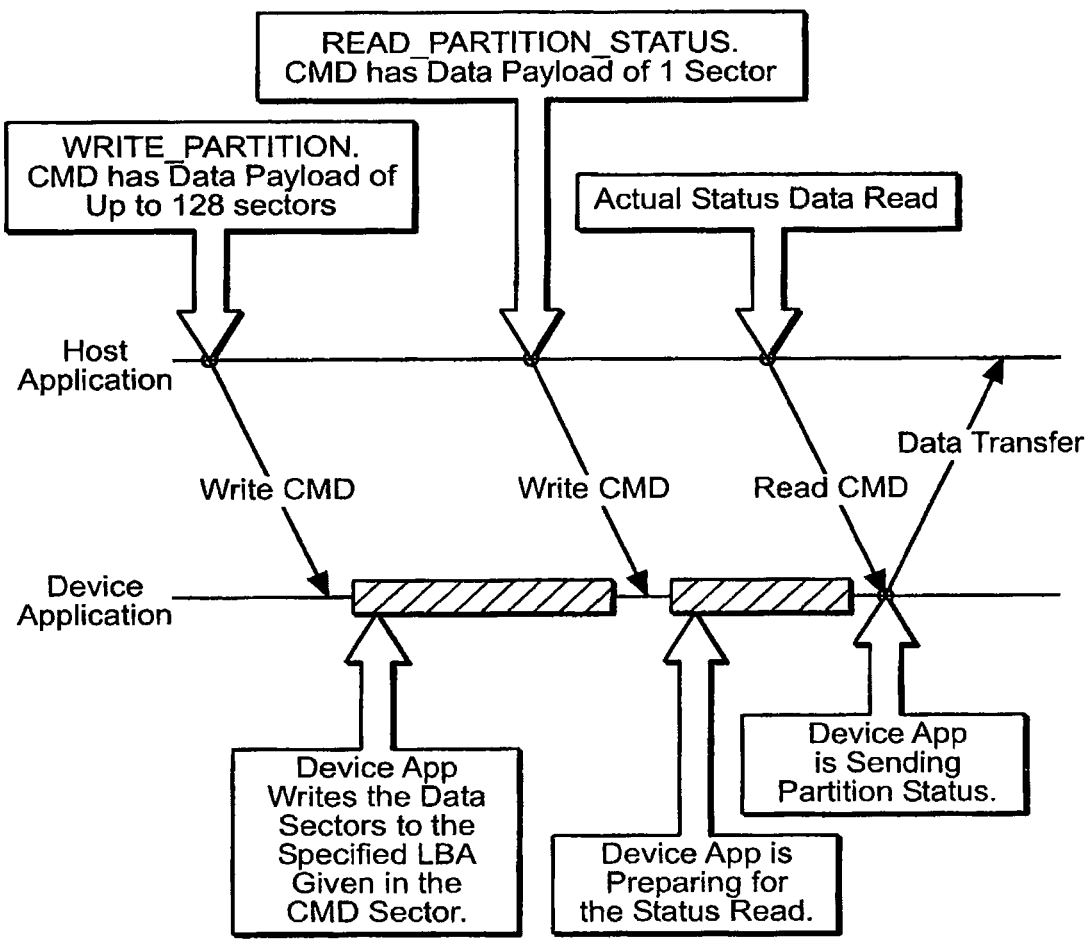

An example of a protocol for the hidden partition application will now be described. FIGS. 11A-C illustrate some of the same processes as for FIG. 10A, but in terms of the activity on the system bus between the host and the device. The process for an authentication and secure partition FAT read is shown in FIG. 11A. First, the host sends Username+ Password to the card for authentication. Upon authentication, the card will enable the application to read the FAT from the secure and hidden partition. The partition stays open until the host ends the session or the device goes through a power cycle. As long as the partition is open, reads and writes to the hidden partition by the host application are allowed.

FIG. 11B illustrates a host read of a file in the secure partition. As described above, the application specific read command occurs within two card protocol commands: a write command that specifies the nature of the read command and arguments and then the actual read command.

FIG. 11C illustrates a host write to the hidden partition. Passing authentication, the host has access to the partition's FAT and now has the right to transfer a new file to the host. The host sends a write command to the secure partition with a write start address and sector count.

FIG. 8 shows the embodiment of device application status, introduced above, along with exemplary values for the hidden partition example. As several different partitions may be allowed, byte 1 in the device applications partition ID, given as "1" in the example. The next four bytes give the partition size, here shown as ten megabytes worth of sectors. Byte 5 indicates if the partition is currently open or not and the next four bytes are given to indicating the version of the device application. Byte 10 provides operation status. Bytes 10-511 are padded out with zeros to form a sector. In a variation, byte 11 may be used to record the number of sectors written in the last transaction.

Table 1 describes an example of application protocol commands that are sent to the device application for the hidden partition example. The CMD Index is placed in byte 33 of the command sector, and Command Arguments are placed from byte 34 and on in the specified order written in the table.

TABLE 1

| CMD Index | CMD Name | CMD Arguments | Number of bytes |
|---|---|---|---|
| 1. | OPEN_PARTITION | User Name Length In Bytes | 1 |
| | | User Name | Specified in first argument. |
| | | User Password Length In Bytes | 1 |
| | | User Password | Specified in 3rd argument. |
| 2. | CLOSE_PARTITION | User Name Length In Bytes | 1 |
| | | User Name | Specified in first argument. |
| | | User Password Length In Bytes | 1 |
| | | User Password | Specified in 3rd argument. |

TABLE 1-continued

| CMD Index | CMD Name | CMD Arguments | Number of bytes |
|---|---|---|---|
| 3. | READ_PARTITION | LBA number | 4 |
| | | Sector Count to read | 4 |
| 4. | WRITE_PARTITION | LBA number | 4 |
| | | Sector Count to Write | 4 |
| 5. | READ_PARTITION_STATUS | Partition ID | 1 |

As the embedded hidden partition commands are transferred through the device's write protocol, such as the SD protocol, the partition's command interpreter will be called by the, say, SD command interpreter after establishing that the write or read commands are actually meant for the partition's device application and not for the SD regular operations. The command interpreter will call the appropriate routines after parsing the command sector. In a specific embodiment, the application's command can have as a first argument a parameter indicating whether the MD command is a read command or write command. A second parameter can pass a pointer to a location in the allocated RAM where the command sector is placed. The pointer will point to byte 33, Command Operation Code Index, since the relevant information for the partition's device application begins at this point of the sector. The buffer size that is pointed to by this second parameter can be specified in a third parameter.

As already noted, write commands for the device application are simple because they are executed right after the command sector is parsed, in the same sequence as those of the card protocol. For example, in the SD case:
1. SD-write command (1 or more sectors) is received—the first sector is always the command sector in the exemplary embodiment
2. The card-layer parses the first 32 bytes of the first sector and recognizes the command sector's signature. The Device Application command parser (interpreter) is called with a pointer to the command sector.
3. The command interpreter, after it is done identifying the embedded application command, calls the corresponding routine that will execute the embedded command and begin the application's command process.
4. The command process is for the hidden partition's application is done and a status is returned to the card-layer, where the sequence is going to end as an SD-write command process would. The SD card goes to IDLE state.

Also as already noted, read commands in the hidden partition's application protocol are a two-step process that is comprised (again in an SD embodiment) from an SD-write command followed by an SD-read command. The first step is the SD-write command:
1. SD-write command with one data block (512 bytes) sent by the host—the first sector is always the command sector in the exemplary embodiment.
2. The card-layer parses the first 32 bytes of the first sector and recognizes the command sector's signature. The Device Application's command parser (interpreter) is called with a pointer to the command sector.
3. The command interpreter, after it is done identifying the embedded application command, identifies the embedded read command that is about to be executed (in the next SD-read command), saves this command identifier. Then the command interpreter sets the card-layer read command flag 4. The application's command process is done and a status is returned to the card-layer where the sequence is going to end as an SD-write command process would end. The SD card goes to IDLE state.

The second step is an SD-read command:
1. SD read command.
2. The SD card-layer checks the application card-layer read command flag and finds that it is set—instead of calling a regular SD read command it calls the device application command interpreter with a read command indication.
3. The device application command interpreter identifies the partition read command flag and recalls the partition read command identifier that was saved in the previous write command. The identifier directs to the corresponding partition read routine and initiates the partition read sequence.
4. The partition read sequence is done and a return status is passed to the card layer.
5. The card layer ends the SD-read process and the card enters IDLE state.

Figure 12:
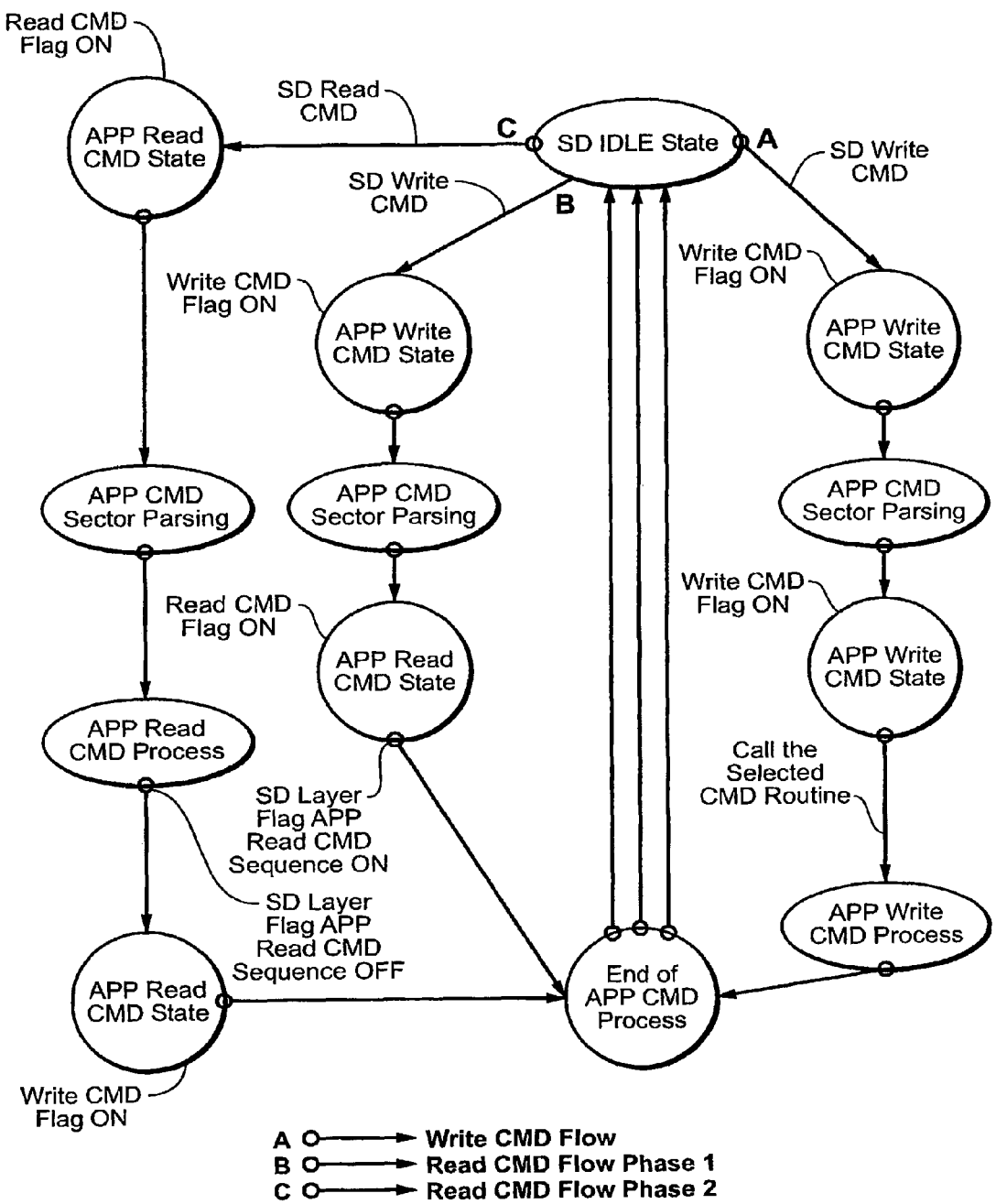
FIG. 12 is a state machine diagram for the hidden partition application's commands.

The read and write processes are illustrated by the card side application's commands state machine, shown in FIG. 12 for an SD-based embodiment. Since these embedded commands are passed by SD write commands, and when a hidden partition read command needs to be executed the host cannot pass the command sector on an SD read command, the Device Application's (1023) command interpreter needs to maintain a state machine which will manage and know which read command is being executed by the Host Application 1053. In this figure, the bubbles refer to the device specific application commands that are executed at the device application layer (1023, FIG. 6), while the attached comments refer to the commands as seen at the FE layer (1021, FIG. 6) that are in the intermediate (here SD) protocol. The right side (the A path) of FIG. 12 is the process for a write process, where any process where either data is transferred to the device or no data is transferred will follow a similar flow. The left side of FIG. 12 corresponds to a read or other process where data is transferred from the device to the host. The read flow consists of the B path for the first command of the pair needed for a read and the C path for the second command of the pair.

Both the write flow and the read flow begin in the same way, receiving an SD write command from which, after the signature is detected, the embedded command is parsed. For the write flow, the write flag stays on and the write process is executed. For the first phase of the read flow, however, the read flag will be set. This Card Layer (SD) Read Process Flag is set by the Device Application (1023) when a read process from the host is detected. The flag indicates to the card layer that the next read command from the host (on the SD bus) is not a regular card read and should be directed to the Device Application (1023) for handling. This occurs in phase 2 of the read flow, in which, in response to the second command of the pair, the data is transferred from the device. The flag gets reset when the card layer initializes.

Figure 13A:
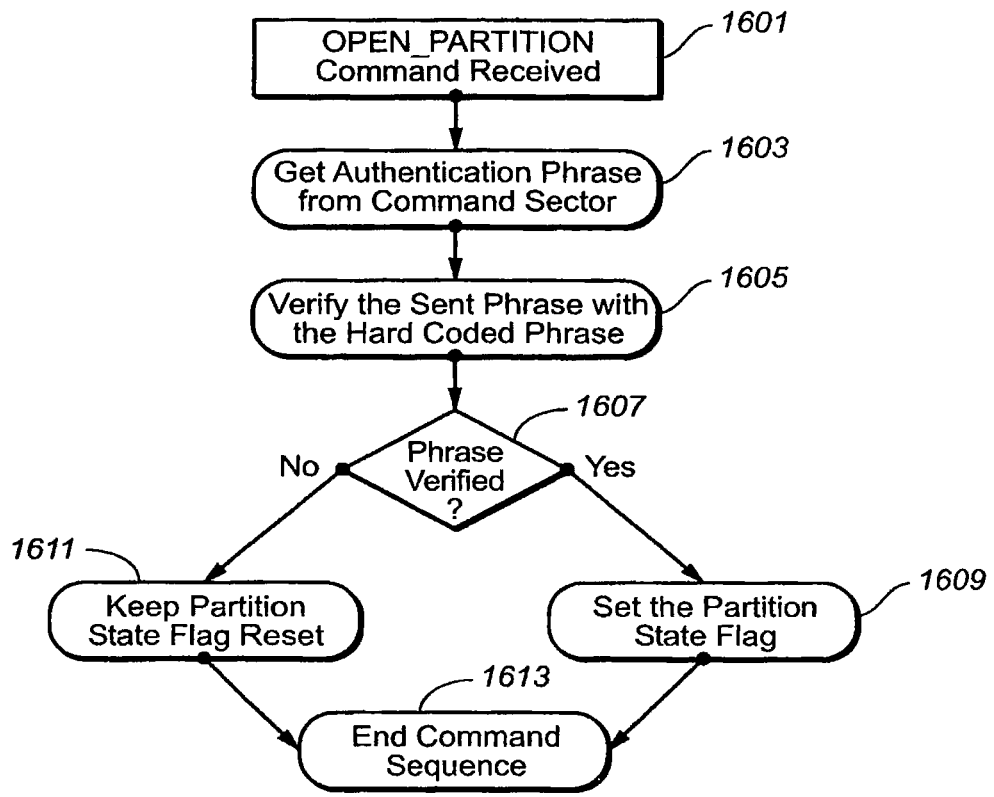
FIGS. 13A-D show the process flows for a set of commands in the hidden partition protocol.

Referring to the commands listed in Table 1, the OPEN_PARTITION command (OP-Code 0x01) accepts a username and password and verifies them. If they match to the Device Application's stored name & password then the partition is opened for read/write host access. At this point, there will be one authentication phrase that will be sent and verified against a phrase in the Device Application's code. This process is shown in FIG. 13A. The partition will stay open until the CLOSE_PARTITION closes it or until the next power cycle.

Figure 13B:
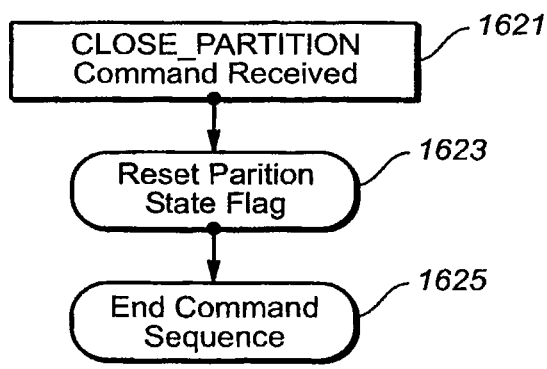

The use of the CLOSE_PARTITION command (OP-Code 0x02) is intended to close the application working session and not leave the partition open. An embodiment is shown in FIG. 13B.

Figure 13C:
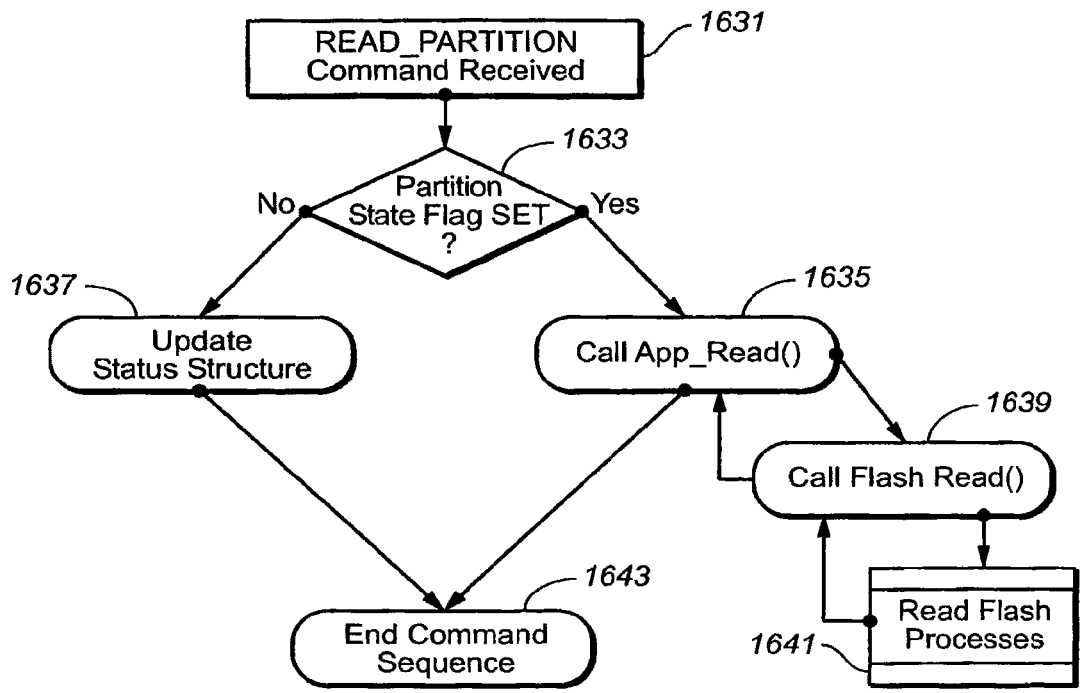

The use of the READ_PARTITION command (OP-Code 0x03) is shown in FIG. 13C. If the partition is open (the yes path from 1633 to 1635), then this command will enable the host application to read data stored in the partition (1639, 1641). In the exemplary embodiment, this routine will call a "FlashRead" API routine, which will direct the data transfer to the hidden partition space.

Figure 13D:
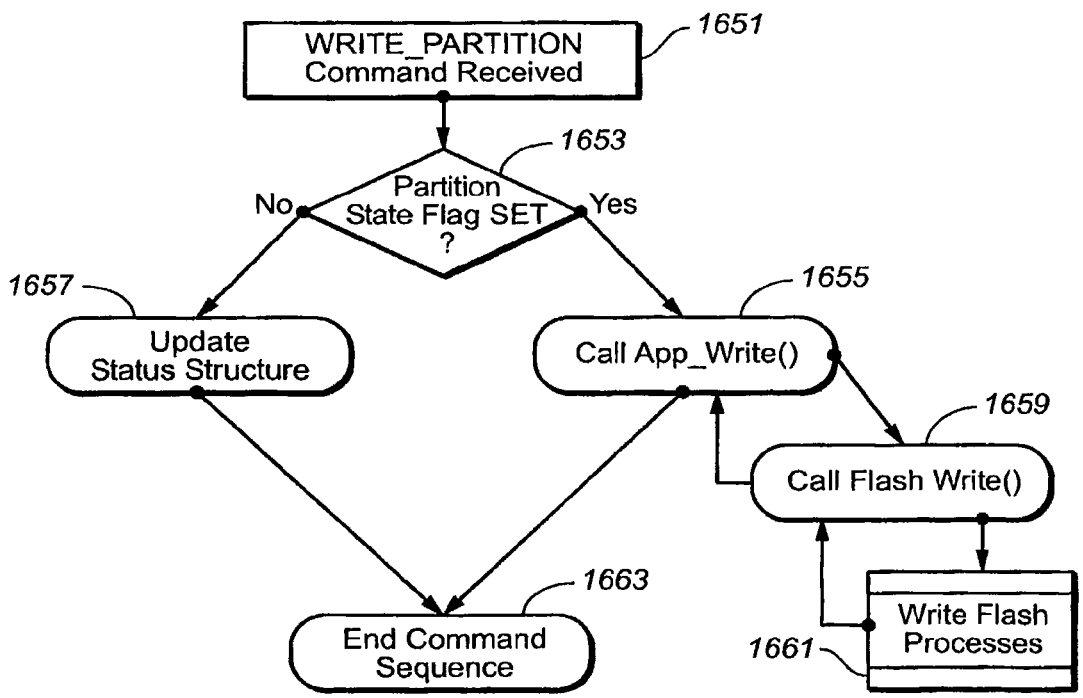

The WRITE_PARTITION command (OP-Code 0x04) directs data from the host to the hidden partition on the card. As shown in FIG. 13D, this command will be executed by the device application only if the Partition Flag is SET (1653). This routine will call a "FlashWrite" (1659, 1661) API routine, which will direct the data transfer to the hidden partition space.

The READ_PARTITION_STATUS command (OP-Code 0x05) supplies the information shown in FIG. 8. This is an application read command with the structure discussed above with respect to FIG. 8. When the command comes in, the routine will gather all the information and place it in the structure above and send it to the host.

As noted above, some operating systems will at times split up an instruction so that not all of the data portion will be attached to its corresponding command portion. In this case, part of the data of a write instruction will show up at the card without the card pass through signature; consequently, what appears to be a standard command in the transmission protocol with no signature attached could actually be the rest of an application specific command. As a concrete example, consider the case of instruction 510 of FIG. 5 that has, say, a data portion 513 of ten blocks. In transmitting this instruction to the card, the host's operating system might send only the first five blocks of the data portion attached to the instruction, with the remaining five blocks being transmitted later. When this last set of data blocks is sent, it will lack the initial data block 513a, which contains the signature and actual command for the application protocol, and appear as part of a standard command from the transmission protocol. Such segmentation may also occur when the embedded, application specific command is a read-type command, so that the data is sent from the card to the host in portions. FIG. 10B extends the flow of FIG. 10A to account for such segmentation in both application specific read and write commands by replacing the single logical block address LBA=LBA_XYZ with the logical addresses $LBA_{Ri}$ and $LBA_{Wi}$ for read and write processes. By defining an $LBA_{Ri}$ reads as well as an $LBA_{Wi}$ for writes, the device can deal with breaks in the transfer of application data in either direction. The subscript i is to allow for the concurrent implementation of multiple application specific commands from multiple applications and multi-user host devices.

The process of FIG. 10B is again based on the example of an SD card using the SD protocol as the transmission protocol and begins with device in the SD idle state and accepting a command at 1201. It then determines whether the received instruction is an SD write (1203) and, if not, whether it is an SD read (1205). If it is neither an SD write nor an SD read, the SD command is executed (1207) and the device returns to the idle state (1209). °

If the received instruction is an SD write at step 1203, it is then checked for the pass through signature (1214). If the signature is found at 1214, this indicates the beginning of a new embedded command, which can then be extracted. At 1231, for all of the read and write logical block address $LBA_{Ri;Wi}$ if the logical block address for the incoming command, $LBA_{CMD}$, is the same as a logical block address assigned to a current writing process, $LBA_{CMD}=LBA_{Wi}$, then the corresponding $LBA_{Ri;Wi}$ are cleared. Normally, the assigned $LBA_{CMD}$ should be unused, but in case it has already been assigned to another process, this will abort it and clear the address.

The data direction of the application specific command is then determined (1233). If involves no data transfer, the application-specific-command is then executed (1245) and the device returns to the idle state (1249).

If the application's command is a write, the corresponding logical address is set as $LBA_{Wi}=LBA_{CMD}$+data blockcount (1251) and application data is written (1253). As discussed above, the host's OS may split the instruction up so that the command is not accompanied by all of corresponding data. When the embedded command is extracted and parsed, the card will know how many blocks of data the command should include. At 1255, it checks to see whether all of the data was included and written. If so, $LBA_{Wi}$ can be cleared (1257); otherwise, it is not cleared as the rest of the data will, unless interrupted by an error or shutdown, eventually follow and will look like a standard SD write command to a consecutive (relative to this command) card address which is the address calculated above. The device will then return to the idle state (1259) to await further commands.

Returning to 1231, if the application command is a read, then the device sets $LBA_{Ri}=LBA_{CMD}$ and sets $datatype_{Ri}=datatype_{CMD}$ (1235) in preparation for the subsequent data transfer in the second read phase at 1263. The device then goes into the SD idle mode to wait for the second phase of the read process. A different variation on this solution will not use the $LBA_{CMD}$ but a different address $LBA_{READ}$ explicitly defined in the parameter of the write command. This method will work around cashing mechanism of the OS. In several systems the host OS will not attempt to read back a card address which was just written to. Instead it will return to the host application the data buffer for a host cash buffer, assuming that this data is what the card has, since it was just written to it. In this case the data buffer will include the application-specific-command rather then the card response.

Returning to 1214, if the command (in the transmission protocol) is a write (Yes path from 1203), but a signature is lacking (No path from 1214), the command may actually be a write command in the transmission (here, SD) protocol, or may be additional data for a write in the application protocol. This is determined at 1215: if $LBA_{CMD} \ne LBA_{Wi}$, for any of the $LBA_{Wi}$, then it is a standard SD write which is then executed at 1217, after which the card goes into the SD idle state (1219). Should $LBA_{CMD}$ match one of the $LBA_{Wi}$, then the command is actually more of the data portion for the corresponding application command and the flow goes to 1251 to write this additional application data.

Returning to step 1205, if the command is an SD read, it is determined whether it is actually an SD read or the second phase of an application read. This is determined at 1226 by comparing $LBA_{CMD}$ with the $LBA_{Ri}$: if $LBA_{CMD} \ne LBA_{Ri}$ for any of the $LBA_{Ri}$, then it is a standard SD read which is then executed at 1227, after which the card goes into the SD idle state (1229). If $LBA_{CMD}$ instead matches one of the $LBA_{Ri}$ for any of the $LBA_{Ri}$ it is the second phase of an application read.

When $LBA_{CMD}=LBA_{Ri}$, the corresponding logical address is set as $LBA_{Ri}=LBA_{CMD}$+data blockcount (1261) and application data is read out (1263). The device then goes into the SD idle state (1269). For the application read process, the exemplary flow lacks the equivalent of steps 1255 and 1257 on the application write side. The keeps the corresponding read flag set even if all of the corresponding data has been accessed. By keeping the $LBA_{Ri}$ open, the data can be re-read in case of an error. Under this arrangement, $LBA_{Ri}$ is only cleared if the address is reassigned for another purpose, such as in step 1231, for one example.

These additions of FIG. 10A with respect to FIG. 10B allow for breaks in the transfer of application data. They also remove the need to read and write to same logical address. These allow the techniques to be used in cases where there may not be enough control over the operating system, as the sort of control needed for the embodiment of FIG. 10A may require a known controllable platform. Also, it should again be noted that FIG. 10B more explicitly incorporates that there may be multiple host applications, each communicating with card independently, and the breaks in data transfer may interpose part of an instruction from one protocol between portions of an instruction from another. Further, separate LBAs for both the read and write processes allow any read or write caching in the device driver layers to be bypassed.

Second Exemplary Embodiment

The first example was implemented at the file level. Other implementations at the device driver level are possible, initiating read and write operations by sending requests to the device driver, for example the Windows Standard Storage driver if the host uses the Windows operating system. This implementation of the command pass through method communicates directly with the device and does not have the file system overhead. However, this method may require administration rights. The host's application can try and use this method as first choice and move to file system operations if it fails. An interface function can be used to select between the methods and to initialize the communication pipe accordingly. The client application would call this command before any other operation. If the application lacks the proper administrator rights, working with this method will result an exception, which can be treated according to exception handling code.

This example is based on the discussion of the problem in the Background section above. Although the Background discussion presented the problem in the context of a memory card connected to a PC through a hardware card reader, it will be seen in the following that, as with the other examples given here, the situation is more general. The memory device may have such protocol translation—or, more accurately, non-translation—problems even when it connects directly to a second host. This situation may result when the memory device is connected to a host that has, as seen from the memory device, a less than complete protocol. One case where this may arise is where a card has two sets of contacts, one for use with an USB port and another for a standard set of card contacts. As discussed with the third set of embodiments, the protocol translation may entirely be contained within the memory device itself, unknown to the host. Additionally, in the following, although the embodiments are described with respect to detachable memory card, the discussion is also applicable to embedded memory devices.

In a first set of embodiments for the second exemplary embodiment, to allow media card specific commands to be passed to the card from the host without changing the firmware of the adapter or the reader which hosts the media card, a specified logical block address (LBA) may be used, the Card Pass Through Mode LBA, with a special signature in the data sector to notify the card that a special command is embedded in the sector. This can be implemented by a firmware change to support the command pass through (CPT) mode. As this requires no firmware change of the adapter, the card can be run at any USB reader or adapter.

As discussed in the background section, the various small-format flash memory cards (Compact Flash Card, Secure Digital (SD) Card, the Multi-media Card (MMC), xD, and the Sony Memory Stick/Memory Stick Pro, etc.), have different electrical interfaces and often media specific commands for use with a host (digital cameras, flash-memory music players) that are not found in the command set of used between a PC and a hardware adapter allowing the PC to read the card.

In a primary aspect, a card firmware change may be used to honor the normal read/write command. When the read/write command to a specific LBA offset, however, a signature is checked to determine if the data portion of the command contains embedded media card specific commands. The protocol can be implemented in the firmware of any media card. Therefore, it does not require any firmware change to the adapter, USB reader, or other reader used by the PC (or other host without access to the full, media-specific command set). In practical terms, this is simpler for the card manufacturer than implementing the reader firmware changes for all of the card commands in all vendors of the readers.

Although the various aspects of the disclosed embodiments will often be described in terms of specific cards, such as secure digital (SD), MultiMediaCard (MMC), or compact flash (CF) cards, and particular protocols, such as SCSI or ATA, when examples are discussed, it will be understood that the various aspects apply to the other various memory cards and systems. Various details on card structure and operation are described further in the following patents and applications incorporated by reference through out this document.

FIG. 14 shows the process whereby the card and a personal computer (or more generally any host requiring a hardware adapter to read the card) communicate using a reader. FIG. 14 is similar to FIG. 4 except that it ignores the explicit introduction of a USB wrapper or similar structure in some cases, which will also be suppressed in the following discussion. As noted in the background, the card and reader communicate using an instruction, such as indicated at 201, from the command set of the card's protocol. The host and reader typically communicate using an instruction, such as indicated at 203, from another command set. The reader serves to translate between the two command sets using its firmware. (Although firmware is referred to here and in the following, this may more generally be implemented in hardware, software, or some combination of these.) The difficulty is when command 201 is a command from the card's command set which has no equivalent in the protocol used by the PC to communicate with the reader. In this case, the reader is unable to translate 201 into a corresponding command 203 as there is no such equivalent instruction 203, and similarly for the other way around. Consequently, if the host wishes to use one of the card's media specific instructions, there is no way to pass this through the reader in the prior art without changing the command set of the PC-hardware adapter protocol.

This particular example will use the SCSI protocol from host to reader, the SD protocol from reader to card, and an example of an SD command, say a secure write, that does not exist in the SCSI protocol as the embedded command. So although this command could be transmitted directly in the SD card, it needs to use aspects of the presently preferred embodiments for the host side of the application to be able to transmit the instruction in the intermediate SCSI protocol that carries the command between the host and reader. At the reader, the dummy command has a version in each protocol and can be translated between the protocols, with the actual embedded command being treated as data. For example, the dummy command is again taken as a write. Thus, between the host and the adapter it will be manifested as an SCSI write command and between the adapter and the card will be manifested as an SD command, while in both cases the actual command is embedded in the data portion. So although in this example the embedded command now exists in the second protocol, it is still embedded since, at some point along the way, it is passed through on a protocol lacking this application specific command. Consequently, this results in a command of first protocol being embedded in a command of the same protocol, allowing translation between it and another, second protocol that lacks an equivalent of the embedded command. This is shown in FIG. 15. Although this discussion is primarily discussed in terms of an SCSI and SD embodiment, it will be appreciated that is applies more generally to other protocols.

FIG. 15 is an exemplary schematic representation of a situation where a command form the card's command set that has no equivalent in the PC-reader command set is embedded in an instruction 203 of the PC-reader protocol which has a representation in both command sets. In the exemplary embodiments, the media specific command is again embedded in the data portion of the PC-reader protocol. The PC and reader can then exchange a command 203 which the reader can translate into a corresponding command 201. Within this command, however, is embedded another, media specific command 601. The reader then passes through and translates this command in a manner transparent to its operation. The mechanism of the exemplary embodiment is that the instruction 201/203, which has a representation in both command sets, is an access to a predetermined logical address in the card's memory. When, for example, the card receives a read command to the specified logical address, the card is alerted that this may be a media specific command 601. (As descried in the following, the embodiments below do not rely on such a specified logical address and, more generally, not just a write command, but any command with a data portion may be utilized.) The card then checks for the signature of such a command to verify this and then extracts the command 601. In the exemplary embodiment, the command 601 is placed inside the data portion of the instruction since, in SCSI and other protocols, there is often no convenient place to embed the media specific command in the command portion of the instruction.

For example, if a PC wishes to make a write of the secure area of an SD card, it will form instruction 203 that consists of a write command to the specified logical block address (LBA), contains the command pass through (CPT) signature, and contains the actual secure write command 601 embedded in the data portion. The PC then sends this instruction 203 to the reader, which interprets it as a standard write instruction in the SCSI protocol. This is then translated by the reader into a standard write instruction 201 in the SD protocol. The reader just passes through the secure write command 601 assuming it is part of the data attached to the write command. When the instruction 201 arrives at the card, based on the LBA specified for the write, the firmware allows the card to determine that the instruction is instead a media specific command. The controller then extracts the command 601, which it recognizes as a secure write, and proceeds to execute the command by performing a secure write of the actual data portion of the instruction.

FIG. 16 describes a particular embodiment in more detail for the example of performing a secure data write of N sectors of data to an SD card. The top row shows the instruction as formed by the host. As the secure data write does not have an analog in the SCSI protocol of the example, the command portion consists of a command CMD' in the SCSI protocol, here a write, that exists in both command sets. The write is to the specified command pass through logical block address, CPTLBA. (The other details of the command are not shown in order to simplify the discussion.) The data portion, to the right of the broken line, consists of an initial sector, containing the media specific command, followed N sectors of the actual data. The initial data sector will include the command pass through signature, the actual media specific command, and the actual address where the following data is going to be written. The logical block address CPTLBA corresponds to the logical block address LBA_XYZ used in the discussion of the first exemplary embodiments discussed above (see, for example FIG. 10A). The different labeling is used to indicate that in the present example, implemented on the host side at the device driver level, the logical block address being used is a particular, specified logical block address, whereas in the previous example, implemented at the file level, it can be taken as any address.

FIG. 16 is similar to FIG. 5 discussed previously, but with the instruction 510 repeated once for each of the transmission protocols (host to reader, reader to device) explicitly shown in this example. Instruction 510 of FIG. 5 shows the embedding of the command CMD as this will occur somewhere along the transmission path between the host and device sides of the application, while instruction 530 shows the extracted form as it will be used by the device side of the application. FIG. 16 illustrates that there may be several intermediate protocols and that the actual command (CMD) will stay embedded through several of these, even in cases where the embedded command has an analogue in a particular intermediate protocol.

As seen by the reader, the first data sector is just the first of what it sees as N+1 sectors of data to be written to the specified logical block address. As such these pass through unchanged in content. The command portion of the instruction is translated by the reader from its representation in the PC/reader protocol (CMD') to its representation in the card's protocol (CMD). At this point, the instruction can be communicated to the card and still has the form of, say, a write command to CPTLBA followed by N+1 sectors of data.

Once in the card, the firmware can disentangle the actual command. As it determines that the command uses the specified address, it then goes to the first data sector, checks the CPT signature, and extracts the actual, media specific command. This then forms the actual command of the instruction, which is then followed by the N sectors of actual data.

Consequently, as described with respect to FIG. 16, a media specific write command with N sectors of data becomes embedded as N+1 sectors of data in the transmission protocol used between the PC and the reader. In order to read N sectors of data, the media-specific read command is embedded as one sector of data in a read (or other command that accepts data) or the transmission protocol used between the PC and the reader. Thus, media specific read command can be implemented as a write command with the media specific read command embedded in the only sector of data. Again based on the specified logical address (CPTLBA) and signature, the card will extract the media specific command and respond with data from the requested logical block address specified in the media specific read. Details on read implementations and methods for dealing with complications such as a write or read failure were developed further above with respect to the first exemplary embodiments.

The specified logical address (CPTLBA) is preferably a sector not normally used in the file system, as this can avoid conflicts with standard read or write commands that may be sent to this sector. For example, in DOS, after the master boot record, there are usually some hidden sectors not usually accessed. (In some operating systems, accessing this area may require administrator privileges, a possible complication that can be bypassed in the file-based implementations of the next section.) By taking this logical address as the specified logical address, an access to this address will not really be to read or write data there, but for the purpose of checking that the actual command is an embedded media specific command. The reader will just pass though this command as a normal data access and the card sorts everything out.

FIGS. 17A-17L show one embodiment of how various examples of commands can be embedded into a data sector. As described above, when a write to the media card is performed, the first sector of the data portion contains the CPT (card pass through) command. It indicates the CPT function to be executed. Consequently, to write 10 sectors, it actually writes 11 sectors because the first sector is a CPT header. To read 10 sectors, the user needs to send one write of CPT command then read 10 sectors. The real application is to perform special commands that cannot be achieved by the normally read or write command. For example, the CPT mode can be used for media specific commands, such as AKE (Authentication Key Exchange) or application command for the SD card.

FIG. 17A shows an embedded command format embodiment. The CPT Signature in bytes 0-31 is string of characters that depends on the command to check that the signature matches the command. Commands, in byte 32, can include:
  0—CPT Mode Check: Intend to check the media card for CPT mode support Signature "Card Pass Through Mode Check"
  1—Data Out: Data to be written to the media card Signature "Card Pass Through Output Command"
  2—Data In: Data to be read from the media card Signature "Card Pass Through Input Command"
  3—Command without data transfer Signature "Card Pass Through No I/O Command"
  4—CPT Command abort Signature "Card Pass Through Abort Command"
  5—CPT mode reset Signature "Card Pass Through Reset Command"
  6—CPT status retrieve Signature "Card Pass Through Status Read"

Data Transfer Length (bytes 33-35) specifies the amount of data (as a number of bytes) to be transferred; since data is transferred in sectors, an incomplete sector is padded out by 0s. Data (byte 36, bit 1) is flag for data transfer and "0" if there is no data transfer on the next command, "1" there is data transfer on the next command. Similarly, Dir (byte 36, bit 0) is flag for the direction of data transfer and "0" if data transfer is for input on the next command, "1"—if data transfer is for output on the next command.

The Media Card Specific command area (bytes 48-511) is the real command that the media card will run when it is extracted. The Media Card Specific Flags area (byte 36, bit 0) is for media dependent flags.

The media card must be checked if it supports the Card Pass Through command protocol before the real commands are sent. As described above, a LBA (CPTLBA—Card Pass Through LBA) is designated for the protocol. The LBA can be any number from 0 to the last sector of the card. In the example, this will be the LBA 2, which is the second hidden sector after the master boot record in FAT file system and is typically not used to hold data. Note that even if that LBA contains valid data, this protocol will preserve its values. There are two options for checking the mode support.

The first option to query for support of the protocol is for when the media card puts the CPT mode support signature in the CPTLBA sector. However, this is not preferred if the CPTLBA is a sector that has valid information; e.g., the sector in the FAT/Directory or user data area. If the CPT mode is supported, optionally the card can return the CPTLBA sector with the signature as shown in FIG. 17B, where Bytes 0-31 are "Card Pass Through Mode Supported (padded with blanks)" and bytes 32-511 are 0.

The second option to query for support of the protocol can be used if the CPTLBA sector does not contain the signature supporting CPT mode. In this case, the following protocols are used to check the mode support:

a) Read and save the CPTLBA sector in the host memory area. (No supporting signature)

b) Write the CPTLBA with a sector containing signature for query the CPT mode support.

c) Read the CPTLBA sector for checking the response of CPT mode support.

d) Write the CPTLBA with an original sector from the saved memory area.

Step a) allows for the specified logical address (CPTLBA) to be checked for support while still maintaining any data that may be contained in it as the host reads the CPTLBA sector and save the save in the memory. This is to restore the sector in case the media card does not support the Card Pass Through mode. This write does not use CPT mode command.

FIG. 17C shows step b), the writing of the CPTLBA with a sector containing signature for query. Bytes 0-31 contain The host writes the CPTLBA sector with bytes 0-31 as "Card Pass Through Mode Check" (padded with blanks), followed by the command and flags in bytes 32-47. Bytes 48-511 are 0.

In step c), the host reads the CPTLBA sector for the response. If the response is as in FIG. 17D, with bytes 0-31 as "Card Pass Through Mode Supported" (padded with blanks) and bytes 32-511 as 0, The Card Pass Through mode is supported; otherwise, the card does not support CPT protocols. Note that this protocol is different from the first option to query for support of the protocol. The signature is responded when a CPT mode check command is issued.

In step d), the host writes the original data of the CPTLBA sector from the saved memory area. Note that even if the card supports the Card Pass Through mode, this write will not be interpreted as a special CPT command because there is no proper signature.

The input/output protocol is described with respect to FIGS. 17E-17G. To output data to the media card, first writes the CPTLBA with the signature for output, followed by writing the data based on the Data Transfer Length. To write CPTLBA with the signature for output, the host sends a write command to the media card, where the data has the CPT command format with media card specific command embedded. The length is the "Data Transfer length" plus the one sector for the CPT command format. This is shown in FIG. 17E, where the 1 in byte 32 corresponds to the "Data to be written to the media card".

The actual write based on based on the Data Transfer Length is shown in FIG. 17F, where how the media card treats the data depends on the Media Card Specific command As noted with respect to FIG. 17A, the "Data Transfer Length" information in this example is expressed in bytes 33-35 (MSB, LMSB, LSB) in terms of bytes. However, as the read/write data is transferred between the card and the reader in sectors, incomplete sectors can be padded out with 0s if needed. (For example, in the SD card the Authentication Key Exchange (AKE) process uses 8 bytes for challenge and response. Consequently, the host pads out the data sectors with 504 bytes of 0s for challenge1 and response2 data, with the card similarly padding out the challenge2 and response1 data.

To input data from the media card, the host writes the CPTLBA with the signature for input and then reads the data based on the Data Transfer Length. FIG. 17G shows a CPT command to be sent to indicate data are to be read, where the 2 in byte 32 corresponds to the "Data to be read from the media card". To read the data based on the Data Transfer Length, after the host sends a read command to the media card the number of sector to be read are [(Data Transfer Length)/512]. (This is assuming 512 bytes per sector; more generally, the actual sector lengths would replace 512 if different). The starting sector is CPTLBA. Since the previous command is a CPT Input command, the card will send the data to the host based on the Media Card Specific command.

Examples of commands without input or output include "Command without data transfer", "CPT Command abort", and "CPT mode reset". FIG. 17H shows "Command without data transfer", as indicated by the 3 at byte 32.

FIG. 17I shows a "status read" command, indicated by the 6 at byte 32, that allows the host to read the CPT status. For example in an SD card, the status can be implemented as the response data. The status will the first few bytes of the data read back.

Although reference is made to the SD card when a concrete example is needed, FIGS. 17A-17I are not restricted to any particular media protocol and are not media specific commands. To give examples of media specific commands, FIG. 17J shows an embedded command specific to an SD or MMC card and FIG. 17L shows an embedded command specific to a compact flash card.

In FIG. 17J, shows the command format for the SD/MMC example. Bytes 0-35 are as described above. The SD/MMC command fills the Media Card Specific command field. The bytes 48-53 are the SD command, for example a secure read. Some of the flags are required and defined in the Media Card Specific flag field. BLKH indicates whether the command is for a single sector or multiple sectors: 0 if single sector command is used and 1 if multi-sector command is used. APP=1 for an application command. Response Type is the SD response type depending on the command index. The various entries in bytes 48-52 are the actual elements of the SD command, where CRC7 in byte 53 may be optionally set to 0.

To get the response data of the SD command, the user can send status retrieve to get the response. This is shown in FIG. 17K. The response data will be returned as the first 6 bytes of the sector read.

FIG. 17L shows the compact flash (CF) command format for an embedded command. In this case, the command is in bytes 48-54 and provides the elements need to comprise a CF command. In FIG. 17L, Media Card Specific Flags (byte 36-bit 2 to byte 37) are reserved for future commands specific to various card formats.

Third Exemplary Embodiment

The third exemplary embodiment is implemented at the file level, as was the first exemplary embodiment. Here the discussion will focus more on the details of what is placed in the file on the host side. Since device specific commands are embedded within the file, there is no way to harm file system specific data such as the FAT area. From the card's point of view, the different exemplary embodiments will appear similar, the difference more being with respect to how the information is packaged on the host side. When reference is needed to a particular application, the third exemplary embodiment will be that of a secure link to a secure bus.

With the file level implementation, in addition to overcoming the sort of privilege problems that may arise with device driver level implementations, it is also possible to overcome a possible need to have special hardware to send special commands. For example, in some cases at the device driver level, there is a need to have to send special commands to access a secure area of the SD card, but with file level implementation there is no longer a need for this as the information is packaged within file. So, as long as a file can be written and read, any command set can be sent and received with this implementation.

The embodiments of the preceding section are a card driver implementation, operating at the device input/output level. Between the host or PC application and the device or card driver is the operating system (OS) file system. The third set of embodiments is a file I/O implementation, operating on the OS file system. In these embodiments, the host simply tells the file system to write a file to memory device, where the device specific command is again embedded. Although these embodiments may require a little more firmware overhead than the device level embodiments, they can have a number of advantages. For example, at the device level, there is a need to have some knowledge of the hardware involved as an application is developed, whereas by using a file system this becomes independent of the hardware and independent of many details of the bottom level protocol.

As with the device level embodiments, the file level embodiments can be used to send vendor specific commands to respective vendor products, such as Advanced SCSI Programming Interface (ASPI) found in Windows 98/ME/95/DOS and similar examples. In the device level embodiments described above, use was made of a write to a specific logical address, the CPTLBA. In many operating systems, however, to access this logical address requires certain access privileges. For example, certain SCSI command cannot be sent to vendor products if the user has no administrator privileges. As the operating system generally allows the writing of a file, the file level embodiments circumvent this privilege problem by embedding the media specific commands in a file, writing the file to the device, and de-embedding the actual on the device. In many versions of the Windows operating system, the card level embodiment using the exemplary CPTLBA will require administrator privileges, while writing a file will not require any such special access privileges. As before, the exemplary embodiments embed the media specific commands in a data portion of an instruction.

The implementation at the operating system's file system level can again be implemented by the card's card firmware, which is adapted to comply and recognize the protocol. With a read/write command to any LBA, a signature is checked to determine if the data contains embedded media card specific commands. This differs from the device driver implementation where a specific address is used. In other ways, as seen from the card there is little difference between the device driver level embodiments of this section and the file system level embodiments of the preceding section.

As in the preceding section, the exemplary embodiment of a file-based implementation divides the protocol into an "instruction" part, in which the media specific command is embedded, and a "data in/out" part, if the command involves any data transfer, to hold the data associated with the command. When the protocol command is received by the card, the firmware checks for a special signature during the read or write operation to determine if the given LBA is the instruction part, this need only be done for the first data sector of the protocol command for embodiments where the signature is always embedded in the first data sector. From the host side programmer's point of view, the client application issues a simple file or logical sector (LBA) write operation having an instruction part and, maybe, a data in/out part. The firmware performs the logical to physical mapping if the command involves either reading data or writing data to the media. The firmware would detect API instruction part during what is received as a write or read from the transmission protocol.

In an exemplary embodiment, the instruction portion of the protocol command will contains signatures, inquiry commands, vendor specific commands, and updateable fields. The size here will be restricted to a multiple of 512 bytes (which is the size of a most commonly used data block). The format of the instruction page in the exemplary embodiment is shown in FIG. 18A, which is quite similar to FIG. 17A but with additional detail. The first 36 bytes are not encrypted, with the rest encrypted/decrypted according to the Encryption/Decryption information that states the presence of the supported encryption algorithm.

Referring to the various fields shown in FIG. 18A, Bytes 0 and 1 are the signature bytes used to indicate an LBA that could be a candidate for API instruction pages. The firmware will check the API signature if these two bytes match. In the following example, for Byte 0 is 19, and Byte 1 is 73. The API signature follows in bits 2-34 and is a string of single by characters. In the following example, the signature is taken as "Advanced Programming Interface".

Byte 35 is Encryption/Decryption (E/D) information that tells the firmware if the subsequent instruction pages and data pages are encrypted. If it is not encrypted, then this field should be set to API_NO_ENCRYPTION; otherwise, it should be set to encryption name so that the firmware can decrypt and encrypt the instruction page or pages starting from byte 36 and data pages. Bytes 36-39 are the Firmware Operation Status field and will be updated based on the success or failure of the operation. It will be set to API_OP_SUCCESS if everything is OK; otherwise, it will be set to error values or API_OP_NO_SUCCESS. It is suggested that its default value be set to 0xFFFFFFFF when issuing command. After writing, the caller can read instruction page to verify the whether or not the requested operation succeeded. The Vendor Identifier field (Bytes 40-43) can be used as an unique vendor identifier. This field can be used by the calling environment to identify itself to the firmware if the firmware also requires a valid vendor ID.

The Number of Instruction Pages field (Byte 44) tells the firmware the total number of instruction pages, where the instruction pages are on the 512 bytes boundary. Similarly, the Number of Data Pages field (Bytes 45-46) tells the firmware total number of data in/out pages attached to the Instruction part. Data page size does not necessarily mean the data size in bytes; in certain cases, padding may have been added to the end of the data bytes. For example, DES requires that the data size in bytes must be a multiple of eight. The Data Size in Bytes field (Bytes 47-50) field tells the firmware total number of bytes within the data page than contain valid data. In the case of reading from the media, this field should be updated by the firmware with the actual processed byte size within the page area. In terms of writing data to the media, this is length in bytes of the data size. If data is encrypted, then the firmware first decrypts the whole content of data pages and then does the extraction. Byte 51, bit 0 is a flag for data transfer, set to "0" if current command does not require data transfer and set to 1 if current command requires data transfer.

Byte 51, bits 1 and 2 are a flag for the direction of the data transfer. The value "00" indicates that the data transfer is for input on the current command and the firmware will process commands during write time and will nullify the data pages once written to the media. The value "01" indicates that the data transfer is for input on the current command and the firmware will process commands during write time with no nullification. The value "10" indicates that the data transfer is for output on the current command. The value "11" is reserved. Byte 51, bit 3 to Byte 52 are Media Card Specific Flags and depend on the type of the media card. Bytes 53-63 are fields_reserved for future use.

The Media Card Inquiry commands field (Byte 64) will be used to inquire the current state and capabilities of the media card. Known supports include: Is API protocol Supported; Get supported E/D algorithms; and Disable API Protocol Support. The Media Card Inquiry Command Return Status field (Bytes 65-68) can_be used to hold the return value of the Media Card Inquiry Commands.

Media Card Specific command length (Bytes 69 and 70) specifies the total number of command bytes that command field stores, where the real command that the media card will run is in Media Card Specific command (Bytes 71-511).

Appended to the instruction page(s) will be any data in/out pages. The caller environment and the firmware based on established cryptosystem algorithm will encrypt/decrypt content. In some cases it is not desirable to write the data pages to the media, in which case the firmware must process the commands before writing and then write the instruction page only to the media so the user can read it back and see the status of the operation.

FIGS. 18B-F give several examples of media specific inquiry commands, such as a query for support of the API protocol used to check on whether the media card supports the API protocol before the real commands are sent. A particular procedure is illustrated with respect to FIGS. 18B and 18C. When a file system is used to access the media, a file will be written having content of only one instruction page. The example of FIGS. 18B and 18C will demonstrate how to query the protocol through the file system.

Calling environment opens a file, say "myAPI.bin". To inquiry for support of the protocol, the caller can write 512 bytes, shown in FIG. 18B, to the file and issues a write file command. After issuing the write file command, the media will take appropriate actions, whether during the writing of the file to the media or during reading it. For the example, assume the media card processes the instruction page before writing. In this case, the following actions will be taken:
  a) Verify Signature Bytes
  b) If match, verify API signature
  c) If match, go through media specific flags if any.
  d) Check Media Card Inquiry Command request, which is 1
  e) Verify that the data field and Direction field is 0 as there is no data transfer.
  f) Process commands, update the fields and write the file to the media. When the user reads the file, myAPI.file, from the media caller needs to check two fields: (1) Firmware Operation Status: If command operation completed successfully this field will be updated with API_OP_SUCCESS or some error values if it failed and (2) Media Card Inquiry Command Return Status will be checked only when command operation completed successfully. The field will be updated with 1 if the protocol is supported or with 0 if it is not. See FIG. 18C.

If protocol is not supported, or the card have been disabled for this protocol support, these two updateable fields will have maintain their initial default values of 0xFFFFFFFF.

A second example of a media specific inquiry command is a query to determine which encryption/decryption algorithms are supported, where the media card must be checks if the API protocol is supported and active before this query. This is illustrated using FIGS. 18D and 18E. Similarly to the a query for support of the API protocol, discussed with respect to FIGS. 18B and 18C, when using a file-type system to access the media, a file will be written having content of only one instruction page. The calling environment will write a file; say, myAPI.bin to use the same example as before.

Calling environment will write a file; say myAPI.bin. To inquire about support for this command, the user will include 512 bytes as show in FIG. 18D and issue a write file command. Assuming that the media card processes the instruction page before writing, then an exemplary set of actions is as follows:
  a) Verify Signature Bytes;
  b) If match, verify API signature;
  c) If match, go through media specific flags if any;
  d) Check Media Card Inquiry Command request, which is 2;
  e) Verify that the Data field and Direction field is 0 as there is no data transfer; and
  f) Process commands, update the fields, and write the file to the media. When the user reads the file, myAPI.bin, from the media, the caller will check two fields: (1) Firmware Operation Status: If command operation completed successfully this field will be updated with API_OP_SUCCESS or some error value if it failed and (2) Media Card Inquiry Command Return Status will be checked only when command operation completed successfully. This filed will return a 32-bit integer, where 0 means no encryption/decryption algorithm is supported. Otherwise each bit for each predefined encryption/decryption algorithms will be set. For example, suppose DES is in Bit 1, 3DES is in bit 3, and AES is in bit 32, then return value should be:

MSB 10000000 00000000 00000000 00001010 LSB

The result is shown in FIG. 18E. Note that the maximum number of algorithms is 32 in the exemplary embodiment. Based on the return value, one can determine the type of the E/D algorithm that is supported so it can encrypt instruction page (starting from byte 36) and data pages by setting the same predefined algorithm name in byte 35. Note that byte 35 should have only one bit set at any given time. If more than 1 bit is set, then it will fail.

Another example of a media specific inquiry command is a query to determine if the media card supports the API protocol and if so, disable it. Similarly to the query to determine which encryption/decryption algorithms are supported, a file will be opened where the content of the file will have only one instruction page. Calling environment will open a file, say, again, myAPI.bin. To inquiry about the support for this command, a user could include the 512 bytes shown in FIG. 18F in a file and issue a write file command.

After writing the file, a user can read the fields and verify if the Operation Completed Successfully by first checking: (1) Firmware Operation Status: If the command operation is successfully completed, this field will be updated with 0 or 1 if it failed; and (2) Media Card Inquiry Command Return Status will be checked only when the command operation is completed successfully. It will be 1 if protocol is disabled or be 0 for failure.

FIGS. 18G and 18H show particular examples of file system based, media specific read and write commands. Prior to issuing a firmware command to the media card, the card is checked to see whether or not it supports the API protocol. As with the previous protocol, if a file system is used to access the media, then a file will be opened with content of one or more instruction pages and any associated data pages. An example of a media specific write command is shown in FIG. 18G.

More specifically, suppose that the caller wants to issue a command (e.g. "D5" in the SD card command set) to take the data page and write it to some hidden area. The calling environment will open a file and the user will prepare the data page as shown in FIG. 18G. Bytes 00-34 are as in FIGS. 18A-18F, with Byte 35 of the instruction in this example indicating that there is no encryption being used. Bytes 36-39 again indicates the operation status of the firmware, where the italics (both here and in the preceding) indicating that the field is firmware updatable, and the vendor or media identifier (the example will use the Vendor Identifier as "SNDK") follows in Bytes 40-43. The embedded command will then be specific to this media/vendor. Bytes 44-50 indicate the number of instruction pages, here only the shown page (NIP=1), the number of data pages, also one in the example (NDP=1), and the data size specified as the number of bytes, here taken as the 512 bytes of a sector (DSIB=512). Bytes 51-68 of the instruction provide the previously described instruction information as needed for the specific command.

The actual embedded command has its length (in bytes) specified in bytes 69-70, which in this case is the single byte 71 contained the exemplary "D5" instruction indicating a write to a reserved or secure area. The remaining area allocated for the media specific instruction (bytes 72-511) is then padded out with zeros to make a full sector. The (here) 512 bytes of data for the actual specific command follow as the next sector.

In FIG. 18G, note that data field (DATA=1) indicates that this instruction contains "input" and that the direction field (Direction=00) tells the firmware to process the data and write the page to media. Since file system will write the data pages to media (1024 bytes as seen by the file system, the first 512 being for the embedded command), the firmware will pad out data pages with 0s or FFs as needed.

The caller can verify if the operation has succeeded by reading the file from the media card and checking the Firmware Operation Status field. If the operation has been completed successfully, this field will be updated with API_OP_SUCCESS or, if not successful, it will be updated with some error values or API_OP_NO_SUCCESS. Note that since the direction was 00, the data pages should be 0s or FFs.

Assuming that the media card processes the instruction page before writing, then an exemplary set of actions is as follows:
a) Verify Signature Bytes;
b) If the signature matches, verify the API signature;
c) Check if the instruction page (from Byte 36) is encrypted;
d) If encrypted, decrypt the Instruction page (from Byte 36) and data pages;
e) Verify the Vendor ID signature;
f) If the Vendor ID matches, go through media specific flags (if any);
g) Check Direction and Data fields;
h) Process the actual embedded, media specific commands; and
i) Update the Instruction Page's Firmware Operation Status field, encrypt (if requested) the instruction page after byte 36, and write it to the media. Since the direction is 00, write data pages as 0s or FFs as needed.

Media specific read commands can be implemented in a number of ways, some of which are discussed more in the following section. An implementation of a file system based, media specific read command, which is similar in structure to the write structure of FIG. 18G, is described with respect to FIG. 18H.

The media specific command is now D6 and Direction is 10, as it is reading from the media. In addition, there is the flexibility to modify the content based on what command and established protocol are used. For example, the card can be told to write this file and the file has special command to tell firmware to encrypt the content before writing. Thus, the written content may be transformed to another form before being written. The same can also be applied to read operation as well.

FIG. 18H shows the case where the caller wants to issue a command (e.g. "D6" in the SD card command set) to read a sector of data from a hidden area and place it under the data page. The calling environment will open a file and the user will prepare the data page as shown in FIG. 18H, where the Vendor Identifier is again taken as "SNDK".

The Data field indicates that this is "output", so data page will be updated and Direction field tell the firmware to process the data during reading. Another possibility for firmware is to process the command, update the data page, and write it to the media. Consequently, the firmware will write the 1024 bytes to the media. When the firmware reads the file, it will detect that this an instruction page, then it will read the command and update the data fields appropriately. The caller can verify if the operation has succeeded by reading the file from the media card. Once file is read, the caller can check the Firmware Operation Status field. If the command results in a successfully completed operation, this field will be updated with API_OP_SUCCESS; if not, then it will be updated with some error values such as API_OP_NO_SUCCESS. The amount of data read can also be verified by checking the DSIB field to see whether it has been updated to 512.

Fourth Exemplary Embodiment

As noted earlier, one potential problem associated with the first exemplary embodiment is file segmentation. Because the first exemplary implementation relies upon reading and writing from/to the same file location (LBA_XYZ of FIG. 10A), the entire file should be stored to a sequential group of sectors in the memory. However, if the data to be stored starting at LBA_XYZ is larger than the available segment, the file system will break it apart. Therefore, the maximum data length for the application specific commands should be no larger than the smallest OS file allocation unit (cluster), so that the used logical address (LBA_XYZ) is associated with a logical block address having sufficient space.

In some applications, it may be desired to allow the embedded command length or associated embedded data length to exceed the smallest OS file allocation unit. In other applications, it may be desired to allow a series of related embedded commands (and associated data) to be transmitted to the card, where the card can associate related commands and/or data with each other upon receipt. In other applications, a host may send non-embedded commands 511 and data 513 to a first processing unit in the card also called a storage command processing unit, while sending embedded commands 513a and data 513b to a second processing unit in the card, also called an embedded command processing unit. In the fourth exemplary embodiment, the file level implementation in the first exemplary embodiment is extended to incorporate one or more of these features, as explained below.

Figure 19:
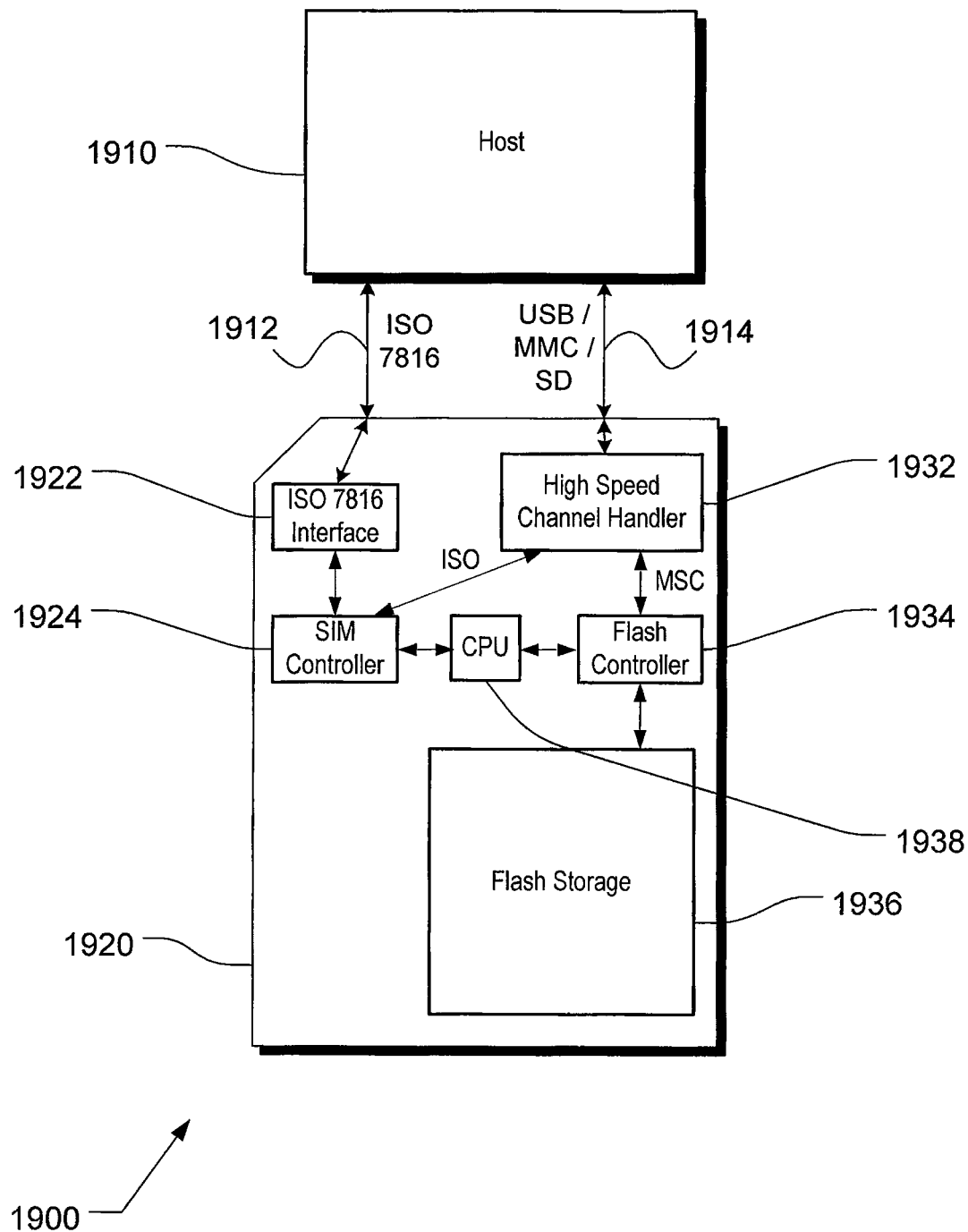
FIG. 19 is a diagram illustrating a system for accessing a non-volatile memory card via two communication interfaces.

FIG. 19 is a diagram illustrating a system for accessing a non-volatile storage card via two communication interfaces. A system 1900 includes a host 1910, and a non-volatile storage card 1920. The host 1910 and the non-volatile storage card 1920 may be implemented with hardware, software, or a combination of hardware and software, where software includes firmware. In one implementation, the non-volatile storage card 1920 is a high-capacity SIM card. The host 1910 and the non-volatile storage card 1920 may be in communication over a first communication interface 1912 and a second communication interface 1914. In one implementation, the first communication interface 1912 is an ISO 7816 communications interface 1912. The second communication interface 1914 may be a Universal Serial Bus interface, MultiMedia Card interface, Secure Digital interface, or any interface suitable for communicating with a non-volatile storage card. If the second communication interface 1914 is a Universal Serial Bus Interface, the host 1910 may send commands to and receive data from the high-speed channel handler 1932 according to the USB protocol.

The non-volatile storage card 1920 may comprise a processor 1938, an ISO 7816 communications interface 1922, a SIM controller or first processing unit 1924, and non-volatile SIM storage 1936, and may also comprise a high-speed channel handler 1932, a flash controller or second processing unit 1934, and a non-volatile flash storage 1936. In some cards, the non-volatile SIM storage 1936 and non-volatile flash storage 1936 may be portions or partitions of the same non-volatile memory, such as separate address regions of memory. In some implementations of the non-volatile memory card 1920, a processor 1938 may allow security features of the SIM controller 1924 to limit or block access to the non-volatile flash storage 1936 accessed through the flash controller 1934.

In one implementation, a host 1910 may communicate over the ISO 7816 interface 1912 with a non-volatile storage card 1920, such as a legacy SIM card, R-UIM card, or Smart Card, that does not contain a high-speed channel handler 1932, a flash controller 1934, and a non-volatile flash storage 1936. In another embodiment, a host 1910 that is not capable of communicating with the non-volatile storage card 1920 using a USB interface 1914 may instead utilize the ISO 7816 communications interface 1912 to do so. In yet another embodiment, a high-capacity non-volatile storage card 1920 includes both an ISO 7816 communications interface 1922 and a high-speed channel handler 1932, and the host 1910 may communicate with the non-volatile storage card using the ISO 7816 communications interface 1912 and the USB interface 1914, a second communication interface 1914.

In one alternative, the host 19910 and the non-volatile storage device 1920 are contained within the same physical enclosure, and non-volatile storage device 1920 is not removable from the system 1900. In another implementation, the non-volatile storage device 1920 is a removable media, such as a small form factor non-volatile storage card, and may be connected to and removed from the host 1910 and the system 1900. In this implementation, the host is configured to receive a non-volatile storage card. Hosts that may receive a non-volatile storage card may include personal computers, notebook computers, personal digital assistants (PDAs), various data communication devices, digital cameras, cellular telephones, portable audio players, automobile sound systems, and similar types of equipment.

The host 1910 may be implemented in hardware, firmware, software, or any combination thereof, arranged to implement the functionality of the host 1910, such as the functionality described in the embodiments of FIGS. 19-25D and the accompanying text. In one embodiment, the functionality of the host 1910 is implemented utilizing a processor configured with processor executable instructions. The processor executable instructions may be stored in random access memory (RAM) within the host 1910, or non-volatile memory, such as a read-only memory (ROM), EEPROM (Electrically Erasable and Programmable Read Only Memory), or E-flash (embedded flash) within the host 1910.

The ISO 7816 interface 1912, the SIM controller 1924, the high-speed channel handler 1932, and the flash controller 1934 may each be implemented in hardware, firmware, software, or any combination thereof, arranged to implement the required functionality, such as the functionality described in the embodiments of FIGS. 19-25D and the accompanying text. In one embodiment, the ISO 7816 interface 1912, the SIM controller 1924, the high-speed channel handler 1932, or the flash controller 1934 are each implemented utilizing a processor, such as CPU 1938, within the non-volatile storage card 1920 configured with processor executable instructions. The processor executable instructions may be stored in random access memory (RAM) within the non-volatile storage card 1920, or non-volatile memory, such as a read-only memory (ROM), EEPROM (Electrically Erasable and Programmable Read Only Memory), or E-flash (embedded flash) within the non-volatile memory card 1920.

The high-speed channel handler 1932 may include hardware, firmware, or software, or any combination thereof, necessary to receive data from or transmit data to the high-speed interface 1914, and store and retrieve data from the flash storage 1936 by exchanging commands and data with the flash controller 1934. In one embodiment, where the high-speed interface is a USB interface, the high-speed channel handler 1932 may include the hardware and software required to implement a USB endpoint compliant with the USB Specification and Mass Storage Class Specification. For example, some of the required functions are similar to the functionality implemented by the ST Microelectronics ST7267 USB 2.0 high-speed mass-storage microcontroller. In one embodiment, the high-speed channel handler 1932 includes a USB PHY, a USB buffer RAM, a CPU for execution of code necessary to transmit and receive data and commands according to the USB bulk transfer protocol, and to store data to and read data from the flash storage 1936 utilizing the flash controller 1934, a non-volatile memory to store instructions executed by the CPU, and a communication interface to exchange commands and data with the flash controller 1934.

The host 1910 may send data to and receive data from the non-volatile storage card 1920, utilizing either the ISO 7816 interface 1912, or the USB interface 1914. In one example, the host 1910 sends a command to write data to the storage accessible over the ISO 7816 interface 1912, such as the SIM storage. The host may transmit the command to the non-volatile storage card 1920 over the ISO 7816 interface 1912. The command may be received by the ISO 7816 communications interface 1922, and the SIM controller 1924 may store the received data in the non-volatile SIM storage 1936 using the processor 1938 and the flash controller 1934. The host 1910 may receive an acknowledgement from the ISO 7816 communications interface 1922 in communication with the non-volatile storage card 1920 over the ISO 7816 interface 1912. Similarly, the host 1910 may send a command to read data from the storage accessible over the ISO 7816 interface 1912, such as the SIM storage. The host 1910 may also send commands to SIM controller 1924 to execute that do not involve storing data to and retrieving data from the non-volatile SIM storage 1936.

In another example, the host 1910 sends a command to write data to the storage accessible over the USB interface 1914. The command may be received by the high-speed channel handler 1932, and high-speed channel handler 1932 may transmit the command and associated data to the flash controller 1934. The flash controller 1934, in turn, may store the received data in the flash storage 1936. In one implementation of the non-volatile storage card 1920, the processor 1938 allows security features within the SIM controller 1924 to limit or block write access to at least some portions the non-volatile flash storage 1936 accessed through the flash controller 1934. When the write access is complete, the host 1910 may receive an acknowledgement from the high-speed channel handler 1932 of the non-volatile storage card 1920 over the USB interface 1914. Similarly, a host 1910 may send a command to the non-volatile storage card 1920 to read data from the storage accessible over the high-speed interface 1914.

In the above example, if the processor 1938 blocks the write or read access to the non-volatile flash storage 1936, the host 1910 may receive a status, result, flag, lack of acknowledgement, or other indication that the access failed, from the high-speed channel handler 1932 of the non-volatile storage card 1920.

The ISO 7816 communications interface 1912 and the USB interface 1914 may provide alternative channels for storing data to and reading data from the non-volatile storage card 1920. However, the host 1910 may more optimally utilize non-volatile flash storage 1936 in a non-volatile storage card 1920 if the non-volatile flash storage 1936 is accessible over a high-speed interface, such as a USB interface 1914, which is comparatively faster than the ISO 7816 communications interface 1912, and thus, may facilitate higher throughput of commands and data. Thus, a data interface with increased bandwidth may allow more optimal use of the increased storage capacity of a high-capacity SIM card. However, supporting two communications interfaces 1912 and 1914 requires additional hardware and software resources. Thus, in one embodiment, the need for an ISO 7816 communication interface 1912, and the associated hardware and software, may be reduced or eliminated by transporting ISO 7816 commands and data (sometimes referred to as Application Protocol Data Units) over the second communication interface 1914, such as a USB interface, instead.

In the fourth exemplary embodiment, APDU embedded commands and data may be transferred within file data transmitted to the card 1920 over the second communications interface 1920. Returning briefly to FIG. 7, a host structure incorporates a layer 1059 specific to the device applications, such as exchanging APDU commands and data with the card 1920. For "standard" device operations, not incorporating the APDU operations, the layer 1059 is not used and the layers 1053, 1057, and 1055 will largely operate as in the prior art to read and write file data to the card 1920. When an APDU specific instruction is to be used, the device application layer 1059 will be interposed between the file system 1057 and the host layer 1053 in order to format and embed the APDU commands into the file data to be transmitted from the host 1910 to the card, and to extract the APDU results data received at the host 1910 from the card 1920.

As in the first exemplary embodiment, the device driver 1055 can include interface and pipe sub-layers to provide common functionality and can be used with minimal changes with all application specific protocols. The host application 1053 should match the protocol layer according to the particular application. The interface sub-layer within the device driver 1055 will expose a standard set of device functions. For example, these would include: hardware initialization and configuration; drive open and close routines; read and write operations; and erase. It will also include a function to the appropriate communication method and initialize the pipe accordingly.

Returning briefly to FIG. 5, a command 510 may include a command portion 511 and a data portion 513, where the data portion includes a signature, an embedded command 513*a*, and an embedded data portion 513*b*. In a file level embodiment, the data portion 513 includes at least part of file data that makes up a single file. FIG. 20A shows a placement of an APDU command and data within a file structure transmitted between a host and a device, such as in the data portion 513 of the instruction 510. The table 2010 shows one embodiment of file structure including an APDU command. The file format may include an APDU command signature. This signature may enable hardware or software, such as the high-speed channel handler 1932 of FIG. 19, to inspect file data received from the host and detect an APDU command. The file structure may also include an expected buffer size, which indicates the size of the file written to the device. The expected buffer size value may allow the receiver of the file data, such as the high-speed channel handler 1932 of FIG. 19, to confirm that all of the expected file data APDU information has been received. The buffer size may indicate the number of bytes, sectors, or blocks to receive. The file structure 2010 may further contain an APDU command length field, which specifies the length of the APDU command and/or APDU data contained in the file. The length may be specified as a number of bytes of command and/or data. The file structure 2010 may contain an APDU buffer, to hold the APDU command and/or APDU data. The APDU command may consist of the APDU class of instruction (CLA) field, instruction (INS) field, parameters (P1 and P2) fields, length of command data (Lc) field, and length of expected response field (Le). The command parameters generally follow the APDU command format specified in Part 4 of the ISO 7816 specification. While the length of the file shown in the file structure 2010 of FIG. 20A is 512 bytes (one block), file structure 2010 sizes greater than one block are also possible.

The file may also include an application identification field, and a tag number field. The application identification field may indicate the host application 1053 sending the APDU command. The tag number may identify a particular user of that host application 1053. Taken together, the application identification field and the tag number may identify one or more commands associated with a command sequence or a command set, and thus the application identification field and the tag number may be individually or collectively thought of as a message set identifier. For example, a sequence of two or more embedded commands may be transmitted from the host 1910 to the device 1920 for execution, where each embedded command 513*a* is transmitted in file data 513 of a separate file, using a separate instruction 510. The application identification field and tag number may allow the device 1920 to associate each received embedded command with other previously received embedded commands having the same application identification and tag number field values. In another example, a two or more files may be transmitted, where the first file contains an APDU command or partial APDU command, and a subsequent file contains the remainder of the APDU command or data associated with the APDU command. The application identification and tag number values may allow the card 1920 to re-assemble a complete APDU command from partial APDU commands received in two or more file write instructions 510, or associate a received APDU command with the corresponding received APDU data received in different instructions 510. In another example, the application identification and tag number values may also allow the SIM controller to process sequences of APDU commands to perform complex functions, such as calculating a credential or an encryption result in several steps, using APDU commands received in separate transmissions. In doing so, the SIM controller 1924 may store intermediate results or variables that may only be operated upon by subsequent commands that have the same application identification and tag number values.

FIG. 20B shows a placement of an APDU response within a file data structure transmitted between a host and a device. The table 2020 shows one embodiment of a format of a file data structure including APDU protocol command status words (SW1, SW2) and APDU response data. The file data may be read from the card 1920 by the host 1910, and the host 1910, specifically, the device application layer 1059, may extract the APDU command status words and APDU response data. The card 1920 may gather the file data information, and transmit the file data to the host in response to a read request. The command status word parameters generally follow the APDU command format specified in Part 4 of the ISO 7816 specification. In this embodiment, the value of the expected response field (Le) within the corresponding APDU command is equal to the number of bytes of the APDU response data. If the value of the expected response field (Le) is equal to zero, then the file data contains APDU protocol command status words (SW1, SW2) and no APDU response data. The overall size of the file structure 2020 for response and status data may be greater than one block.

The file structure 2020 may also include an application identification field and a tag number. As in the case of the file structure 2010 utilized for exchanging commands and associated data, the application identification field may indicate the host application 1053 that is sending the APDU command that triggered the generation of an APDU result or APDU status. The tag number may identify a particular user of that host application 1053. The application identification field and tag value may identify response data or status associated with a single command sequence. For example, the application identification field value and tag number may allow host 1910 to associate a received APDU command status word pair and received APDU response data with a previously transmitted APDU command having an application identification field and tag number field of the same value.

As stated earlier, an instruction such as instruction 510 of FIG. 5 may transmit a file structure 2010 in its data portion 513, from a host 1910 to a card 1920. In some cases, the operating system (OS) may split the instruction 510 into several pieces, possibly even interleaving parts of other instructions between the pieces. In these cases, the file system 1057 and device driver 1055 can break up the instruction 510 so that the command portion 511 is attached to anywhere from none to all of the data portion 513, with the rest of the data portion following in one or more subsequent transfers. In these cases, the subsequent transfers for the remaining portion of the data will lack the signature portion of section 513a and appear as a standard command. Such a division could also occur for data being transferred from the card 1920 to the host 1910 in a read operation. As noted previously, if it is known that the OS will not split up an instruction 510, or if the OS can be instructed not to do split up an instruction 510, the procedure for exchanging embedded APDU commands, data, results, and status can be simplified. This was discussed first with respect to the flow of FIG. 10A and the corresponding state machine diagram of FIG. 12. Otherwise, the procedure previously described FIG. 10B and the accompanying text may be utilized to operate where the file system 1057 and device driver 1055 can break up an instruction 510 into several pieces.

In one example, the instruction 510 comprises a write command in the command field 511, with the data field 513 comprising file data, such as the file structure 2010 of FIG. 20A. When the host application 1053 decides to send a write command, the first sector transferred will have the above format. If necessary, the next data blocks sent from the host will additional APDU data. If the host application 1053 chooses to initiate a read command of APDU status/result data, such as the file structure 2020 of FIG. 20B, the host 1910 first sends a write command to the chosen LBA (LBA=LBA_XYZ) with the above single sector format and then a read to the same LBA. This is shown in the flowcharts of FIGS. 10A and 10B, as previously discussed.

The pipe sub-layer in the device driver 1055 initiates read and write operations to the Command Pass Through LBA by reading and writing from/to the same file location, indicated as LBA_XYZ in FIG. 10A for the case where the OS will transfer the entire instruction in a single transfer. This need not be a predetermined address, but any logical block address. If the OS does not always transfer the entire instruction 510 in a single transfer, part of the data 513 of a write instruction will show up at the card without the card pass through signature; consequently, what appears to be a standard command in the transmission protocol with no signature attached could actually be the rest of an embedded command. For example if the instruction 510 of FIG. 5 has a data portion 513 of ten blocks, the host operating system may send only the first five blocks of the data portion attached to the instruction, with the remaining five blocks being transmitted later. When this last set of five data blocks is sent, it will lack the initial data block 513a, which contains the signature and actual APDU command, and could be interpreted as part of a standard command 511 from the transmission protocol. Segmentation may also occur when the embedded APDU command is a read-type command, so that the data is sent from the card 1920 to the host 1910 in portions.

As previously discussed, FIG. 10B extends the flow of FIG. 10A to account for such segmentation in both transmitted APDU embedded commands and received APDU embedded results and status, by replacing the single logical block address LBA=LBA_XYZ with the logical addresses $LBA_{Ri}$ and $LBA_{Wi}$ for read and write processes. By defining an $LBA_{Ri}$ reads as well as an $LBA_{Wi}$ for writes, the device can deal with breaks in the transfer of APDU commands and/or data in either direction. As explained in FIG. 10B and the accompanying text, the card can calculate an expected $LBA_{Ri}$ or $LBA_{W}$ where the fragmented transfer will pick up at the LBA where it left off. Returning to the previous example, if an embedded instruction is contained in a ten block file, and the file is fragmented and transmitted in two five block operations, the LBA where the second five block transfer will resume can be predicted, because the ten blocks are written by the file system to contiguous (sequential) addresses. If a subsequent write operation occurs at this predicted LBA, a signature is not required—the card 1920 may assume that the operation is the resumption of a fragmented operation. The subscript i shows that a concurrent implementation of multiple application specific commands from multiple applications and multi-user host devices is possible.

In this embodiment, a Windows standard file system API (CreateFile, ReadFile, WriteFile and SetFilePointer) may be utilized. In the Windows example, the pre-requirements for the file system implementation require a standard file that contains at least 128 sequential sectors. To ensure the existence of such file, the file is created on formatted card. For example example, a file named "FilePipe" (with certain attributes specified below) is created on the file system of the card. As described above, the device driver 1055 may establish the communication pipe by opening the "FilePipe" file with preferably opens the communication file with the following attributes:
1) Not shared—Block other processes from simultaneously using the communication pipe at the same time.
2) No Buffering—Prevent caching of the file data in the host.
3) Hidden—Indicate to the file system that the host applications treats this file as a system file.

To send an APDU command and associated data to the card 1920, the write buffer is prepared along the lines described above, by organizing data according to the file structure 2010. The file pointer is then reset to ensure that read and write operations are for the same LBA (LBA=LBA_XYZ as explained in FIG. 10A, or LBA=LBA$_{Ri}$=LBA$_{Wi}$ as explained in FIG. 10B). The application identifier and tag number fields in the write buffer may also be configured to associate the embedded APDU command with a previous command or an APDU command that will be transmitted at a later time. The buffer is then sent to the device by calling the "WriteFile" command with the "FilePipe" name. For reading APDU status or result data, the file pointer is first reset, followed by performing a "WriteFile" command to send the command buffer. The file pointer is then reset again to ensure that the write and read operations are done on the same LBA. The "ReadFile" is then performed to obtain the APDU data from the device. The APDU data may have the file structure 2020 format of FIG. 20B. The application identifier and tag number fields in the read data may be utilized to associate an APDU result with a previously transmitted APDU command by a user of a host application.

Returning briefly to FIG. 19, a high-speed channel handler 1932 may identify file data received from the host 1910 that contains APDU commands and data, and may transmit file data to the host 1910 containing APDU response data and command status words. In one embodiment, the high-speed channel handler 1932 may receive file data from the host 1910, and examine the file data to determine if a signature, such as the APDU command signature of the table 2010 in FIG. 20A, is present in the file data. If so, the APDU contents of the file data are extracted by the high-speed channel handler 1932 of FIG. 19, and transmitted to the SIM controller 1924 of FIG. 19, for further processing. In one embodiment, the signature is contained within the first sector of the file data, to limit the amount of data that the high-speed channel handler 1932 must inspect for a signature. Other placements of the signature within the file data may also limit the amount of file data that the high-speed channel handler 1932 must inspect, such as placing a signature in the first 32 bytes of a file.

In another embodiment, the high-speed channel handler 1932 may identify file data received from the host 1910 that contains APDU commands and data by intercepting all file data written to an address or a range of addresses. In one embodiment, the address is a logical block address, and does not correspond to a physical storage address, such as a logical block address associated with a physical storage location within the flash storage 1920.

As previously noted, the high-speed channel handler 1932 receives related APDU commands or parts of a single APDU command in two or more files. When the high-speed channel handler 1932 detects that received file data contains an embedded command, the high-speed channel handler 1932 may also extract an application identifier and tag number from the file data, and forward these values to the SIM controller 1924. The SIM controller 1924 may utilize this information to re-assemble a complete APDU command from pieces received in the file data of different files, or so that APDU data may be associated with a corresponding command received in a separate file. The SIM controller 1924 may also utilize this information to allow received commands to operate on a set of intermediated or scratch variables utilized to calculate a result using several received APDU commands, such as calculating an encryption key.

In another embodiment, the high-speed channel handler 1932 identifies a request to read APDU command status words and APDU response data by receiving a request from the host 1910 to read file data from an address or a range of addresses. In one embodiment, the address is a logical block address, and does not correspond to a physical storage address, such as a logical block address associated with a physical storage location within the flash storage 1920. In response to the request from the host 1910, the high-speed channel handler 1932 returns file data, consisting of APDU command status words and APDU response data received from the SIM controller 1924. In another embodiment, the address is a logical block address that corresponds to a physical storage address, such as a logical block address associated with a physical storage location within the flash storage 1920. The high-speed channel handler 1932 previously received APDU command status words and APDU response data from the SIM controller 1924, and stored the data in the flash storage 1920 as file data. In response to the request from the host 1910, the high-speed channel handler 1932 reads the file data from the flash storage 1920 and returns file data to the host 1910. After the read is completed, the file data may be deleted from the flash storage 1920. In this case, the read operation may trigger the deleting of the file data. In another embodiment, the read file data request from the host 1910 is preceded by a write file data operation. The file data of the write operation consists of an APDU command requesting the non-volatile storage device 1920 to prepare the APDU command status words and APDU response data read for the upcoming read file data request.

In one embodiment, the host 1910 writes to or reads from an address or address range to indicate the transmission of APDU commands and data in a write file data operation, or to indicate the request for APDU response data and command status words in a read file data operation. If several addresses or address ranges are available for this purpose, each address or address range may be utilized to associate files written to or read from an address with a sequence of commands. In other words, the value of the address may supplement or replace the functionality associated with the application identification value in the table 2010 of FIG. 20A or the table 2020 of FIG. 20B.

Referring back to FIG. 19, the system 1900 may also process file read and write requests containing data to be stored to and retrieved from the non-volatile flash storage 1936. Additionally, the embodiments may process file read and write requests, where APDU commands, data, results, and command status information is contained within the file data exchanged between the host 1910 and the non-volatile storage device 1920.

In one example, the host 1910 assembles a file buffer containing an APDU command signature, APDU command length, and APDU commands and/or APDU data. The host then writes the file to the non-volatile storage device 1920 over the high-speed communication interface 1914, using, for example, the Windows WriteFile command. The high-speed communication interface 1914 may be a USB interface, a Secure Digital interface, a Multimedia Card interface, or any of a number of high-speed interfaces capable of passing file data information between a host 1910 and a storage device 1920. The file write command may be to a specific logical block address (if one block is being written) or logical block address range (if multiple blocks are being written). In one embodiment, the logical block address or logical block addresses specified should not correspond to a physical storage location within the non-volatile flash storage 1936. The high-speed channel handler 1932 may receive the instruction 510, including the file data 513, and detect that the file data 513 contains an APDU command (and optionally APDU data). In one embodiment, the high-speed channel handler 1932 examines the received file data 513 for an APDU signature. In another embodiment, the high-speed channel handler 1932 treats all file data written to a particular address or address range as if the files contained APDU commands. The high-speed channel handler 1932 extracts the APDU command 513a (and optional data 513b) from the received file data 513, and passes the information to the SIM controller 1924 for further processing.

In another example, the host 1910 reads APDU response data and command status words by sending a data read request to the non-volatile storage device 1920 over the high-speed interface 1914. The high-speed channel handler 1932 may receive the data read request and detect that the request is to read APDU response data and APDU command status word data. In one embodiment, the high-speed channel handler 1932 treats all read requests from a particular logical block address or address range as a request to read APDU data. In one embodiment, the logical block address or logical block addresses specified should not correspond to a physical storage location within the non-volatile flash storage 1936. The high-speed channel handler 1932 may return data, such as APDU response data and APDU command status data received from the SIM controller 1924, in response to the file data read request. In one embodiment, the returned data utilizes the file format specified in the table 2020 of FIG. 20B.

In yet another example, the host 1910 reads APDU response data and/or command status words by first writing file data to the non-volatile storage device 1920 over the high-speed interface 1914. The write file data contains an APDU Get Response command, which, when intercepted by the high-speed channel handler 1932, informs the non-volatile storage device 1920 to prepare APDU response data and/or APDU command status words for transmission to the host 1910. The write file data may also include an application identifier and tag number, to allow the SIM controller 1924 to retrieve the response data corresponding to a previously executed set of commands. The logical block address associated with the write file data command is stored by the non-volatile storage device 1920, and compared the logical block address associated with a subsequent read file data command sent by the host 1910 to the non-volatile storage device 1920. If the addresses match, the high-speed channel handler 1932 may return data, such as APDU response data and/or APDU command status data received from the SIM controller 1924, in response to the file data read request.

While the fourth exemplary embodiment facilitate the use of the high-speed interface 1914 to transport APDU commands, data, status, and results to the memory card 1920, the host 1910 may still utilize the high-speed interface 1914 to perform non-APDU read/write accesses to the non-volatile storage 1936 in the card 1920 and to send other commands to the flash controller 1934 or the processor 1938. For example, the host application issues a Windows WriteFile command to write file data to the card 1920. In this case, the host 1910 transmits file data 513, and a write request 511, to a non-volatile storage device 1920 over the high-speed communication interface 1914. In this example, the file data 513 does not contain APDU commands 531 and/or data 533. The high-speed channel handler 1932 receives the file data and the write request, and may determine that the received file data does not contain APDU commands or data. In one embodiment, the high-speed channel handler 1932 makes this determination by inspecting the file data for an APDU command signature and failing to find the signature. In another embodiment, the high-speed channel handler 1932 makes this determination by examining the address specified in the write request. If the specified address is not one of a set of logical block addresses or is not within a logical block addresses range, the high-speed channel handler 1932 concludes that the file data does not contain APDU commands or data. In one embodiment, the logical block address or logical block addresses utilized in the determination correspond to physical storage locations within the non-volatile flash storage 1936. After reaching this conclusion, the high-speed channel handler 1932 forwards the write request and data to the flash controller 1934 for execution of the command and storage of the file data in the non-volatile flash storage 1936.

In one example, the host application issues a Windows ReadFile command to read data from the card 1920. In this example, the host 1910 transmits a read request to a non-volatile storage device 1920 over the high-speed communication interface 1914. The read request is to read data stored in the non-volatile flash storage 1936, and not to read APDU response data or command status words. The high-speed channel handler 1932 receives the read request, and may determine that the received request is not a request to read APDU response data or APDU command status words. In one embodiment, the high-speed channel handler 1932 makes this determination by examining the address specified in the file read request. If the specified address is not one of a set of logical block addresses or is not within a logical block addresses range, the high-speed channel handler 1932 determines that the file read request is not a request to read APDU response data or APDU command status words. In one embodiment, the logical block address or logical block addresses utilized in the determination correspond to physical storage locations within the non-volatile flash storage 1936. After making the determination, the high-speed channel handler 1932 forwards the read request to the flash controller 1934. File data is retrieved from the non-volatile flash storage 1936 and returned to the host 1910.

Thus, in the fourth exemplary embodiment, commands and data in one protocol, such as the APDU protocol, may be inserted into a file, and transported from a host to a storage device utilizing a communication interface in another protocol, such as a USB communications interface. A high-speed channel handler 1924 may identify the presence of commands and data in one protocol, such as the APDU protocol, by detecting a signature, or by determining that the write request is to a specified address or address range. Once detected, the high-speed channel handler may extract APDU commands and data from the file data. The extracted APDU commands and data are redirected to an APDU processing unit 1924 for execution. If the file data does not contain APDU commands and data, the file data is directed to a flash controller unit 1934 for storage in non-volatile flash storage 1936 according to the command 511. Further, the high-speed channel handler may receive a request for APDU response and command status word data in the form of a host read request of file data. In response to this request, the high-speed channel handler 1932 may receive the data from an APDU processing unit 1924, format the data according to the expected file structure 2020, and may transmit the data from a storage device to a host utilizing a communication interface in a second protocol, such as a USB communications interface 1914. By utilizing an application identification field and a tag number within received or transmitted file data, related commands and/or data received in separate file transmissions may be reassembled or associated with one another by the storage device and the host. With this embodiment, the need for additional hardware and/or software, such as the ISO 7816 interface 1922, and the ISO 7816 communication interface 1924, may be eliminated, as all APDU commands and data may be transported by the USB communications interface 1914 and corresponding hardware and/or software, such as the high-speed channel handler 1932. While the foregoing embodiment described the transmission of APDU commands and data within a file, other command and data formats may also be transmitted within files using a similar approach.

Figure 21A:
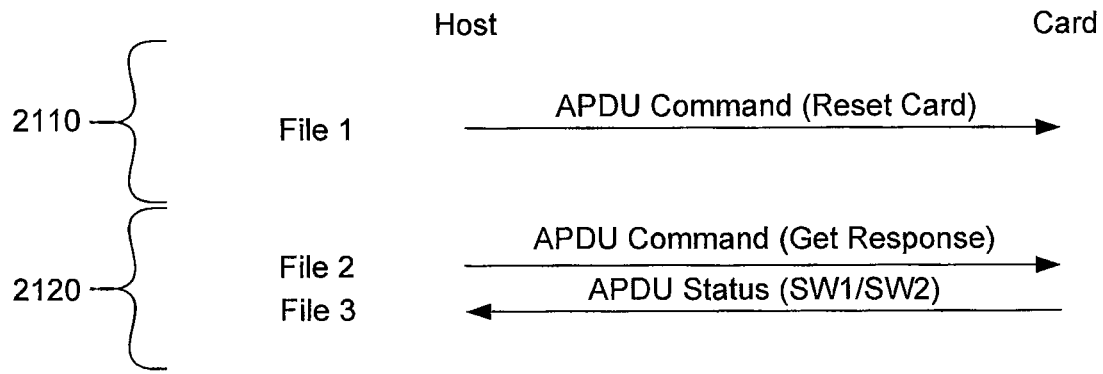
FIG. 21A shows the transmission of exemplary APDU commands, and reception of APDU status, using sequences of file data exchanges.

The exemplary file data transfers can be combined into sequences useful for exchanging APDU commands and data between a host 1910 and a non-volatile storage device 1920. FIG. 21A shows the transmission of exemplary APDU commands, and reception of APDU status, using sequences of file data exchanges. Each arrow shown in FIG. 21A represents one file exchanged between the host 1910 and the non-volatile storage device 1920, and the direction of the arrow indicates the direction of file data transferred. A file may be exchanged between host 1910 and the non-volatile storage device 1920 in one or more transmission events, where at least a portion of a file is transmitted during each transmission event.

For example, one sequence consists of three file exchanges 2110, 2120. In the first file exchange 2110, an APDU Reset command, without accompanying data, is placed within a file to be transmitted to the non-volatile storage device 1920. The file containing the APDU Reset command is then is transmitted from the host 1910 to the non-volatile storage device 1920 in one or more instructions 510 containing file data 513. Because the APDU Reset command does not have a corresponding data argument, the file does not contain any data accompanying the APDU Reset command.

In the second and third file exchanges 2120, the host 1910 places an APDU Get Response command in a file, without accompanying data, and transmits the file to the non-volatile storage device 1920. The host 1910 then reads a file from the non-volatile storage device 1920. In one embodiment, the file is read from the same logical block address that the file containing the APDU Get Response command was written to. The host 1910 extracts the APDU SW1/SW2 status result data from the file data received from the non-volatile storage device 1920. The second and third file exchanges 2120 may be utilized to send a command to the non-volatile storage device 1920 and read a result. In combination, the first, second, and third file exchanges 2110, 2120 may be utilized to reset the non-volatile storage device 1920, and then read the APDU status after the reset has been completed.

Figure 21B:
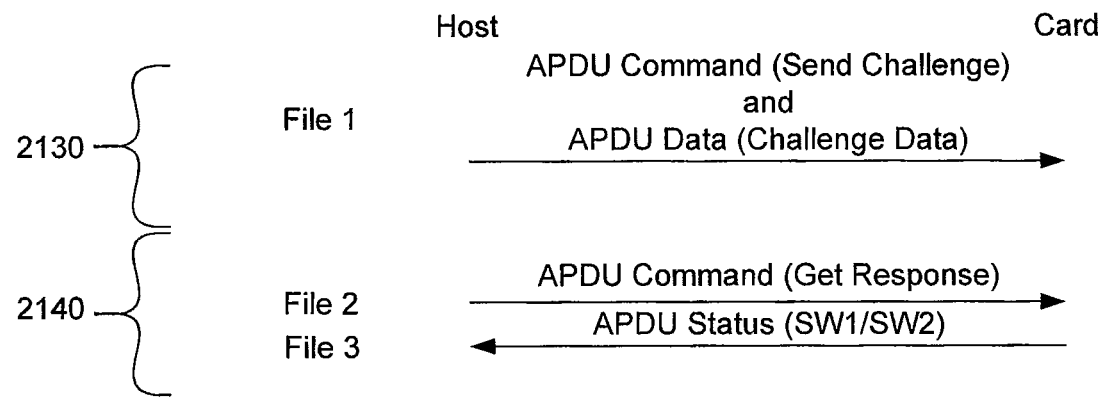
FIG. 21B shows the transmission of exemplary APDU commands and APDU data, and reception of APDU status, using sequences of file data exchanges.

FIG. 21B shows the transmission of exemplary APDU commands and APDU data, and reception of APDU status, using sequences of file data exchanges. In this example, a sequence consists of three file exchanges 2130, 2140. In the first file exchange 2130, an APDU Send Challenge command, with accompanying data, is placed into a file, and transmitted from the host 1910 to the non-volatile storage device 1920. The APDU Send Challenge command and accompanying data are extracted from the file data by the non-volatile storage device 1920. In the second and third file exchanges 2140, the host 1910 places an APDU Get Response command in a file and transmits the file to the non-volatile storage device 1920. The host 1910 then reads a file from the non-volatile storage device 1920. The host 1910 extracts the APDU SW1/SW2 status from the file data received from the non-volatile storage device 1920. In combination, the two file exchanges 2130, 2140 may be utilized to send challenge and accompanying data, and receive a response. Such a sequence may be all or a portion of a host authentication algorithm.

Figure 21C:
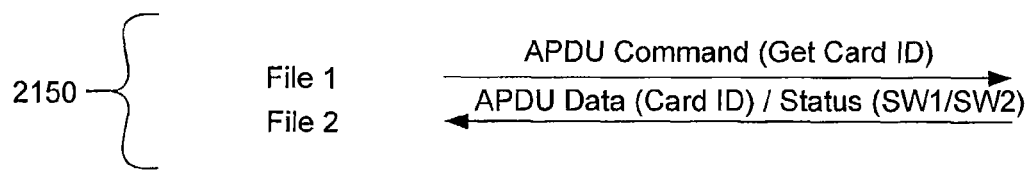
FIG. 21C shows the transmission of an exemplary APDU command, and reception of APDU data and APDU status, using a sequence of file data exchanges.

FIG. 21C shows the transmission of an exemplary APDU command, and reception of APDU data and APDU status, using a sequence of file data exchanges. In this example, two file exchanges 2150 may be utilized to retrieve data from the non-volatile memory card, such as the card identification value. In the first file exchange, the host 1910 transmits a file containing the APDU Get Card ID command to the non-volatile storage device 1920. In the second file exchange, the host 1910 receives the Card ID and APDU SW1/SW2 status result data from the non-volatile memory device 1920 in file data received from the non-volatile storage device 1920.

Figure 21D:
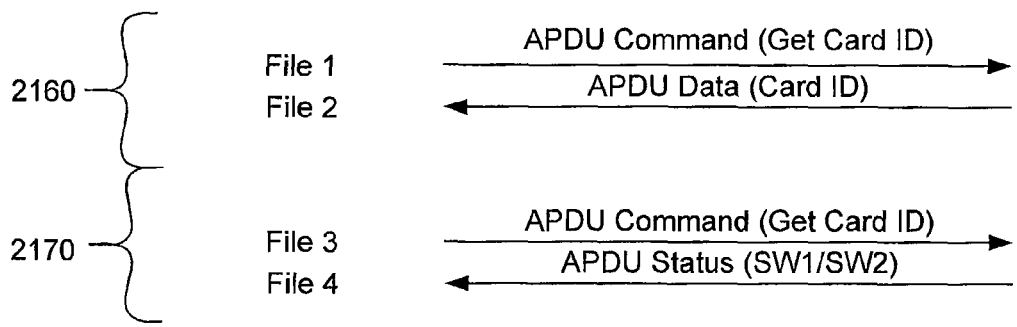
FIG. 21D shows the transmission of exemplary APDU commands, and reception of APDU data and APDU status, using sequences of file data exchanges.

In another embodiment, APDU SW1/SW2 status result data may only be returned in response to an APDU Get Response command, and is not returned with other APDU result data transmitted from the non-volatile memory device 1920 to the host 1910. FIG. 21D shows the transmission of exemplary APDU commands, and reception of APDU data and APDU status, using sequences of file data exchanges. In an example using this embodiment, during two file exchanges 2160, the Card ID is returned in response to the APDU Get Card ID command, but the APDU SW1/SW2 status is not returned. In order to retrieve APDU SW1/SW2 status from the non-volatile memory device 1920, an additional two file exchanges 2170 are required, where the host 1910 transmits the APDU Get Response command in a first file exchange, and receives APDU SW1/SW2 status from the non-volatile memory device 1920 in a second file exchange.

The sequences shown in FIGS. 21A-21D are examples of command sequences that can be formed by file data exchanges, where the file data can transport commands, transmit commands and data, or transmit commands and receive data. Other useful sequences of any number or configuration of file exchanges are also possible.

Fifth Exemplary Embodiment

Returning briefly to FIG. 5, it was stated above that the embedded command 513a and the command signature may be placed within the command portion 511 of the instruction 510 instead of the data portion 513 of the instruction 510. The fifth exemplary embodiment is one example of how an embedded command may be placed within the command portion 511 of the instruction 510.

In the fifth exemplary embodiment, the high-speed interface 1914 is a Universal Serial Bus Interface 1914. A host 1910 may communicate with devices using one or more of several transfer protocols supported by the Universal Serial Bus specification, such as the control transfer protocol, the interrupt transfer protocol, the isochronous transfer protocol, and the bulk transfer protocol.

A variety of devices may communicate with a host utilizing the bulk transfer protocol, or transfer protocol. One device class is the mass storage class, which may consist of storage devices such as a removable non-volatile media cards. The mass storage class (MSC) utilizes an additional communication protocol, referred to herein as the storage protocol or mass storage class protocol, contained within the data transferred between host and device according to the USB bulk transfer protocol.

The high-speed channel handler 1932 may receive a mass storage class protocol command over USB interface 1914 to store data in the non-volatile flash storage 1936. The high-speed channel handler 1932 may process the request and forward the command and data to the flash controller 1934 for execution. Similarly, the high-speed channel handler 1932 may receive a mass storage class protocol command from the USB interface 1914 to read data from the non-volatile flash storage 1936. The high-speed channel handler 1932 may process the request and forward the command to the flash controller 1934 for execution, and may return the data read from the non-volatile flash storage 1936 to the USB interface 1914.

The high-speed channel handler 1932 may also analyze the data and commands transmitted over the high-speed interface 1914, and may intercept ISO 7816 APDU commands and data transported over the high-speed interface 1914. These APDU commands and data may be passed to the SIM controller 1924 for processing. Similarly, APDU data to be returned from the SIM controller 1924 to the host 1910 may be received by the high-speed channel handler 1932 and transported to the host 1910 over the high-speed interface. In one embodiment, the high-speed channel handler 1932 may receive and interpret mass storage class device protocol commands though the USB bulk transfer protocol. In addition to the functionality required to implement a USB endpoint compliant with the USB Specification and Mass Storage Class Specification, the hardware and software of the high-speed channel handler 1932 may examine the command block of a mass storage class protocol command received from the high-speed interface 1914.

If the high-speed channel handler 1932 detects an APDU command signature, the high-speed channel handler 1932 may extract the APDU command, and the subsequent data received in the data transport phase of the mass storage protocol exchange, and transmit the command and data to the SIM controller 1924 using an additional communications interface between the high-speed channel handler 1932 and the SIM controller 1924. If an APDU command is not detected, the high-speed channel handler 1932 may extract the mass storage command and subsequent data and send a command and data to the flash controller 1934 for further processing. The high-speed channel handler 1934 may also receive data from the SIM controller 1924 or the flash controller 1934, and return the data to the USB interface within a mass storage class protocol data transport payload. The high-speed channel handler 1934 may also receive data from the SIM controller 1924 using the additional communications interface within the high-speed channel handler 1932, and return the data to the USB interface 1914 within the data payload of the data transport phase of a mass storage class protocol exchange.

Thus, in the fifth exemplary embodiment, the need for the ISO 7816 communications interface 1912, and the corresponding ISO 7816 interface 1922 in the non-volatile storage card 1920, may be reduced or eliminated, because some or all of the ISO 7816 Application Protocol Data Unit (APDU) commands and data are transported over the high-speed interface 1914. In one embodiment, the high-speed interface is a USB interface 1914. In order to further describe the transport of APDU commands and data in this embodiment, the USB mass storage class protocol and the USB bulk transfer protocol must be reviewed in further detail.

Figure 22:
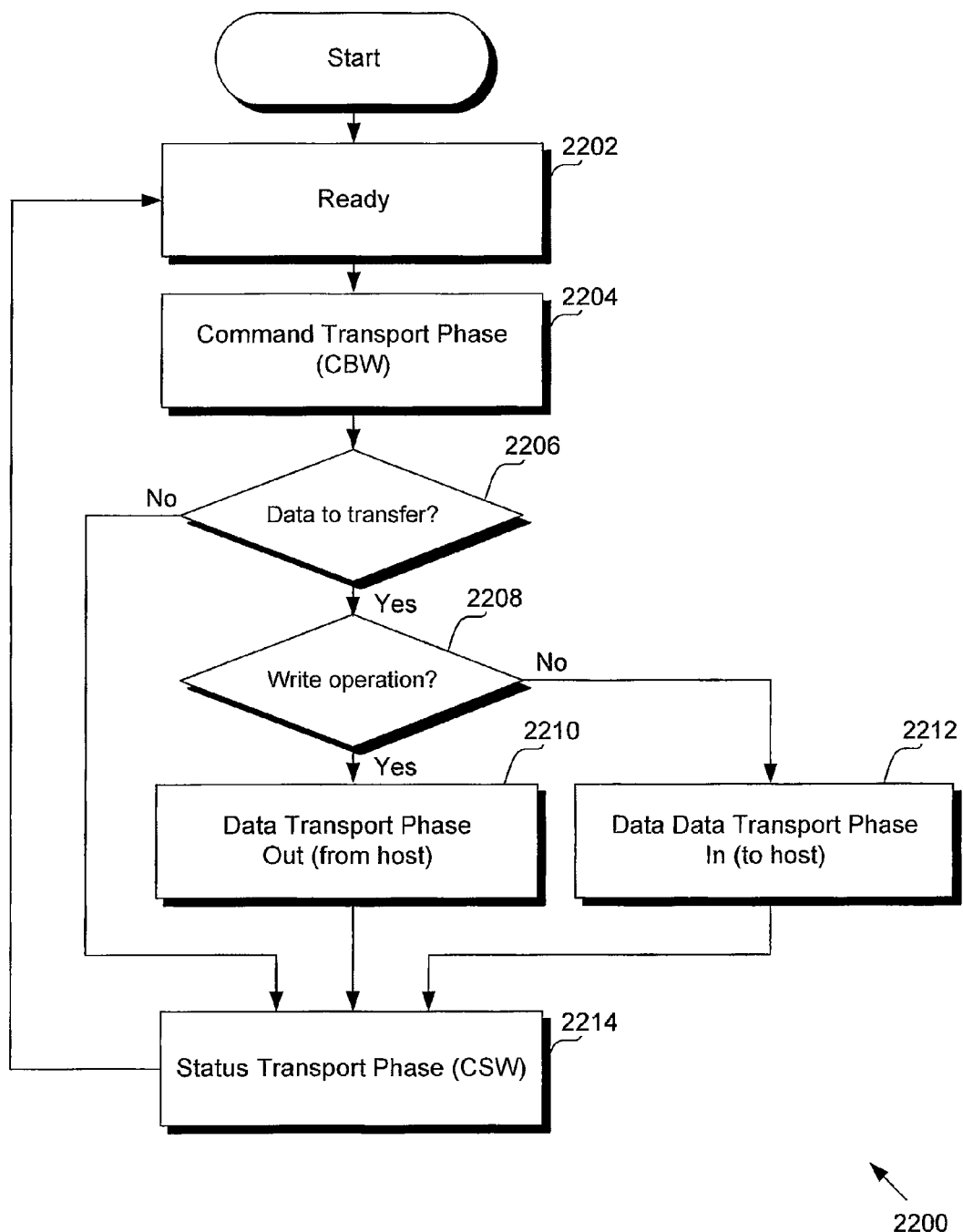
FIG. 22 shows exemplary steps for transferring mass storage class protocol commands and data utilizing the USB bulk transfer protocol.

FIG. 22 shows exemplary steps 2200 for transferring mass storage class protocol commands and data utilizing the USB bulk transfer protocol. A mass storage class protocol exchange between a host and a device may be broadly described as occurring in three phases: 1) a command transport phase, where the host transmits a command to the device 2) an optional data transport phase, where the data associated with the command is transmitted to or from the device and 3) a status transport phase, where the device returns status information to the host. Each phase includes a separate exchange of commands, data, or status transported between the host and device within the data field of a USB bulk transfer protocol transmission.

Control begins at step 2202, where a host, such as host 1910 in FIG. 19, accepts requests for a command (and optionally data) exchange with a USB mass storage class device, such as a non-volatile storage card 1920 of FIG. 19. A request is received and control passes to step 2204, the command transport phase. In step 2204, the host forms a USB mass storage class protocol command block wrapper. This command packet contains a command to be executed by the mass storage class device, and is organized according to the USB mass storage class specification, as detailed below. The command packet is transported to the mass storage class device within the data field of a USB bulk transfer protocol transmission to the mass storage class device.

Control passes to step 2206, where the host determines if the transferred command is also associated with a data transfer. There may be three types of commands transmitted to a mass storage class device 1) a command to write data to the device, 2) a command to read data from the device, and 3) a command that has no associated data to read or write. If the command within the command packet transferred in step 2204 is not associated with data, control passes from step 2206 to step 2214, thereby skipping the data transport phase. If the command within the command packet transferred in step 2204 is associated with data to read or write, control passes from step 2206 to step 2208.

If the operation is to transfer data from the host to the device, then control passes from step 2208 to step 2210. The host forms a data packet, where the data packet contains data associated with the command transmitted to the mass storage class device in step 2204. In one example, the command is a write command, and the data is the data to write to the storage device. The data packet is transported to the mass storage class device within the data field of a USB bulk transfer protocol transmission to the mass storage class device. Control then passes to step 2214.

If the operation is to transfer data from the device to the host, then control passes from step 2208 to step 2212. The device forms a data packet, where the data packet contains data associated with the command transmitted to the mass storage class device in step 2204. In one example, the command is a read command, and the data is the read data returned from the device to the host. The data packet is transported from the mass storage class device to the host within the data field of a USB bulk transfer protocol transmission with the mass storage class device. Control then passes to step 2214.

At step 2214, the device forms a status packet, where the status packet contains information on the success of the transfer that occurred in step 2204 (and optionally, steps 2210 or 2212). The format of the status packet is defined by the USB mass storage class protocol. The status packet is transported from the mass storage class device to the host within the data field of a USB bulk transfer protocol transmission with the mass storage class device. Control then passes to step 2202 where the host waits to begin another transfer.

Figure 23:
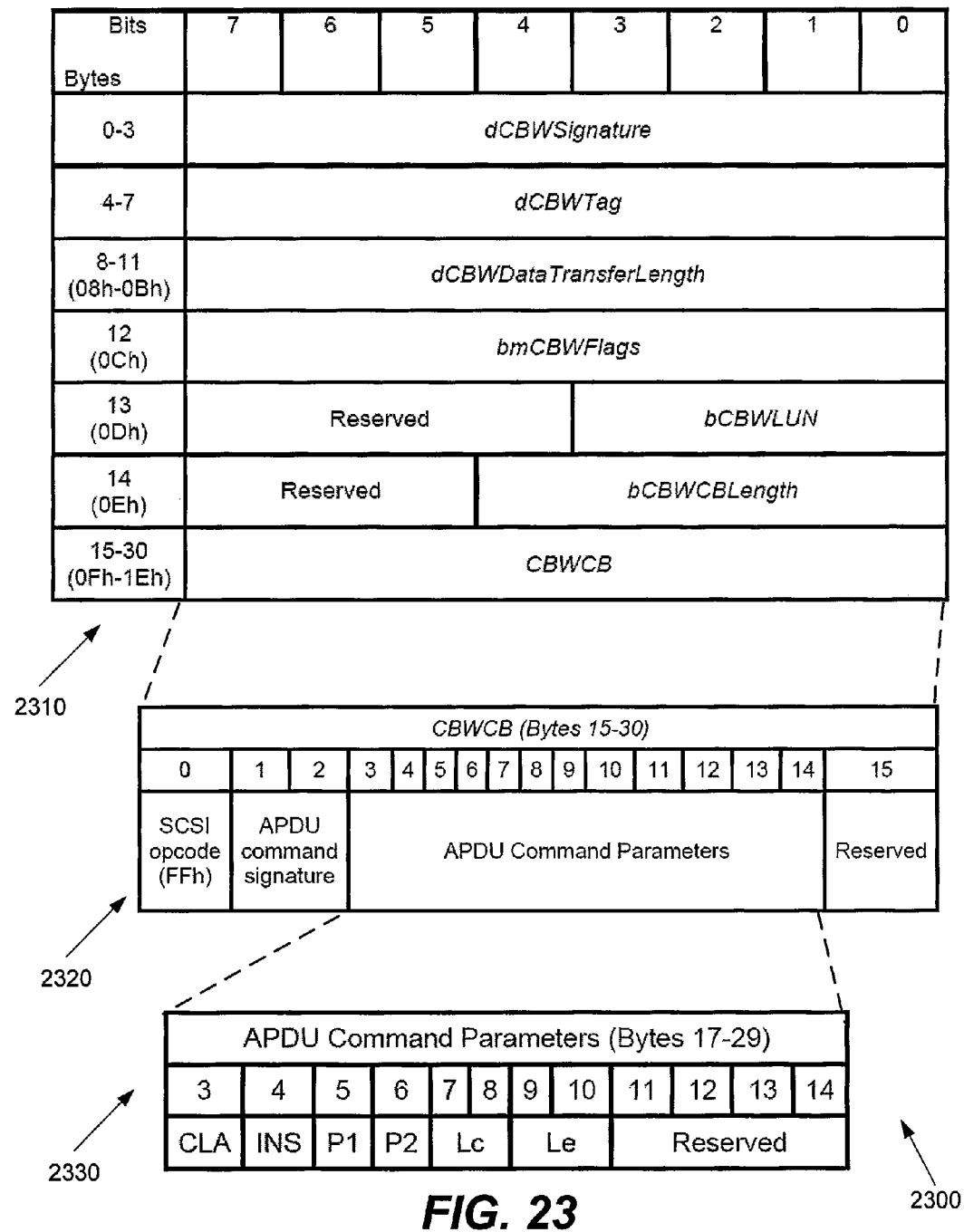
FIG. 23 shows a placement of an APDU command within the command packet transmitted in the mass storage class protocol command transport phase.

FIG. 23 shows a placement of an APDU command within the command packet transmitted in the mass storage class protocol command transport phase, step 2204 of FIG. 22. The tables 2300 in FIG. 23 show different views of the command block wrapper of the USB mass storage class protocol specification. The command block wrapper is transported within the data field of a USB bulk transfer protocol exchange between the host and device.

The table 2310 shows the format of the mass storage class command block wrapper. The format follows the standard mass storage class protocol specification.

The dCBWSignature field is a signature that identifies the packet as a command block wrapper, and shall contain the value 0x43425355 (little endian). This signature or marker is checked by a mass storage class device to determine if a mass storage class command block wrapper in accordance with the storage protocol has been received.

The dCBWTag field is a Command Block Tag sent by the host. The device shall echo the contents of this field back to the host in the dCSWTag field of the associated status packet transmitted during the status transport phase. The dCSWTag positively associates a command block with a corresponding status block.

The dCBWDataTransferLength field indicates the number of bytes of data that the host expects to transfer or receive during the data transport phase. If this field is zero, the device and the host shall transfer no data between the command transport phase and the status transport phase (thereby skipping the data transport phase) and the device shall ignore the value of the Direction bit in the bmCBWFlags field.

Bit 7 of the bmCBWFlags field is the Direction bit, and indicates the direction of data transfer between the host and device during the data transport phase. If set to zero, data is transported from the host to the device during the data transport phase. If set to one, data is transported from the device to the host during the data transport phase. The device shall ignore this bit if the dCBWDataTransferLength field is zero. Bits 6 to 0 of the bmCBWFlags field are unused and shall be set to zero.

The bCBWLUN field indicates the device Logical Unit Number (LUN) to which the command block is being sent. For devices that support multiple LUNs, the host shall place into this field the LUN to which this command block is addressed. Otherwise, the host shall set this field to zero.

The bCBWCBLength field indicates the valid length of the CBWCB field in bytes, from 1 through 16 (0x01 through 0x10). All other values are reserved.

The CBWCB field contains the command block to be executed by the mass storage device. The device shall interpret the first bCBWCBLength bytes in this field as a command block. If the command set supported by the device uses command blocks of fewer than 16 (10*h*) bytes in length, the significant bytes shall be transferred first, beginning with the byte at offset 15 (Fh). The device shall ignore the content of the CBWCB field past the byte at offset (15+bCB-WCBLength−1).

The table 2320 shows how an APDU command is identified within the CBWCB field. The table 2320 contains the CBWCB field, also referred to as the command block, which consists of bytes 15-30 of the command block wrapper shown in the table 2310. When an APDU command is transmitted within the command block wrapper 2310, bytes 0-2 of the CBWCB field contain a SCSI opcode and APDU signature. The value of the SCSI opcode and APDU signature may be one or more predetermined values. In combination, a high-speed channel handler 132 of FIG. 1 may utilize the SCSI opcode and APDU signature to determine that the command block wrapper 2310 contains an APDU command, and not a mass storage class device command. In this regard, the SCSI opcode of 0xFF may be thought of as a signature or marker as well.

The USB bulk transfer protocol interface descriptor of a USB mass storage class device includes a bInterfaceSubClass field, which indicates the industry-standard command block protocol transported by a mass storage class device. In one embodiment, a non-volatile storage device supports the SCSI protocol, and hence, the SCSI opcode may be utilized in the CBWCB field of the command block. Other embodiments may utilize alternative industry-standard protocols, and hence, different formats of the CBWCB field within the command block.

If an APDU command is detected, the high-speed channel handler 1932 of FIG. 19 may extract the APDU command parameters from the CBWCB field. The table 2330 shows one arrangement of APDU command parameters contained within the CBWCB field. In one arrangement, bytes 3-10 of the CBWCB field contain the APDU command class of instruction (CLA) field, instruction (INS) field, parameter (P1 and P2) fields, length of command data (Lc) field, and length of expected response field (Le). The parameters generally follow the APDU command format specified in Part 24 of the ISO 7816 specification. The high-speed channel handler 1932 of FIG. 19 may also extract the dCBWDataTransferLength field to determine the amount of data (if any) that will be transferred to or from the host during the data transport phase (if necessary), and the Direction bit from the bmCBWFlags field to determine the direction of data transfer. The extracted parameters may be passed from the high-speed channel handler 1932 of FIG. 19, to the SIM controller 1924 of FIG. 19, for further processing.

If an APDU command is not detected, the mass storage command and associated parameters in the command block wrapper of table 2310 may be transmitted from the high-speed channel handler 1932 of FIG. 19 to the flash controller 1934 of FIG. 19, for further processing as a typical mass storage device command.

Referring briefly back to FIG. 22, once the command transport phase is completed in step 2204, the mass storage device may receive or transmit data during the data transport phase, if the dCBWDataTransferLength field of the command block wrapper shown in the table 2310 of FIG. 23 contains a non-zero value. The direction of data transfer is determined by the Direction bit from the bmCBWFlags field of the command block wrapper. If an APDU command was detected during the command transport phase in step 2204 of FIG. 22, the mass storage device may send or receive a data packet containing data, transported in a USB bulk transfer protocol exchange. If a data packet is received, a number of bytes of data specified by dCBWDataTransferLength may be extracted from the data packet by the high-speed channel handler 1932 of FIG. 19, and forwarded to the SIM controller 1924 of FIG. 19 for further processing. Similarly, if a data packet is to be transmitted to the host, a number of bytes of data specified by dCBWDataTransferLength may be received by the high-speed channel handler 1932 from the SIM controller 1924 of FIG. 19, packetized, and then transported to the host in a USB bulk transfer protocol exchange.

Figure 24A:
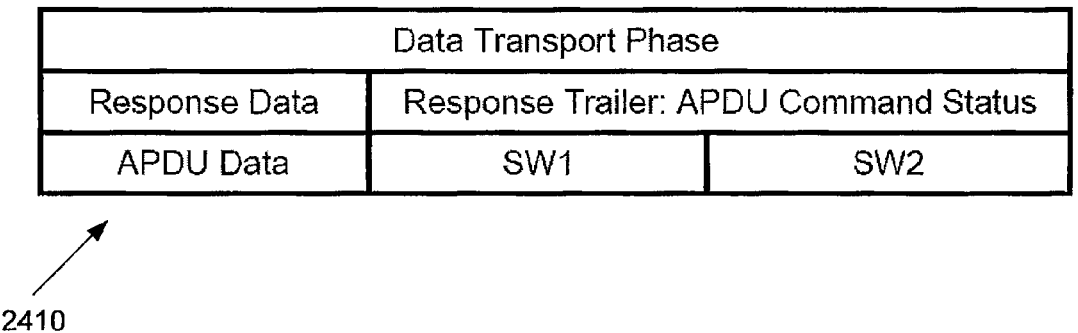
FIG. 24A shows the placement of an APDU command status word and response data within a data packet transmitted in the mass storage class protocol data transport phase.

A specialized APDU command (defined by a reserved combination of the CLA and INS fields of the APDU command parameters shown in the table 2330 of FIG. 3) may also be utilized to return APDU command status, as specified in Part 24 of the ISO 7816 specification, during the data transport phase. FIG. 24A shows the placement of an APDU command status word and response data within a data packet transmitted in the mass storage class protocol data transport phase, steps 2210 and 2212 of FIG. 22. The table 2410 in FIG. 24A shows a possible arrangement of the APDU command status data returned within a data packet transported to the host during a USB bulk transfer protocol exchange.

The table 2410 shows one embodiment, where the data packet contains APDU response data and APDU command status words (SW1, SW2). In this embodiment, the value of the expected response field (Le) within the CBWCB field of the corresponding command is equal to the number of bytes of the APDU response data, and the number of bytes of data specified by the dCBWDataTransferLength value of the corresponding command block wrapper is equal to the total number of bytes of the APDU response data and APDU command status words.

Figure 24B:
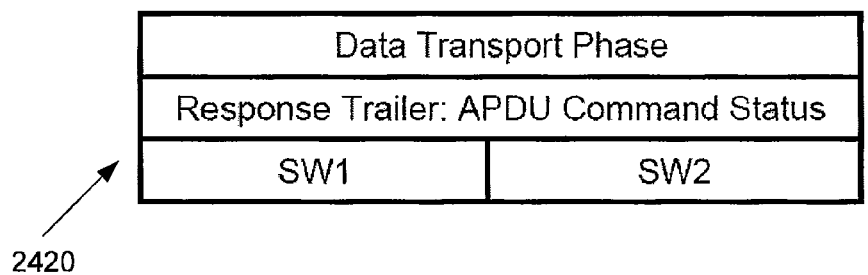
FIG. 24B shows the placement of an APDU command status word within a data packet transmitted in the mass storage class protocol data transport phase.

FIG. 24B shows the placement of an APDU command status word within a data packet transmitted in the mass storage class protocol data transport phase, steps 2210 and 2212 of FIG. 22. A specialized APDU command (defined by a reserved combination of the CLA and INS fields of the APDU command parameters shown in the table 2330 of FIG. 3) may be utilized to indicate to the non-volatile storage device 1920 that APDU command status should be returned from the non-volatile storage device 1920 to the host during the data transport phase 2212 of a USB mass storage class exchange. The table 2420 in FIG. 24B shows a possible arrangement of the APDU command status data returned within a data packet transported to the host during a data transport USB bulk transfer protocol exchange. In a second embodiment, shown in the table 2420, the data packet contains APDU command status words (SW1, SW2). The command status word parameters generally follow the APDU command format specified in Part 24 of the ISO 7816 specification. In this embodiment, the value of the expected response field (Le) within the CBWCB field of the corresponding command is zero, and the number of bytes of data specified by dCBWDataTransferLength value of the corresponding command block wrapper is equal to the total number of bytes of the APDU command status words.

Returning briefly to FIG. 22, the status transport phase in step 2214 follows the command transport phase in step 2204, or the data transport phase in steps 2210 or 2212. The format of the status packet transported from the device to the host in the status transport phase in step 2214 is described in the mass storage class specification.

Thus, a host 1910 may utilize the mass storage class protocol to transport APDU commands and data between the host 1910 and the non-volatile storage device 1920. The host may also utilize the mass storage class protocol to transport non-APDU commands to be processed by the flash controller 1934, and non-APDU data to be stored to and retrieved from the flash storage 1936. Stated another way, the steps 2200 for transferring mass storage class protocol commands and data utilizing the USB bulk transfer protocol may be utilized by the host 1910 and the non-volatile storage device 1920 in two ways. The host 1910 may exchange APDU commands and data using mass storage class protocol transmissions. By including the APDU signature within the CBWCB field of the command block wrapper 2310, the host 1910 flags APDU commands and data that may be detected and extracted by the high-speed channel handler 1932 in the non-volatile storage device 1920, and sent to the SIM controller for processing. Alternatively, when the APDU signature is not inserted within the CBWCB field of the command block wrapper 2310, the host may utilize the mass storage protocol steps to transport SCSI or other non-APDU commands and data between the host 1910 and the non-volatile storage device 1920, such as commands to be executed by the flash controller 1934 or CPU 1938.

Figure 25A:
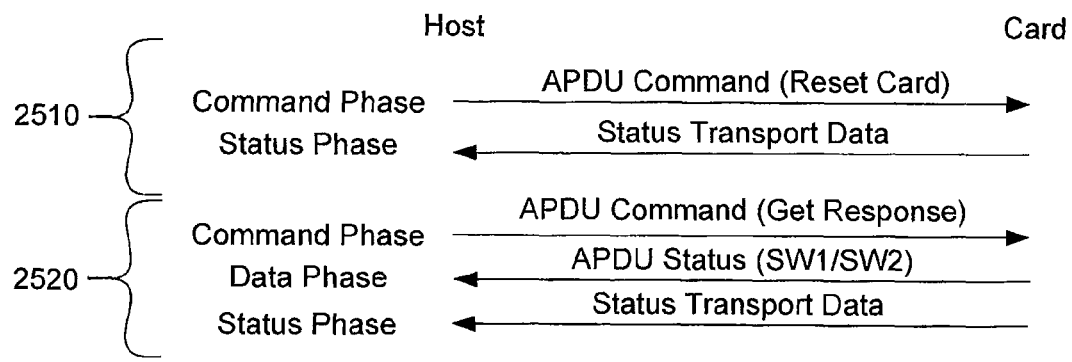
FIG. 25A shows the transmission of exemplary APDU commands, and reception of APDU status, using sequences of mass storage class protocol exchanges.

The exemplary mass storage class protocol steps 2200 can be repeated to create sequences useful for exchanging APDU commands and data between a host 1910 and a non-volatile storage device 1920. FIG. 25A shows the transmission of exemplary APDU commands and the reception of APDU status, using sequences of mass storage class protocol exchanges. Each mass storage class exchange 2510-2570 represents one cycle through the sequence of steps beginning and ending at step 2202 in FIG. 22. The direction of the arrows in FIG. 25A indicates the direction of file data transferred.

For example, one sequence consists of two mass storage class exchanges 2510, 2520. In the first mass storage class exchange 2510, an APDU Reset command, without accompanying data, is transmitted from the host 1910 to the non-volatile storage device 1920. In the command transport phase 2204, the host 1910 transmits the APDU Reset command to the non-volatile storage device 1920. Because there is no data to transmit or receive, the data transport phase is skipped, and the mass storage class status is returned during the status transport phase 2214. In a second mass storage class exchange 2520, the host 1910 transmits the APDU Get Response command in the command transport phase 2204. The host 1910 receives APDU SW1/SW2 status from the non-volatile storage device 1920 in the data transport phase 2212, and the mass storage class status is returned during the status transport phase 2214. In combination, the two mass storage class exchanges 2510, 2520 may be utilized to reset the non-volatile storage device 1920, and then read the APDU status after the reset has been completed.

Figure 25B:
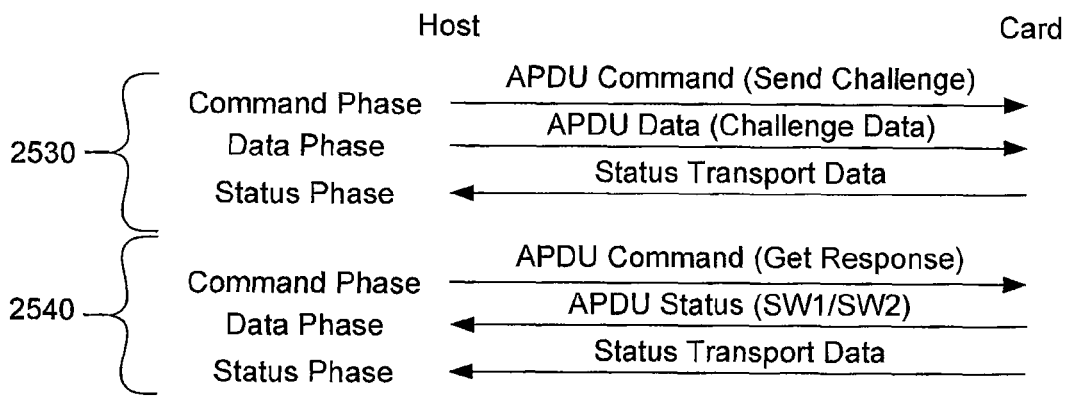
FIG. 25B shows the transmission of exemplary APDU commands and APDU data, and reception of APDU status, using sequences of mass storage class protocol exchanges.

FIG. 25B shows the transmission of exemplary APDU commands and APDU data, and reception of APDU status, using sequences of mass storage class protocol exchanges. In this example, a sequence consists of two mass storage class exchanges 2530, 2540. In the first mass storage class exchange 2530, an APDU Send Challenge command, with accompanying data, is transmitted from the host 1910 to the non-volatile storage device 1920. In the command transport phase 2204, the host 1910 transmits the APDU Send Challenge command to the non-volatile storage device 1920. The data accompanying the APDU Send Challenge command is transmitted from the host 1910 to the non-volatile storage device 1920 during the data transport phase 2210. The mass storage class status is returned to the host during the status transport phase 2214. In a second mass storage class exchange 2540, the host 1910 transmits the APDU Get Response command in the command transport phase 2204. The host 1910 receives APDU SW1/SW2 status from the non-volatile storage device 1920 in the data transport phase 2212, and the mass storage class status is returned during the status transport phase 2214. In combination, the two mass storage class exchanges 2530, 2540 may be utilized to send challenge and accompanying data, and receive a response. Such a sequence may be all or a portion of a host authentication algorithm.

Figure 25C:
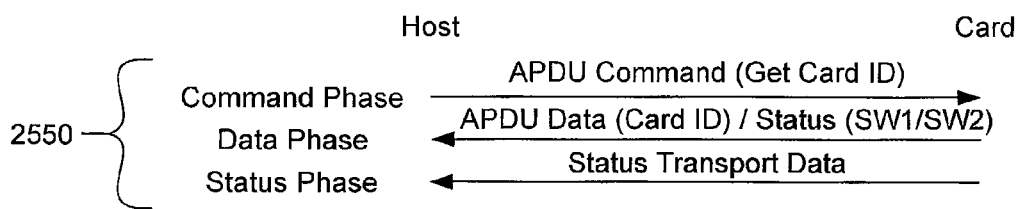
FIG. 25C shows the transmission of an exemplary APDU command, and reception of APDU data and APDU status, using a sequence of mass storage class protocol exchanges.

FIG. 25C shows the transmission of an exemplary APDU command, and reception of APDU data and APDU status, using a sequence of mass storage class protocol exchanges. In this example, a mass storage class exchange 2550 may be utilized to retrieve data from the non-volatile storage device 1920, such as the card identification value. In a mass storage class exchange 2550, the host 1910 transmits the APDU Get Card ID command in the command transport phase 2204. The host 1910 receives the Card ID and APDU SW1/SW2 status result data from the non-volatile storage device 1920 in the data transport phase 2212, and the mass storage class status is returned during the status transport phase 2214.

Figure 25D:
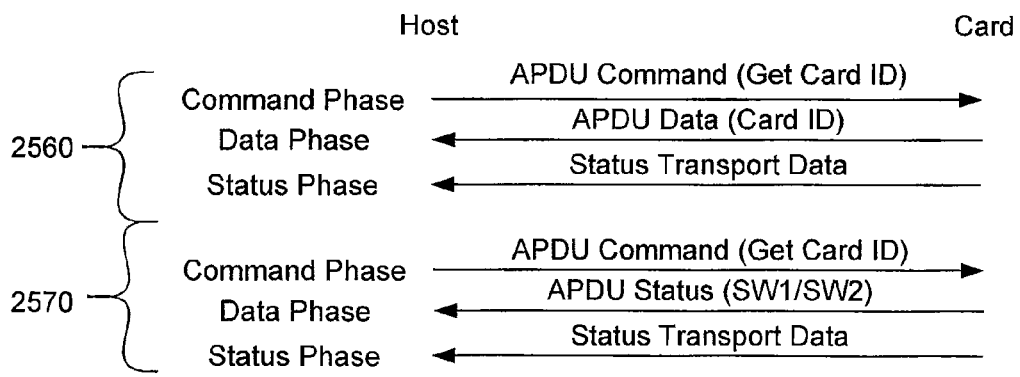
FIG. 25D shows the transmission of exemplary APDU commands, and reception of APDU data and APDU status, using sequences of mass storage class protocol exchanges.

Alternatively, APDU SW1/SW2 status result data may only be returned in response to an APDU Get Response command, and is not returned with other APDU result data transmitted from the non-volatile storage device 1920 to the host 1910. FIG. 25D shows the transmission of exemplary APDU commands, and reception of APDU data and APDU status, using sequences of mass storage class protocol exchanges. In an example using this embodiment, during a mass storage class exchange 2560, the Card ID is returned in response to the APDU Get Card ID command, but the APDU SW1/SW2 status is not returned. In order to retrieve APDU SW1/SW2 status from the non-volatile storage device 1920, a separate mass storage class exchange 2570 is required, where the host 1910 transmits the APDU Get Response command in the command transport phase 2204, and receives APDU SW1/SW2 status from the non-volatile storage device 1920 in the data transport phase 2212.

The sequences shown in FIGS. 25A-25D are examples of command sequences that can be formed by mass storage class protocol exchanges that can transmit commands, transmit commands and data, or transmit commands and receive data. Other useful sequences of any number or configuration of mass storage class protocol exchanges are also possible.

Thus, in one implementation, commands and data in one protocol, such as the APDU protocol, may be inserted into the command and data fields of another protocol, such as the mass storage class protocol, where a signature allows a high-speed channel handler 1932 to identify and extract APDU commands (and optionally data) from mass storage class protocol command wrappers. The extracted APDU commands and data are redirected to an APDU processing unit, such as SIM controller 1924, for execution, while mass storage class protocol commands and data that are not APDU commands and data are directed to a mass storage class processing unit, such as the flash controller 1934, for execution. Further, the high-speed channel handler 1932 may receive APDU response and status data from an APDU processing unit 1924, and may insert the data into a data packet transported from the card 1920 to the host 1910 in a USB bulk transfer protocol exchange. With this embodiment, the need for additional hardware and/or software, such as the ISO 7816 interface 1922, and the ISO 7816 communication interface 1924, may be eliminated, as all APDU commands and data may be transported by the USB communications interface 1914 and corresponding hardware and/or software.

As shown in the fourth and fifth exemplary embodiments disclosed herein, the need to exchange application protocol data units (APDU) format commands, data, and results between a host and a non-volatile memory card may be addressed by sending and receiving these APDU format commands, data, and results over a high-speed communication interface between the host and the non-volatile storage card. Specifically, APDU format commands, data, and results may be transported between a host and a non-volatile storage device within transmissions of another protocol over a high-speed communication interface. The APDU commands and data may be identified by detecting a signature of the received transmission. Various other embodiments and combinations of signature detection and transmission protocol are contemplated. In one implementation, a signature is detected by detecting a first and second signature in a transmission. In another implementation, a signature may be detected by detecting a signature within at least a portion of a received file. In yet another implementation, a signature may be detected by detecting that a file is directed or written to a predetermined address in a non-volatile storage device. In combination with a signature, a direction of data transfer, size of a data transfer, or a command set identifier may also be detected and extracted from the transmission.

In one implementation, the transmission contains a first command, and receiving the transmission includes receiving a command packet in a data field of a first command, where the command packet is configured in accordance with a first protocol, and the first command is configured in accordance with a second protocol. Depending on the direction of data transfer, a data result may be received from the first processing unit, packetized according to a first protocol, and transmitted, or data may be extracted from a received data packet in a first protocol and transmitted to the first processing unit.

In yet another implementation, a transmission may include the reception of at least a portion of a file written to the non-volatile storage device. A command set identifier associated with the command is extracted from the transmission, and the command is associated with a prior received command if the command set identifier is associated with the prior received command. The command set identifier may include an application identifier, and a tag number, to identity the host application and user associated with the commands in the command set. In this embodiment, the command includes a command in a first protocol. Data corresponding to the command may also be included in the file data received. The size of the file or data contained in the file may also be indicated within the received file data. The command, the corresponding data, the size parameter, or the command set identifier may be extracted from the file and transmitted to a first processing unit. In response to a received command, a data result may be obtained from the first processing unit, organized as read file data, and transmitted when a subsequent file data read request is received.

As has been described above, these methods may include the use and structure of removable electronic circuit cards to allow personal computers or other hosts to exchange media specific card commands with memory cards having a base card protocol that does not support the media specific command, thus extending the command set of the memory card. The methods may also allow the transmission of media specific commands to a memory card through a reader and/or host software that does not support these extended commands.

One embodiment may include a method of transmitting a message to a memory card. A system may include a memory card and a host, with the host exchanging commands and data with the memory card according to a base card protocol. The host may transmit a message formatted in an extended card protocol to the memory card by dividing the message into a number of message parts and transmitting the each of the message parts to the memory card. In order to transmit the message part, the memory card may encapsulate the message part in a data field of a command formatted in the base card protocol and transmit the command to a logical block address of the memory card, where the logical block address corresponds to a base address and an offset determined from a size of the message parts already transmitted.

In one variation of the embodiment, the message includes an encapsulated command in the extended card protocol. In this variation, the memory card may execute the encapsulated command upon receiving the message. In another variation of the embodiment, the encapsulated command is a data transfer command from the host to the memory card, and the message also contains encapsulated data associated with the encapsulated command. In another variation of the embodiment, the host may interleave transmissions of commands in the base card protocol containing one of the message parts with transmissions of commands in the base card protocol that do not contain message parts.

In one variation of the embodiment, the command further comprises a marker that may identify when a message part is encapsulated within the command. In another variation, the message further includes a file associated with the encapsulated command, and the host may determine that the file can be stored on the memory card without segmentation.

In another embodiment, there is a method of receiving a message at a memory card. In this method, there is a system containing a memory card and a host. The host may exchange commands and data with the memory card according to a base card protocol. A memory card may receive a message formatted in an extended card protocol, where the message can be carried within commands of the base card protocol that contain a number of message parts. To do so, the memory card may receive a command in the base card protocol, where the command contains a base card logical block address, a marker, and a first message part of the number of message parts. The memory card may detect the marker within the received command, and in response to detecting the marker, may extract the first message part from the command. The memory card may then calculate an expected logical block address based on the first logical block address and an offset corresponding to a size of the first message part. A subsequent command in the base card protocol may be received, where the subsequent command comprises a second logical block address and a subsequent message part of the number of message parts. If the second logical block address is equal to the expected logical block address, the memory card may extract the subsequent message part from the subsequent command, and calculate a second expected logical block address based on the second logical block address and a second offset corresponding to a size of the subsequent message part.

In one variation of the embodiment, the message contains an encapsulated command in the extended card protocol, and the memory card may execute the encapsulated command. In another variation, the encapsulated command is for a transfer of data from the host to the memory card, and the message also comprises encapsulated data associated with the encapsulated command. In yet another variation, the memory card may set a flag to indicate that the remainder of the plurality of message parts has not been received, in response to determining that the first message part does not comprise the entire message.

In one variation, the command is a write command. In another variation of the embodiment, the encapsulated command is a read command. In yet another variation, the message contains an encapsulated command and a file, where the encapsulated command is for a transfer of data from the host to the memory card, and the file contains data associated with the command. In this variation, the memory card may determine that data storage on the memory card associated with the first logical address is sufficient to hold the file without segmentation. In one variation, each message part may be extracted from the data field of a corresponding command.

Yet another embodiment discloses a method of reading data from a memory card. A system includes a memory card and a host, where the host can exchange commands and data with the memory card according to a base card protocol. In this system, a memory card can processes a read data message formatted in an extended card protocol by receiving a first command formatted in the base card protocol, where the first command is directed to a first logical block address and encapsulates the read data message in the extended card protocol. The read data message may be detected in the first command. In response to detecting the read data message, the read data message may be extracted from the first command. A second command may subsequently be received at the memory card. The memory card may determine that the second command is directed to the first logical block address. In response, the memory card may transfer data to the host according to the read data message. In one variation of the embodiment, the first command is a write command and the second command is a read command. In another variation of the embodiment, the detection of the read data message in the first command includes detecting a marker in the first command.

In one embodiment, there is a method of transmitting a command to a memory card. A system in this embodiment contains a memory card and a host, where the host may exchange commands and data with the memory card according to a transfer protocol. In this embodiment, a host may transmit to the memory card an embedded command in an embedded protocol within a message in a storage command protocol by embedding the embedded command and an embedded marker into a command block in accordance with the storage protocol, forming a message configured in accordance with the storage command protocol, where the message contains the command block and a storage marker, and transmitting the message in a data field of a transfer command. In this embodiment, the embedded marker and the storage marker identify the presence of the embedded command within the data field of the transfer command.

In one variation of the embodiment, the embedded command contains an Application Protocol Data Unit command in accordance with an ISO 7816-4 protocol, the storage command protocol may be a Universal Serial Bus Mass Storage Class protocol, the message contains a Command Block Wrapper of a Universal Serial Bus Mass Storage Class Command Transport, the storage marker includes a Command Block Wrapper Signature of the Universal Serial Bus Mass Storage Class Command Transport, and the transfer protocol may be a Universal Serial Bus Bulk Transfer protocol.

In another variation of the embodiment, a second message is formed in accordance with the storage command protocol subsequent to transmitting the message. In this variation, the second message includes embedded data in accordance with the embedded protocol, where the embedded data is associated with the embedded command. The second message may then be transmitted in a data field of a second transfer command.

In yet another variation of the embodiment, subsequent to transmitting the message, a result message may be received in accordance with the storage command protocol, the result message containing an embedded data result in accordance with the embedded protocol, where the embedded data result is associated with the embedded command. The embedded data result is then extracted from the result message.

One embodiment discloses a method of receiving a command in a memory card. A system includes a memory card and a host. The host in the system exchanges commands and data with the memory card according to a transfer protocol. In this system, an embedded command in an embedded protocol within a message in a storage command protocol is received at the memory card by receiving a transfer command from the host, where the transfer command contains a data field. The message may be detected in the data field of the transfer command, and extracted from the transfer command. If a storage marker and an embedded marker are detected in the message, the embedded command may be extracted from the message, and the embedded command may be transmitted to an embedded command processing unit in the memory card.

In one variation of this embodiment, the message is transmitted to a storage command processing unit in the memory card if a storage marker and an embedded marker are not detected in the message. In this variation, a storage command in the storage command protocol can be extracted from the message upon receipt at the storage command processing unit.

In another variation of this embodiment, the embedded command may include an Application Protocol Data Unit command in accordance with an ISO 7816-4 protocol, the storage command protocol may be Universal Serial Bus Mass Storage Class protocol, the message contains a Command Block Wrapper of a Universal Serial Bus Mass Storage Class Command Transport, the storage marker includes a Command Block Wrapper Signature of the Universal Serial Bus Mass Storage Class Command Transport, and the transfer protocol may be a Universal Serial Bus Bulk Transfer protocol.

In yet another variation of the embodiment, a second message may be received in accordance with the storage command protocol in a data field of a second transfer command in accordance with the transfer protocol. In this variation, the second message comprises embedded data in the embedded protocol, and the embedded data is associated with the embedded command. The embedded data may be extracted from the second message, and the embedded data may then be transmitted to the embedded command processing unit.

In another variation, an embedded data result in accordance with the embedded protocol may be received from the embedded command processing unit. A result message in the storage command protocol may be formed, wherein the result message comprises the embedded data result, and the result message may be transmitted to the host in a data field of a response to a second transfer command.

In another embodiment, there is a method of transmitting a message to a memory card. A system comprises a memory card and a host, where the host can exchange data with the memory card according to a storage command protocol. In this system, a message in an embedded protocol may be transmitted to the memory card by the host selecting a unique message set identifier if the message is not associated with a previously transmitted message, and selecting an existing message set identifier associated with the previously transmitted message, if the message is associated with a previously transmitted message. The host may then creates a command file that contains the message and the message set identifier, and may write the command file to the memory card according to the storage command protocol. Upon receipt, the message and the message set identifier may be extracted from the file, where the message set identifier may identify the message as being associated with the previously transmitted message.

In one variation of the embodiment, the message contains an encapsulated command in the embedded protocol, and receiving the message permits the memory card to execute the encapsulated command.

In another variation, the encapsulated command may be for a transfer of data from the host to the memory card, and the message may contain encapsulated data associated with the encapsulated command. In yet another variation of the embodiment, a result file may be read from the storage device, where the result file contains result data in the embedded protocol. The data result may then be extracted from the result file.

One embodiment discloses a method of receiving a message at a memory card. In this method, a system contains a memory card and a host. The hose may exchange data with the memory card according to a storage command protocol. A message in an embedded protocol may be received at the memory card by receiving at the memory card a file to store in the memory card, detecting that the file contains a message, extracting the message and an associated message set identifier from the file, and associating the message with a previously received message if the message set identifier is also associated with the previously received message.

In one variation of this embodiment, the memory card may detect that the file contains the message by detecting that the file is directed to a predetermined address range within the memory card. In another variant, detecting that the file contains the message includes detecting a marker in the file. In yet another variation of this embodiment, the message includes an encapsulated command in the embedded protocol, and the encapsulated command may be executed by the memory card.

In another variation, the encapsulated command is for a transfer of data from the host to the memory card. In one variation, the message also includes encapsulated data associated with the encapsulated command. In yet another variation of this embodiment, result data may be received in the embedded protocol and the message set identifier. A result file may then be created, where the result file comprises the result data and the message set identifier. The result file may then be transmitted.

Although various aspects of the present invention have been described with respect to specific embodiments, it will be understood that the invention is protected within the full scope of the appended claims.

Hereby is claimed:

1. A method of processing a message received at a memory card, comprising:
   in a controller of a memory card operatively coupled to a host for exchanging commands and data with the host according to a base card protocol, the controller:
   receiving a first command conforming to a first card protocol and encapsulating a first message part of a plurality of message parts of a message formatted in a second card protocol, where the first command comprises a marker and the first message part;
   extracting the first message part from the first command in response to detecting the marker within the first command;
   receiving a subsequent command in the first card protocol, where the subsequent command comprises a subsequent parameter and encapsulates a subsequent message part of the plurality of message parts; and
   extracting the subsequent message part from the subsequent command upon determining that the subsequent parameter corresponds to message parts already received.

2. The method of claim 1, wherein the first command further comprises a first parameter, and wherein the first parameter and the subsequent parameter are logical block addresses, and wherein determining that the subsequent parameter corresponds to the message parts already received comprises determining if the subsequent parameter corresponds to a sum of the first parameter and a size of the message parts already received.

3. The method of claim 1, wherein the first command further comprises a first parameter, and wherein the first parameter and the subsequent parameter are message set identifiers, and wherein determining that the subsequent parameter corresponds to the message parts already received comprises determining that the subsequent parameter equals the first parameter.

4. The method of claim 1, wherein detecting the marker comprises detecting that the first command is directed to a predetermined address range within the memory card.

5. The method of claim 1, wherein the message comprises an encapsulated command in the second card protocol, further comprising executing the encapsulated command.

6. The method of claim 5, further comprising:
receiving an embedded data result in response to executing the encapsulated command;
forming a result message in the second card protocol, wherein the result message comprises the embedded data result; and
transmitting the result message to the host in a data field of a response to a second command received from the host.

7. The method of claim 6, wherein the first command further comprises a first parameter, and wherein the first parameter and the subsequent parameter are message set identifiers, and wherein determining that the subsequent parameter corresponds to the message parts already received comprises determining that the subsequent parameter equals the first parameter.

8. The method of claim 7, further comprising, in response to determining that the first message part does not comprise an entire message, setting a flag to indicate that a remainder of the plurality of message parts has not been received.

9. A memory card, comprising:
a memory; and
a controller in communication with the memory and operatively coupled to a host for exchanging commands and data with the host according to a base card protocol, the controller operative to:
receive a first command in the base card protocol, where the first command comprises a marker, and a first embedded message part of a plurality of embedded message parts of an embedded message formatted in an extended card protocol;
extract the first embedded message part from the first command in response to detecting the marker within the first command;
receive a subsequent command in the base card protocol, where the subsequent command comprises a subsequent parameter and a subsequent embedded message part of the plurality of embedded message parts; and
extract the subsequent embedded message part from the subsequent command upon determining that the subsequent parameter corresponds to embedded message parts already received.

10. The memory card of claim 9, wherein the first command further comprises a first parameter, and wherein the first parameter and the subsequent parameter are logical block addresses, and wherein determining that the subsequent parameter corresponds to the embedded message parts already received comprises determining that the subsequent parameter corresponds to a sum of the first parameter and a size of the embedded message parts already received.

11. The memory card of claim 9, wherein the first command further comprises a first parameter, and wherein the first parameter and the subsequent parameter are message set identifiers, and wherein determining that the subsequent parameter corresponds to the embedded message parts already received comprises determining that the subsequent parameter equals the first parameter.

12. The memory card of claim 9, wherein detecting the marker comprises detecting that the first command is directed to a predetermined address range within the memory card.

13. The memory card of claim 9, wherein the embedded message comprises an embedded command in the extended card protocol, further comprising executing the embedded command.

14. The memory card of claim 13, wherein the controller is further operative to:
receive an embedded data result in response to executing the embedded command;
form a result message in the extended card protocol, wherein the result message comprises an embedded data result; and
transmit the result message to the host in a data field of a response to a second command received from the host.

15. The memory card of claim 13, wherein the controller is further operative to, in response to determining that the first embedded message part does not comprise an entire embedded message, set a flag to indicate that a remainder of the plurality of embedded message parts has not been received.

16. A method of reading data from a memory card, comprising:
in a controller of a memory card operatively coupled to a host for exchanging commands and data with the host according to a base card protocol, the controller:
receiving a first command formatted in the base card protocol, wherein the first command is directed to a first logical block address and carries an embedded read data message formatted in an extended card protocol;
extracting the embedded read data message from the first command in response to detecting the embedded read data message in the first command;
determining that a subsequently received second command formatted in the base card protocol is directed to the first logical block address; and
transferring data from the memory card to the host according to the embedded read data message.

17. The method of claim 16, further comprising:
subsequently receiving a third command formatted in the base card protocol at the memory card;
determining that the third command is directed to an address corresponding to the first logical block address and an amount of data transferred in response to the second command; and
transferring additional data from the memory card to the host according to the embedded read data message.

18. The method of claim 16, wherein the first command is a write and the second command is a read.

19. The method of claim 16, wherein detecting the embedded read data message in the first command comprises detecting a marker in the first command.

20. A memory card, comprising:
a memory; and
a controller in communication with the memory and operatively coupled to a host for exchanging commands and data with the host according to a base card protocol, the controller configured to:
receive a first command formatted in the base card protocol, wherein the first command is directed to a first logical block address and carries an embedded read message formatted in an extended card protocol;
in response to detecting the embedded read data message in the first command, extract the embedded read data message from the first command;

determine that a second command formatted in the base card protocol and subsequently received at the memory card is directed to the first logical block address; and transfer data from the memory card to the host according to the embedded read data message.

21. The memory card of claim 20, the controller further operative to:

subsequently receive a third command formatted in the base card protocol at the memory card;

determine that the third command is directed to an address corresponding to the first logical block address and an amount of data transferred in response to the second command; and transfer additional data from the memory card to the host according to the embedded read data message.

22. The memory card of claim 20, wherein detecting the embedded read data message in the first command comprises detecting a marker in the first command.

23. A method of receiving a command in a memory card, comprising:

in a memory card operatively coupled to a host for exchanging commands and data with the host according to a transfer protocol, receiving at the memory card an embedded command in an embedded protocol within a message in a storage command protocol, the receiving by the memory card including:

receiving a transfer command from the host, wherein the transfer command comprises a data field;

detecting the message in the data field of the transfer command;

extracting the message from the transfer command;

if a storage marker and an embedded marker are detected in the message:

extracting the embedded command from the message.

24. The method of claim 23, further comprising:

if a storage marker and an embedded marker are detected in the message, transmitting the embedded command to an embedded command processing unit in the memory card; and if a storage marker and an embedded marker are not detected in the message, transmitting the message to a storage command processing unit in the memory card, wherein upon receipt a storage command in the storage command protocol can be extracted from the message.

25. The method of claim 23, further comprising:

receiving a second message in accordance with the storage command protocol in a data field of a second transfer command in accordance with the transfer protocol, wherein the second message comprises embedded data in the embedded protocol, and the embedded data is associated with the embedded command;

extracting the embedded data from the second message; and transmitting the embedded data to the embedded command processing unit.

26. The method of claim 23, further comprising:

receiving an embedded data result in accordance with the embedded protocol from the embedded command processing unit;

forming a result message in the storage command protocol, wherein the result message comprises the embedded data result; and transmitting the result message to the host in a data field of a response to a second transfer command.

27. A memory card, comprising:

a memory; and a controller in communication with the memory and operatively coupled to a host for exchanging commands and data with the host according to a transfer protocol, the controller operative to:

receive at the memory card an embedded command in an embedded protocol within a message in a storage command protocol, the receiving by the memory card including:

receiving a transfer command from the host, wherein the transfer command comprises a data field;

detect the message in the data field of the transfer command;

extract the message from the transfer command; and if a storage marker and an embedded marker are detected in the message:

extract the embedded command from the message.

28. The memory card of claim 27, wherein the controller is further operative to:

if a storage marker and an embedded marker are detected in the message, transmit the embedded command to an embedded command processing unit in the memory card; and if a storage marker and an embedded marker are not detected in the message, transmit the message to a storage command processing unit in the memory card, wherein upon receipt a storage command in the storage command protocol can be extracted from the message.

29. The memory card of claim 27, wherein the controller is further operative to:

receive a second message in accordance with the storage command protocol in a data field of a second transfer command in accordance with the transfer protocol, wherein the second message comprises embedded data in the embedded protocol, and the embedded data is associated with the embedded command;

extract the embedded data from the second message; and transmit the embedded data to the embedded command processing unit.

30. The memory card of claim 27, further operative to:

receive an embedded data result in accordance with the embedded protocol from the embedded command processing unit;

form a result message in the storage command protocol, wherein the result message comprises the embedded data result; and transmit the result message to the host in a data field of a response to a second transfer command.

* * * * *